(12) United States Patent
Volochniuk et al.

(10) Patent No.: US 11,094,073 B2
(45) Date of Patent: Aug. 17, 2021

(54) METHOD AND APPARATUS FOR PROCESSING IMAGE

(71) Applicant: Samsung Electronics Co., Ltd., Suwon-si (KR)

(72) Inventors: Andrii Volochniuk, Kyiv (UA); Yong-Chan Keh, Seoul (KR); Jung-Kee Lee, Osan-si (KR); Sung-Soon Kim, Seoul (KR); Sun-Kyung Kim, Busan (KR); Andrii But, Kyiv (UA); Andrii Sukhariev, Kyiv (UA); Dmytro Vavdiyuk, Kyiv (UA); Konstantin Morozov, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/175,773

(22) Filed: Oct. 30, 2018

(65) Prior Publication Data

US 2019/0130590 A1    May 2, 2019

(30) Foreign Application Priority Data

Oct. 30, 2017   (KR) ................. 10-2017-0142843

(51) Int. Cl.
  *G06T 7/521*   (2017.01)
  *G06K 9/20*    (2006.01)
  (Continued)

(52) U.S. Cl.
  CPC ............ *G06T 7/521* (2017.01); *G06K 9/2063* (2013.01); *G06K 9/6202* (2013.01);
  (Continued)

(58) Field of Classification Search
  CPC . G06T 7/50; G06T 7/521; G06T 2207/10028; G06T 2207/10048;
  (Continued)

(56) References Cited

U.S. PATENT DOCUMENTS 8,054,290 B2*  11/2011  McEldowney ...... G06K 9/2027
                                                345/156
8,971,985 B2*   3/2015  Bernal ................. H04N 7/181
                                                600/407

(Continued)

FOREIGN PATENT DOCUMENTS

KR      10-1259835 B1      5/2013
KR      10-2014-0041012 A  4/2014
              (Continued)

OTHER PUBLICATIONS

Lee et a. "Efficient Depth Enhancement Using a Combination of Color and Depth Information" Jul. 1, 2017, 27 pages. (Year: 2017).*

(Continued)

*Primary Examiner* — Nathnael Aynalem

(57) ABSTRACT

A method of calculating depth information for a three-dimensional (3D) image includes generating a pattern based on the value of at least one cell included in a two-dimensional (2D) image, projecting the pattern, capturing a reflected image of the pattern, and calculating depth information based on the reflected image of the pattern.

16 Claims, 118 Drawing Sheets

(51) Int. Cl.
*H04N 5/33* (2006.01)
*G06K 9/62* (2006.01)

(52) U.S. Cl.
CPC .......... *G06K 2009/6213* (2013.01); *G06T 2207/10024* (2013.01); *G06T 2207/10028* (2013.01); *G06T 2207/10048* (2013.01); *H04N 5/33* (2013.01)

(58) Field of Classification Search
CPC ........ G06T 2207/10024; H04N 13/254; H04N 2013/0081; H04N 5/2256; H04N 13/271; H04N 13/207; H04N 13/239; H04N 13/128; G01B 11/2513; G01B 11/2545; G01B 13/14; G01B 21/18; G01B 11/25; G01B 5/18; G01B 7/26; G01B 11/22; G01B 11/16; G01S 7/4863; G06K 2209/40; G06K 9/2036; G06K 2009/6213; G06K 9/2063; G06K 9/6202
USPC ................... 348/46, 138; 345/419
See application file for complete search history.

(56) References Cited

U.S. PATENT DOCUMENTS

| | | | | |
|---|---|---|---|---|
| 10,089,739 | B2* | 10/2018 | Appia | G06T 7/521 |
| 10,152,801 | B2* | 12/2018 | Shpunt | G01B 11/22 |
| 10,250,789 | B2* | 4/2019 | Lee | H04N 5/2256 |
| 10,282,857 | B1* | 5/2019 | Brailovskiy | G06T 7/521 |
| 10,410,373 | B1* | 9/2019 | Hall | H04N 5/2256 |
| 2005/0254726 | A1* | 11/2005 | Fuchs | H04N 5/74 382/285 |
| 2006/0132802 | A1* | 6/2006 | Chung | G01B 11/2527 356/603 |
| 2008/0240502 | A1* | 10/2008 | Freedman | G01B 11/2513 382/103 |
| 2010/0315490 | A1 | 12/2010 | Kim et al. | |
| 2011/0205227 | A1* | 8/2011 | Fischer | G06T 5/50 345/419 |
| 2012/0162371 | A1* | 6/2012 | Ota | H04N 13/254 348/46 |
| 2012/0176380 | A1* | 7/2012 | Wang | G01B 11/2545 345/420 |
| 2012/0176478 | A1* | 7/2012 | Wang | G01B 11/2527 348/47 |
| 2013/0057654 | A1* | 3/2013 | Rafii | G06K 9/00201 348/46 |
| 2013/0215235 | A1* | 8/2013 | Russell | G03B 35/00 348/47 |
| 2014/0146041 | A1* | 5/2014 | Jeon | H04N 13/128 345/419 |
| 2014/0354681 | A1* | 12/2014 | Xiong | G06T 7/00 345/619 |
| 2015/0187081 | A1 | 7/2015 | Cho | |
| 2016/0050401 | A1* | 2/2016 | Gordon | G01C 3/02 348/744 |
| 2016/0202050 | A1* | 7/2016 | Lee | G01B 11/2513 356/610 |
| 2016/0343169 | A1* | 11/2016 | Mullins | G06T 19/006 |
| 2017/0131089 | A1* | 5/2017 | Bronstein | H04N 5/2256 |
| 2018/0144485 | A1* | 5/2018 | Kobayashi | G06T 7/246 |

FOREIGN PATENT DOCUMENTS

| | | |
|---|---|---|
| KR | 10-2015-0041901 A | 4/2015 |
| KR | 10-2016-0014717 A | 2/2016 |

OTHER PUBLICATIONS

Shanthi et al. "Cellular Automata and Their Realiazations" 2012 IEEE, pp. 58-63.*
International Search Report and Written Opinion regarding International Application No. PCT/KR2018/013017, dated Feb. 1, 2019, 7 pages.
Supplementary European Search Report in connection with European Application No. 18874657.2 dated Jul. 30, 2020, 9 pages.
Chen, et al., "Vision Processing for Realtime 3-D Data Acquisition Based on Coded Structured Light," IEEE Transactions on Image Processing, vol. 17, No. 2, Feb. 2008, 10 pages.
Morano, et al., "Structured Light Using Pseudorandom Codes," IEEE Transactions on Pattern Analysis and Machine Intelligence, vol. 20, No. 3, Mar. 1998, 6 pages.
Yan, et al., "Beyond the interference problem: hierarchical patterns for multiple-projector structured light system," Applied Optics, vol. 53, No. 17, Jun. 10, 2014, 12 pages.

* cited by examiner

FIG.12

Updated state

|   |   |   |   |   |   |   |   |   |   |
|---|---|---|---|---|---|---|---|---|---|
| 1 | 0 |   |   |   |   |   |   |   |   |
| 1 | 1 |   |   |   |   |   |   |   |   |
| 0 | 1 |   |   |   |   |   |   |   |   |
| 1 |   |   |   |   |   |   |   |   |   |
| 0 |   |   |   |   |   |   |   |   |   |
| 1 |   |   |   |   |   |   |   |   |   |
| 1 |   |   |   |   |   |   |   |   |   |
| 1 |   |   |   |   |   |   |   |   |   |
| 1 |   |   |   |   |   |   |   |   |   |

151 — i = 2, k = 2, s = 0
152
153
neighborhood

| S\K | 0 | 1 | 2 |
|-----|---|---|---|
| 0   | 1 | 0 | 1 — 154 |
| 1   | 0 | 1 | 0 |

| 1 | 0 | 0 | 1 | 0 | 0 | 0 | 0 | 1 |
| 1 | 1 | 1 | 1 | 1 | 0 | 0 | 1 | 0 |
| 0 | 1 | 1 | 0 | 0 | 1 | 0 | 0 | 0 |
| 1 | 0 | 1 | 0 | 1 | 0 | 1 | 0 | 1 |
| 0 | 1 | 1 | 0 | 0 | 1 | 0 | 0 | 0 |
| 1 | 1 | 1 | 1 | 1 | 0 | 0 | 1 | 0 |
| 1 | 0 | 0 | 1 | 0 | 0 | 0 | 0 | 1 |
| 1 | 0 | 1 | 1 | 0 | 1 | 1 | 1 | 1 |
| 1 | 0 | 1 | 1 | 0 | 1 | 1 | 1 | 1 |

| | 252 | 254 | | | | | | | | | | | | | | |
|---|---|---|---|---|---|---|---|---|---|---|---|---|---|---|---|---|
| 251 | 1 | 1 | 0 | 0 | 0 | 0 | 1 | 1 | 0 | 0 | 0 | 0 | 0 | 0 | 0 | 1 | 1 |
| 253 | 1 | 1 | 0 | 0 | 0 | 0 | 1 | 1 | 0 | 0 | 0 | 0 | 0 | 0 | 0 | 1 | 1 |
| | 1 | 1 | 1 | 1 | 1 | 1 | 1 | 1 | 1 | 1 | 0 | 0 | 0 | 1 | 1 | 0 | 0 |
| | 1 | 1 | 1 | 1 | 1 | 1 | 1 | 1 | 1 | 1 | 0 | 0 | 0 | 1 | 1 | 0 | 0 |
| | 0 | 0 | 1 | 1 | 1 | 1 | 0 | 0 | 0 | 0 | 1 | 1 | 0 | 0 | 0 | 0 | 0 |
| | 0 | 0 | 1 | 1 | 1 | 1 | 0 | 0 | 0 | 0 | 1 | 1 | 0 | 0 | 0 | 0 | 0 |
| | 1 | 1 | 0 | 0 | 0 | 0 | 0 | 0 | 0 | 0 | 1 | 1 | 0 | 0 | 1 | 1 | 1 |
| | 1 | 1 | 0 | 0 | 0 | 0 | 0 | 0 | 0 | 0 | 1 | 1 | 0 | 0 | 1 | 1 | 1 |
| | 0 | 0 | 1 | 1 | 0 | 0 | 0 | 0 | 0 | 0 | 1 | 1 | 0 | 0 | 0 | 0 | 0 |
| | 0 | 0 | 1 | 1 | 0 | 0 | 0 | 0 | 0 | 0 | 1 | 1 | 0 | 0 | 0 | 0 | 0 |
| | 1 | 1 | 1 | 1 | 0 | 0 | 0 | 0 | 0 | 0 | 1 | 1 | 1 | 1 | 1 | 0 | 0 |
| | 1 | 1 | 1 | 1 | 0 | 0 | 0 | 0 | 0 | 0 | 1 | 1 | 1 | 1 | 1 | 0 | 0 |
| | 1 | 1 | 0 | 0 | 0 | 0 | 1 | 1 | 0 | 0 | 0 | 0 | 0 | 0 | 0 | 1 | 1 |
| | 1 | 1 | 0 | 0 | 0 | 0 | 1 | 1 | 0 | 0 | 0 | 0 | 0 | 0 | 0 | 1 | 1 |
| | 1 | 1 | 0 | 0 | 1 | 1 | 1 | 1 | 0 | 0 | 1 | 1 | 1 | 1 | 1 | 1 | 1 |
| | 1 | 1 | 0 | 0 | 1 | 1 | 1 | 1 | 0 | 0 | 1 | 1 | 1 | 1 | 1 | 1 | 1 |
| | 1 | 1 | 0 | 0 | 1 | 1 | 1 | 1 | 0 | 0 | 1 | 1 | 1 | 1 | 1 | 1 | 1 |
| | 1 | 1 | 0 | 0 | 1 | 1 | 1 | 1 | 0 | 0 | 1 | 1 | 1 | 1 | 1 | 1 | 1 |

FIG.25A

| 1 | 0 | 0 | 1 | 0 | 0 | 0 | 0 | 1 |
|---|---|---|---|---|---|---|---|---|
| 1 | 1 | 1 | 1 | 1 | 0 | 0 | 0 | 0 |
| 0 | 1 | 1 | 0 | 0 | 1 | 0 | 0 | 0 |
| 1 | 0 | 0 | 0 | 0 | 0 | 0 | 1 | 1 |
| 0 | 1 | 0 | 1 | 0 | 1 | 0 | 0 | 0 |
| 1 | 1 | 0 | 0 | 0 | 1 | 1 | 1 | 0 |
| 1 | 0 | 0 | 1 | 0 | 0 | 0 | 0 | 1 |
| 1 | 0 | 1 | 1 | 0 | 1 | 0 | 1 | 1 |
| 1 | 0 | 1 | 1 | 0 | 1 | 1 | 1 | 1 | top-left pixel

FIG.25B

| 1 | 0 | 0 | 1 | 0 | 0 | 0 | 0 | 1 |
|---|---|---|---|---|---|---|---|---|
| 1 | 1 | 1 | 1 | 1 | 0 | 0 | 1 | 0 |
| 0 | 1 | 1 | 0 | 0 | 1 | 0 | 0 | 0 |
| 1 | 0 | 0 | 0 | 0 | 1 | 0 | 1 | 1 |
| 0 | 1 | 0 | 1 | 0 | 1 | 0 | 0 | 0 |
| 1 | 1 | 0 | 0 | 0 | 1 | 1 | 1 | 0 |
| 1 | 0 | 0 | 1 | 0 | 0 | 0 | 0 | 1 |
| 1 | 0 | 1 | 1 | 0 | 1 | 1 | 1 | 1 |
| 1 | 0 | 1 | 1 | 0 | 1 | 1 | 1 | 1 | top-right pixel

FIG.25C

| 1 | 0 | 0 | 1 | 0 | 0 | 0 | 0 | 1 |
|---|---|---|---|---|---|---|---|---|
| 1 | 1 | 1 | 1 | 1 | 0 | 0 | 0 | 0 |
| 0 | 1 | 1 | 0 | 0 | 1 | 0 | 0 | 0 |
| 1 | 0 | 0 | 0 | 0 | 1 | 0 | 1 | 1 |
| 0 | 1 | 0 | 1 | 0 | 1 | 0 | 0 | 0 |
| 1 | 1 | 0 | 0 | 0 | 0 | 1 | 1 | 0 |
| 1 | 0 | 0 | 1 | 0 | 0 | 0 | 0 | 1 |
| 1 | 0 | 1 | 1 | 0 | 1 | 1 | 1 | 1 |
| 1 | 0 | 1 | 1 | 0 | 1 | 1 | 1 | 1 | bottom-left pixel

FIG.25D

| 1 | 0 | 0 | 1 | 0 | 0 | 0 | 0 | 1 |
|---|---|---|---|---|---|---|---|---|
| 1 | 1 | 1 | 1 | 1 | 0 | 0 | 0 | 0 |
| 0 | 1 | 1 | 0 | 0 | 1 | 0 | 0 | 0 |
| 1 | 0 | 0 | 0 | 0 | 1 | 0 | 1 | 1 |
| 0 | 1 | 0 | 1 | 0 | 1 | 0 | 0 | 0 |
| 1 | 1 | 0 | 0 | 0 | 0 | 1 | 1 | 0 |
| 1 | 0 | 0 | 1 | 0 | 0 | 0 | 0 | 1 |
| 1 | 0 | 1 | 1 | 0 | 1 | 1 | 1 | 1 |
| 1 | 0 | 1 | 1 | 0 | 1 | 1 | 1 | 1 | bottom-right pixel

271 — Veritical disjoint set

| 0 | 1 | 2 | 3 | 4 | 5 | 6 | 7 | 8 |
|---|---|---|---|---|---|---|---|---|
| 9 | 10 | 11 | 12 | 13 | 14 | 15 | 16 | 17 |
| 18 | 19 | 20 | 21 | 22 | 23 | 24 | 25 | 26 |
| 27 | 28 | 29 | 30 | 31 | 32 | 33 | 34 | 35 |
| 36 | 37 | 38 | 39 | 40 | 41 | 42 | 43 | 44 |
| 45 | 46 | 47 | 48 | 49 | 50 | 51 | 52 | 53 |
| 54 | 55 | 56 | 57 | 58 | 59 | 60 | 61 | 62 |
| 63 | 64 | 65 | 66 | 67 | 68 | 69 | 70 | 71 |
| 72 | 73 | 74 | 75 | 76 | 77 | 78 | 79 | 80 |

272 — Horizontal disjoint set

| 0 | 1 | 2 | 3 | 4 | 5 | 6 | 7 | 8 |
|---|---|---|---|---|---|---|---|---|
| 9 | 10 | 11 | 12 | 13 | 14 | 15 | 16 | 17 |
| 18 | 19 | 20 | 21 | 22 | 23 | 24 | 25 | 26 |
| 27 | 28 | 29 | 30 | 31 | 32 | 33 | 34 | 35 |
| 36 | 37 | 38 | 39 | 40 | 41 | 42 | 43 | 44 |
| 45 | 46 | 47 | 48 | 49 | 50 | 51 | 52 | 53 |
| 54 | 55 | 56 | 57 | 58 | 59 | 60 | 61 | 62 |
| 63 | 64 | 65 | 66 | 67 | 68 | 69 | 70 | 71 |
| 72 | 73 | 74 | 75 | 76 | 77 | 78 | 79 | 80 |

Vertical disjoint set (271)

| 1 | 2 | 3 | 4 | 5 | 6 | 7 | 8 |
|---|---|---|---|---|---|---|---|
| 10 | 11 | 12 | 13 | 14 | 15 | 16 | 17 |
| 19 | 20 | 21 | 22 | 23 | 24 | 25 | 26 |
| 28 | 29 | 30 | 31 | 32 | 33 | 34 | 35 |
| 37 | 38 | 39 | 40 | 41 | 42 | 43 | 44 |
| 46 | 47 | 48 | 49 | 50 | 51 | 52 | 53 |
| 55 | 56 | 57 | 58 | 59 | 60 | 61 | 62 |
| 64 | 65 | 66 | 67 | 68 | 69 | 70 | 71 |
| 73 | 74 | 75 | 76 | 77 | 78 | 79 | 80 |
| 72 | 72 | 72 | 72 | 72 | 72 | 72 | 72 | 72 |

Horizontal disjoint set (272)

| 0 | 9 | 18 | 27 | 36 | 45 | 54 | 63 | 72 |
|---|---|---|---|---|---|---|---|---|
| 0 | 9 | 18 | 27 | 36 | 45 | 54 | 63 | 72 |
| | 11 | 20 | 29 | 38 | 47 | 56 | 65 | 74 |
| | 12 | 21 | 30 | 39 | 48 | 57 | 66 | 75 |
| | 13 | 22 | 31 | 40 | 49 | 58 | 67 | 76 |
| | 14 | 23 | 32 | 41 | 50 | 59 | 68 | 77 |
| | 15 | 24 | 33 | 42 | 51 | 60 | 69 | 78 |
| | 16 | 25 | 34 | 43 | 52 | 61 | 70 | 79 |
| | 17 | 26 | 35 | 44 | 53 | 62 | 71 | 80 |

|   |   |   |   |   |   |   |   |
|---|---|---|---|---|---|---|---|
|   | 8 | 5 | 5 | 6 | 6 | 3 | 4 |   |
|   | 7 | 4 | 4 | 5 | 5 | 2 | 3 |   |
|   | 7 | 4 | 4 |   |   |   |   |   |
|   |   |   |   |   | 1 | 2 |   |   |
|   |   |   |   |   | 3 | 4 |   |   |
|   |   |   |   |   | 2 |   |   |   |
|   | 7 |   |   |   |   |   |   |   |
|   | 9 | 6 | 6 | 7 | 7 | 4 | 5 |   |
|   | 9 | 6 | 6 | 7 | 7 | 4 | 5 |   |

FIG.38A 0 cell shift

FIG.38B 1 cell shift

| - | - | 1 | 1 | 0 | 1 | 0 | 0 | 1 |
|---|---|---|---|---|---|---|---|---|
| - | - | 0 | 0 | 0 | 1 | 1 | 1 | 0 |
| - | - | 1 | 1 | 1 | 1 | 0 | 1 | 0 |
| - | - | 1 | 0 | 1 | 1 | 1 | 1 | 0 |
| - | - | 0 | 1 | 1 | 1 | 0 | 1 | 0 |
| - | - | 1 | 1 | 1 | 0 | 0 | 1 | 0 |
| - | - | 1 | 1 | 0 | 1 | 0 | 0 | 1 |
| - | - | 0 | 1 | 1 | 0 | 1 | 0 | 0 |
| - | - | 0 | 0 | 1 | 0 | 1 | 0 | 0 |

2 cells shift

FIG.38C

| - | - | - | 0 | 0 | 0 | 1 | 0 | 1 |
|---|---|---|---|---|---|---|---|---|
| - | - | - | 0 | 0 | 1 | 1 | 0 | 0 |
| - | - | - | 0 | 1 | 0 | 0 | 0 | 1 |
| - | - | - | 1 | 0 | 0 | 0 | 0 | 1 |
| - | - | - | 0 | 1 | 0 | 0 | 0 | 1 |
| - | - | - | 1 | 1 | 0 | 0 | 0 | 0 |
| - | - | - | 0 | 0 | 0 | 1 | 0 | 1 |
| - | - | - | 0 | 0 | 0 | 0 | 1 | 0 |
| - | - | - | 0 | 0 | 0 | 0 | 1 | 0 |

3 cells shift

FIG.38D 0 cell shift

FIG.39A 1 cell shift

FIG.39B

| - | - | 1 | 1 | 0 | 1 | 0 | 0 | 1 |
|---|---|---|---|---|---|---|---|---|
| - | - | 0 | 0 | 0 | 1 | 1 | 1 | 0 |
| - | - | 1 | 1 | 1 | 1 | 0 | 1 | 0 |
| - | - | 1 | 0 | 1 | 1 | 1 | 1 | 0 |
| - | - | 0 | 1 | 1 | 1 | 0 | 1 | 0 |
| - | - | 1 | 1 | 1 | 0 | 0 | 1 | 0 |
| - | - | 1 | 1 | 0 | 1 | 0 | 0 | 1 |
| - | - | 0 | 1 | 1 | 0 | 1 | 0 | 0 |
| - | - | 0 | 0 | 1 | 0 | 1 | 0 | 0 |

2 cells shift

FIG.39C

| - | - | - | 0 | 0 | 0 | 1 | 0 | 1 |
|---|---|---|---|---|---|---|---|---|
| - | - | - | 0 | 0 | 1 | 1 | 0 | 0 |
| - | - | - | 0 | 1 | 0 | 0 | 0 | 1 |
| - | - | - | 1 | 0 | 0 | 0 | 0 | 1 |
| - | - | - | 0 | 1 | 0 | 0 | 0 | 1 |
| - | - | - | 1 | 1 | 0 | 0 | 0 | 0 |
| - | - | - | 0 | 0 | 0 | 1 | 0 | 1 |
| - | - | - | 0 | 0 | 0 | 0 | 1 | 0 |
| - | - | - | 0 | 0 | 0 | 0 | 1 | 0 |

3 cells shift

FIG.39D

| 0 | 0 | 0 | 0 | 0 | 0 | 1 | 0 | 0 |
|---|---|---|---|---|---|---|---|---|
| 0 | 0 | 0 | 0 | 0 | 1 | 1 | 0 | 0 |
| 0 | 0 | 0 | 0 | 0 | - | - | - | - |
| 0 | 0 | - | - | - | 3 | 3 | 3 | - |
| 0 | 0 | - | - | - | 3 | 3 | 3 | - |
| 0 | 0 | - | - | - | 3 | 3 | 3 | - |
| 0 | 0 | 0 | - | - | - | - | 0 | 0 |
| 0 | 0 | 0 | 0 | 0 | 0 | 0 | 0 | 0 |
| 0 | 0 | 0 | 0 | 0 | 0 | 0 | 0 | 0 | find minimum difference == 0

FIG.39E

FIG.40A 0 cell shift

FIG.40B 1 cell shift

| - | - | 1 | 1 | 0 | 1 | 0 | 0 | 1 |
|---|---|---|---|---|---|---|---|---|
| - | - | 0 | 0 | 0 | 1 | 1 | 1 | 0 |
| - | - | 1 | 1 | 1 | 1 | 0 | 1 | 0 |
| - | - | 1 | 0 | 1 | 1 | 1 | 1 | 0 |
| - | - | 0 | 1 | 1 | 1 | 0 | 1 | 0 |
| - | - | 1 | 1 | 1 | 0 | 0 | 1 | 0 |
| - | - | 1 | 1 | 0 | 1 | 0 | 0 | 1 |
| - | - | 0 | 1 | 1 | 0 | 1 | 0 | 0 |
| - | - | 0 | 0 | 1 | 0 | 1 | 0 | 0 |

2 cells shift

FIG.40C

| - | - | - | 0 | 0 | 0 | 1 | 0 | 1 |
|---|---|---|---|---|---|---|---|---|
| - | - | - | 0 | 0 | 1 | 1 | 0 | 0 |
| - | - | - | 0 | 1 | 0 | 0 | 0 | 1 |
| - | - | - | 1 | 0 | 0 | 0 | 0 | 1 |
| - | - | - | 0 | 1 | 0 | 0 | 0 | 1 |
| - | - | - | 1 | 1 | 0 | 0 | 0 | 0 |
| - | - | - | 0 | 0 | 0 | 1 | 0 | 1 |
| - | - | - | 0 | 0 | 0 | 0 | 1 | 0 |
| - | - | - | 0 | 0 | 0 | 0 | 1 | 0 |

3 cells shift

FIG.40D

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | - | - | - | - |
| 0 | 0 | - | - | - | 3 | 3 | 3 | - |
| 0 | 0 | - | - | - | 3 | 3 | 3 | - |
| 0 | 0 | - | - | - | 3 | 3 | 3 | - |
| 0 | 0 | 0 | - | - | - | - | 0 | 0 |
| 0 | 0 | 0 | 0 | 0 | 0 | 0 | 0 | 0 |
| 0 | 0 | 0 | 0 | 0 | 0 | 0 | 0 | 0 | find minimum difference == 0

FIG.40E 0 cell shift

FIG.41A 1 cell shift

FIG.41B

| - | - | 1 | 1 | 0 | 1 | 0 | 0 | 1 |
|---|---|---|---|---|---|---|---|---|
| - | - | 0 | 0 | 0 | 1 | 1 | 1 | 0 |
| - | - | 1 | 1 | 1 | 1 | 0 | 1 | 0 |
| - | - | 1 | 0 | 1 | 1 | 1 | 1 | 0 |
| - | - | 0 | 1 | 1 | 1 | 0 | 1 | 0 |
| - | - | 1 | 1 | 1 | 0 | 0 | 1 | 0 |
| - | - | 1 | 1 | 0 | 1 | 0 | 0 | 1 |
| - | - | 0 | 1 | 1 | 0 | 1 | 0 | 0 |
| - | - | 0 | 0 | 1 | 0 | 1 | 0 | 0 |

2 cells shift

FIG.41C

| - | - | - | 0 | 0 | 0 | 1 | 0 | 1 |
|---|---|---|---|---|---|---|---|---|
| - | - | - | 0 | 0 | 1 | 1 | 0 | 0 |
| - | - | - | 0 | 1 | 0 | 0 | 0 | 1 |
| - | - | - | 1 | 0 | 0 | 0 | 0 | 1 |
| - | - | - | 0 | 1 | 0 | 0 | 0 | 1 |
| - | - | - | 1 | 1 | 0 | 0 | 0 | 0 |
| - | - | - | 0 | 0 | 0 | 1 | 0 | 1 |
| - | - | - | 0 | 0 | 0 | 0 | 1 | 0 |
| - | - | - | 0 | 0 | 0 | 0 | 1 | 0 |

3 cells shift

FIG.41D

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | - | - | - | - |
| 0 | 0 | - | - | - | 3 | 3 | 3 | - |
| 0 | 0 | - | - | - | 3 | 3 | 3 | - |
| 0 | 0 | - | - | - | 3 | 3 | 3 | - |
| 0 | 0 | 0 | 0 | 0 | - | - | 0 | 0 |
| 0 | 0 | 0 | 0 | 0 | 0 | 0 | 0 | 0 |
| 0 | 0 | 0 | 0 | 0 | 0 | 0 | 0 | 0 | find minimum difference == 0

FIG.41E

Horizontal disjoint set

441

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | - | - | - | - |
| 0 | 0 | - | - | - | 3 | 3 | 3 | - |
| 0 | 0 | - | - | - | 3 | 3 | 3 | - |
| 0 | 0 | - | - | - | 3 | 3 | 3 | - |
| 0 | 0 | 0 | 0 | 0 | - | - | 0 | 0 |
| 0 | 0 | 0 | 0 | 0 | 0 | 0 | 0 | 0 |
| 0 | 0 | 0 | 0 | 0 | 0 | 0 | 0 | 0 |

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | - | - | - | - |
| 0 | 0 | - | - | - | 3 | 3 | 3 | - |
| 0 | 0 | - | - | - | 3 | 3 | 3 | - |
| 0 | 0 | - | - | - | 3 | 3 | 3 | - |
| 0 | 0 | 0 | 0 | 0 | - | - | 0 | 0 |
| 0 | 0 | 0 | 0 | 0 | 0 | 0 | 0 | 0 |
| 0 | 0 | 0 | 0 | 0 | 0 | 0 | 0 | 0 |

FIG.44C

Veritical disjoint set

Horizontal disjoint set

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | - | - | - | - |
| 0 | 0 | - | - | - | 3 | 3 | 3 | - |
| 0 | 0 | - | - | - | 3 | 3 | 3 | - |
| 0 | 0 | - | - | - | 3 | 3 | 3 | - |
| 0 | 0 | 0 | 0 | 0 | - | - | 0 | 0 |
| 0 | 0 | 0 | 0 | 0 | 0 | 0 | 0 | 0 |
| 0 | 0 | 0 | 0 | 0 | 0 | 0 | 0 | 0 |

| 0 | 1 | 2 | 3 | 4 | 5 | 6 | 7 | 8 |
|---|---|---|---|---|---|---|---|---|
| 9 | 10 | 11 | 12 | 13 | 14 | 15 | 16 | 17 |
| 18 | 19 | 20 | 21 | 22 | 23 | 24 | 25 | 26 |
| 27 | 28 | 29 | 30 | 31 | 32 | 33 | 34 | 35 |
| 36 | 37 | 38 | 39 | 40 | 41 | 42 | 44 | 44 |
| 45 | 46 | 47 | 48 | 49 | 50 | 51 | 52 | 53 |
| 54 | 55 | 56 | 57 | 58 | 59 | 60 | 61 | 62 |
| 63 | 64 | 65 | 66 | 67 | 68 | 69 | 70 | 71 |
| 72 | 72 | 72 | 72 | 72 | 72 | 72 | 72 | 72 |

Initial disjoint set

| 72 | 72 | 72 | 72 | 72 | 72 | 72 | 72 | 72 |
|---|---|---|---|---|---|---|---|---|
| 72 | 72 | 72 | 72 | 72 | 72 | 72 | 72 | 72 |
| 72 | 72 | 72 | 72 | 72 | 23 | 24 | 25 | 26 |
| 72 | 72 | 29 | 30 | 31 | 50 | 50 | 50 | 35 |
| 72 | 72 | 38 | 39 | 40 | 50 | 50 | 50 | 44 |
| 72 | 72 | 47 | 48 | 49 | 50 | 50 | 50 | 53 |
| 72 | 72 | 72 | 72 | 72 | 59 | 60 | 72 | 72 |
| 72 | 72 | 72 | 72 | 72 | 72 | 72 | 72 | 72 |
| 72 | 72 | 72 | 72 | 72 | 72 | 72 | 72 | 72 |

— Segment of object
— Border or non pattern
— Segment of object

Final disjoint set

| 72 | 72 | 72 | 72 | 72 | 72 | 72 | 72 | - |
|----|----|----|----|----|----|----|----|---|
| 72 | 72 | 72 | 72 | 72 | 72 | 72 | 72 | - |
| 72 | 72 | 72 | 72 | 72 | -  | -  | -  | - |
| 72 | 72 | -  | -  | -  | 50 | 50 | 50 | - |
| 72 | 72 | -  | -  | -  | 50 | 50 | 50 | - |
| 72 | 72 | -  | -  | -  | 50 | 50 | -  | - |
| 72 | 72 | 72 | 72 | 72 | 72 | 72 | 72 | 72 |
| 72 | 72 | 72 | 72 | 72 | 72 | -  | 72 | 72 |
| 72 | 72 | 72 | 72 | 72 | 72 | 72 | 72 | 72 |

Top left

| 72 | 72 | 72 | 72 | 72 | 72 | 72 | 72 | - |
|----|----|----|----|----|----|----|----|---|
| 72 | 72 | 72 | 72 | 72 | 72 | 72 | 72 | - |
| 72 | 72 | 72 | 72 | 72 | -  | -  | -  | - |
| 72 | 72 | -  | -  | -  | 50 | 50 | 50 | - |
| 72 | 72 | -  | -  | -  | 50 | 50 | 50 | - |
| 72 | 72 | -  | -  | -  | 50 | 50 | -  | - |
| 72 | 72 | 72 | 72 | 72 | 72 | 72 | 72 | 72 |
| 72 | 72 | 72 | 72 | 72 | 72 | 72 | 72 | 72 |
| 72 | 72 | 72 | 72 | 72 | 72 | 72 | 72 | 72 |

Top right

| 72 | 72 | 72 | 72 | 72 | 72 | 72 | 72 | - |
|----|----|----|----|----|----|----|----|---|
| 72 | 72 | 72 | 72 | 72 | 72 | 72 | - | - |
| 72 | 72 | 72 | 72 | 72 | - | - | - | - |
| 72 | 72 | - | - | - | 32 | 32 | 32 | - |
| 72 | 72 | - | - | - | 32 | 32 | 32 | - |
| 72 | 72 | - | - | - | - | - | - | - |
| 72 | 72 | 72 | 72 | 72 | 72 | 72 | 72 | 72 |
| 72 | 72 | 72 | 72 | 72 | 72 | 72 | 72 | 72 |
| 72 | 72 | 72 | 72 | 72 | 72 | 72 | 72 | 72 |

Bottom left

| 72 | 72 | 72 | 72 | 72 | 72 | 72 | 72 | - |
|----|----|----|----|----|----|----|----|---|
| 72 | 72 | 72 | 72 | 72 | 72 | 72 | - | - |
| 72 | 72 | 72 | 72 | 72 | - | - | - | - |
| 72 | 72 | - | - | - | 32 | 32 | 32 | - |
| 72 | 72 | - | - | - | 32 | 32 | 32 | - |
| 72 | 72 | - | - | - | - | - | - | - |
| 72 | 72 | 72 | 72 | 72 | 72 | 72 | 72 | 72 |
| 72 | 72 | 72 | 72 | 72 | 72 | 72 | 72 | 72 |
| 72 | 72 | 72 | 72 | 72 | 72 | 72 | 72 | 72 |

Bottom right

FIG.45D triangulation technique scheme $\sigma_d$ = shift

| Yp \ Xp | shift=0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | - | - | - | - |
| 0 | 0 | - | - | - | 3 | 3 | 3 | - |
| 0 | 0 | - | - | - | 3 | 3 | 3 | - |
| 0 | 0 | - | - | - | 3 | 3 | 3 | - |
| 0 | 0 | 0 | 0 | 0 | - | - | 0 | 0 |
| 0 | 0 | 0 | 0 | 0 | 0 | 0 | 0 | 0 |
| 0 | 0 | 0 | 0 | 0 | 0 | 0 | 0 | 0 |

```
epoch 0        epoch 1          epoch 2           epoch 3            epoch 4
                                                  . . . . x . . . .  . . . . x . . . .
                                . . . x . .       . . x xx . .       . . . . . . . . .
           . x .                . . . . .         . x . . . x .      . . . . . . . . .
  x        xxxx .x . x          xx .x . x xx      . . . x . . . x    . . . . . . . . .
           . x .                . . . . .         . x . . . x .      . . . . . . . . .
                                . . x . .         . . x xx . .       . . . . . . . . .
                                                  . . . x . . .      . . . . . . . . .
                                                                     . . . . x . . . .
```

FIG.51

Table # 736 rules

| 0 1 0 | 0 1 0 | 0 1 0 | 1 1 1 |
| 1 1 0 | 0 1 1 | 0 1 0 | 0 0 0 |
| 0 0 0 | 0 0 0 | 0 1 0 | 0 0 0 |
| a. | b. | c. | d. |
| 0 0 0 | 0 0 1 | 1 0 0 | ... |
| 0 0 0 | 0 0 1 | 1 0 0 | All combinations which |
| 1 1 1 | 0 0 1 | 1 0 0 | gives sum 3 and more |
| e. | f. | g. | h. |

FIG.52

Original performance A

```
1    2    3    4
5    6    7    8
9   10   11   12
13  14   15   16
```

$$\begin{pmatrix} 0 & 1 & 1 \\ 2 & 3 & 6 \\ 2 & 3 & 6 \end{pmatrix}$$

Approximated one A'

$$\delta^T_{x_{i,j}} = \begin{matrix} a_{-3c,-3c} & a_{-2c,-3c} & a_{-c,-3c} & a_{0,-3c} & a_{c,-3c} & a_{2c,-3c} & a_{3c,-3c} \\ a_{-3c,-2c} & a_{-2c,-2c} & a_{-c,-2c} & a_{0,-2c} & a_{c,-2c} & a_{2c,-2c} & a_{3c,-2c} \\ a_{-c,-c} & a_{-c,-c} & a_{-c,-c} & a_{0,-c} & a_{c,-c} & a_{2c,-c} & a_{3c,-c} \\ a_{-3c,0} & a_{-2c,0} & a_{-c,0} & a_{0,0} & a_{c,0} & a_{2c,0} & a_{3c,0} \\ a_{-3c,c} & a_{-2c,c} & a_{-c,c} & a_{0,c} & a_{c,c} & a_{2c,c} & a_{3c,c} \\ a_{-3c,2c} & a_{-2c,2c} & a_{-c,2c} & a_{0,2c} & a_{c,2c} & a_{2c,2c} & a_{3c,2c} \\ a_{-3c,3c} & a_{-2c,3c} & a_{-c,3c} & a_{0,3c} & a_{c,3c} & a_{2c,3c} & a_{3c,3c} \end{matrix}$$

Non-zero connected component k - $R_k^{approx}$

FIG.68

METHOD AND APPARATUS FOR PROCESSING IMAGE

CROSS-REFERENCE TO RELATED APPLICATION

This application is based on and claims priority under 35 U.S.C. § 119 to Korean Patent Application No. 10-2017-0142843, filed on Oct. 30, 2017, in the Korean Intellectual Property Office, the disclosure of which is incorporated by reference herein in its entirety.

BACKGROUND

1. Field

The disclosure relates to a method and apparatus for processing an image, and more particularly, to a method and apparatus for processing two-dimensional (2D) and three-dimensional (3D) images.

2. Description of Related Art

As augmented reality (AR) or virtual reality (VR) has attracted more attention, various electronic devices have been developed to implement AR (or VR).

For AR (or VR) implementation, 3D environment modeling techniques are under development, including, for example, passive stereoscopy and active projection.

To model a 3D environment, depth information about an image is needed. Various methods of calculating depth information have been developed, such as structured light-based solutions of projecting a predetermined code and calculating depth information on the basis of the projected code.

The above information is presented as background information only to assist with an understanding of the disclosure. No determination has been made, and no assertion is made, as to whether any of the above might be applicable as prior art with regard to the disclosure.

SUMMARY

An aspect of the disclosure is to address at least the above-mentioned problems and/or disadvantages and to provide at least the advantages described below. Accordingly, an aspect of the disclosure is to provide a method and apparatus for processing an image for three-dimensional (3D) environment modeling.

In accordance with an aspect of the disclosure, there is provided a method of calculating depth information. The method includes generating a pattern based on the value of at least one cell included in a 2D image, projecting the pattern, capturing a reflected image of the pattern, and calculating depth information based on the reflected image of the pattern.

In accordance with another aspect of the disclosure, there is provided a terminal. The terminal includes a projector, a capturing unit, and a processor configured to control the projector to generate a pattern based on the value of at least one cell included in a 2D image and project the pattern, to control the capturing unit to capture a reflected image of the pattern, and to calculate depth information based on the reflected image of the pattern.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following description taken in conjunction with the accompanying drawings, in which:

FIG. 12 illustrates a result of setting an initial value according to an embodiment of the disclosure;

FIGS. 13-17 illustrate a detailed cellular automation process according to an embodiment of the disclosure;

FIG. 19 illustrates a 2D image according to an embodiment of the disclosure;

FIG. 21 illustrates a process of projecting and capturing a cellular automaton pattern according to an embodiment of the disclosure;

FIGS. 25A-25E illustrate clustered results according to an embodiment of the disclosure;

FIGS. 26A-26F illustrate a method of recognizing a cellular automaton pattern according to an embodiment of the disclosure;

FIG. 27 illustrates indexes in a cellular automaton pattern according to an embodiment of the disclosure;

FIGS. 29A-29H illustrate a method of detecting horizontal and vertical connected components according to an embodiment of the disclosure;

FIGS. 30A-30H illustrate a method of estimating a disparity for a vertical cluster according to an embodiment of the disclosure;

FIGS. 34A-34G illustrate a method of estimating a disparity for a vertical cluster according to another embodiment of the disclosure;

FIGS. 35A and 35B illustrate a method of determining a shift table according to another embodiment of the disclosure;

FIGS. 38A-38E illustrate a method of processing a bordering cell according to an embodiment of the disclosure;

Figures 39A, 39B:
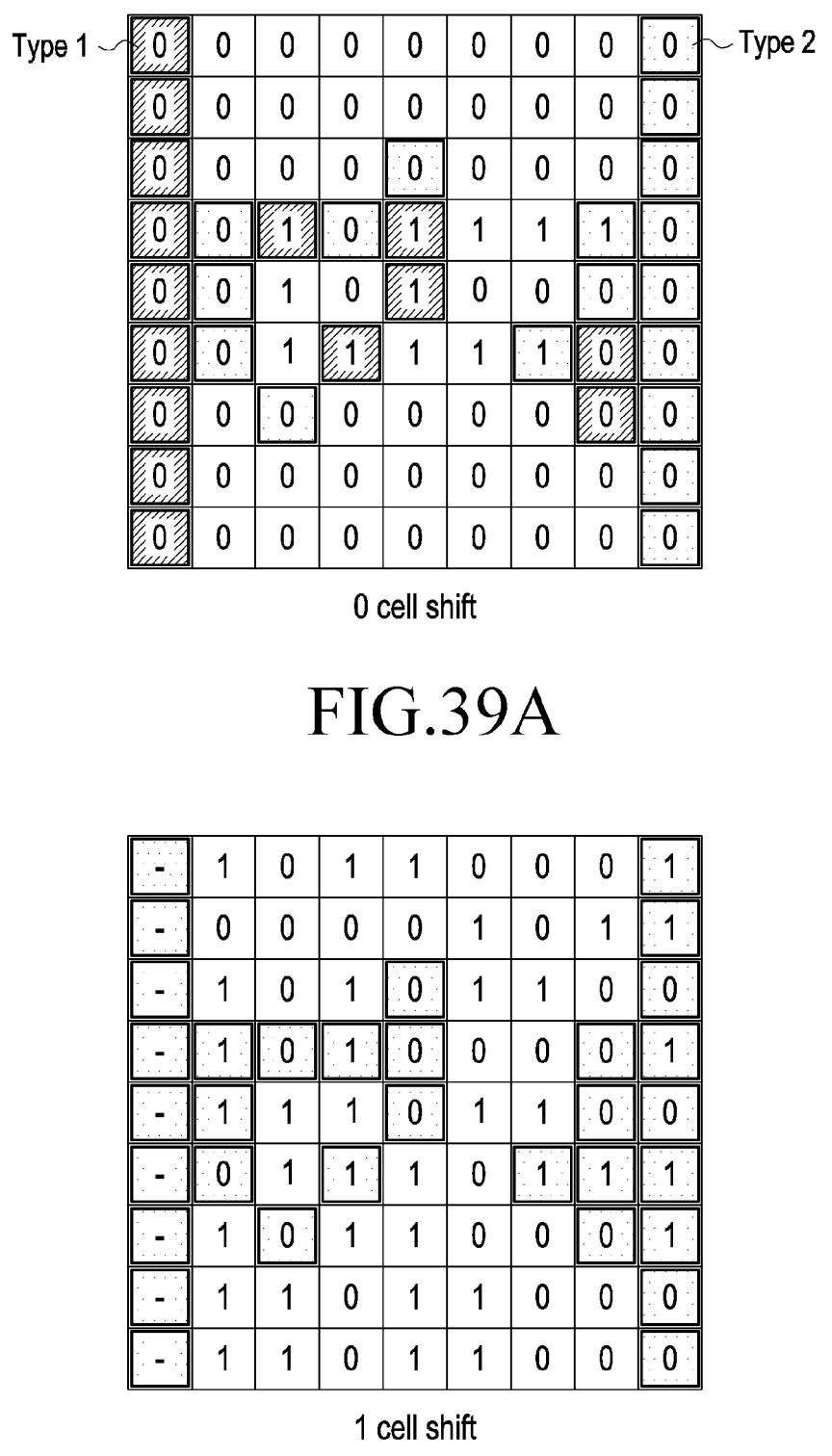

FIGS. 39A-39E illustrate a method of processing a bordering cell according to another embodiment of the disclosure;

Figures 40A, 40B:
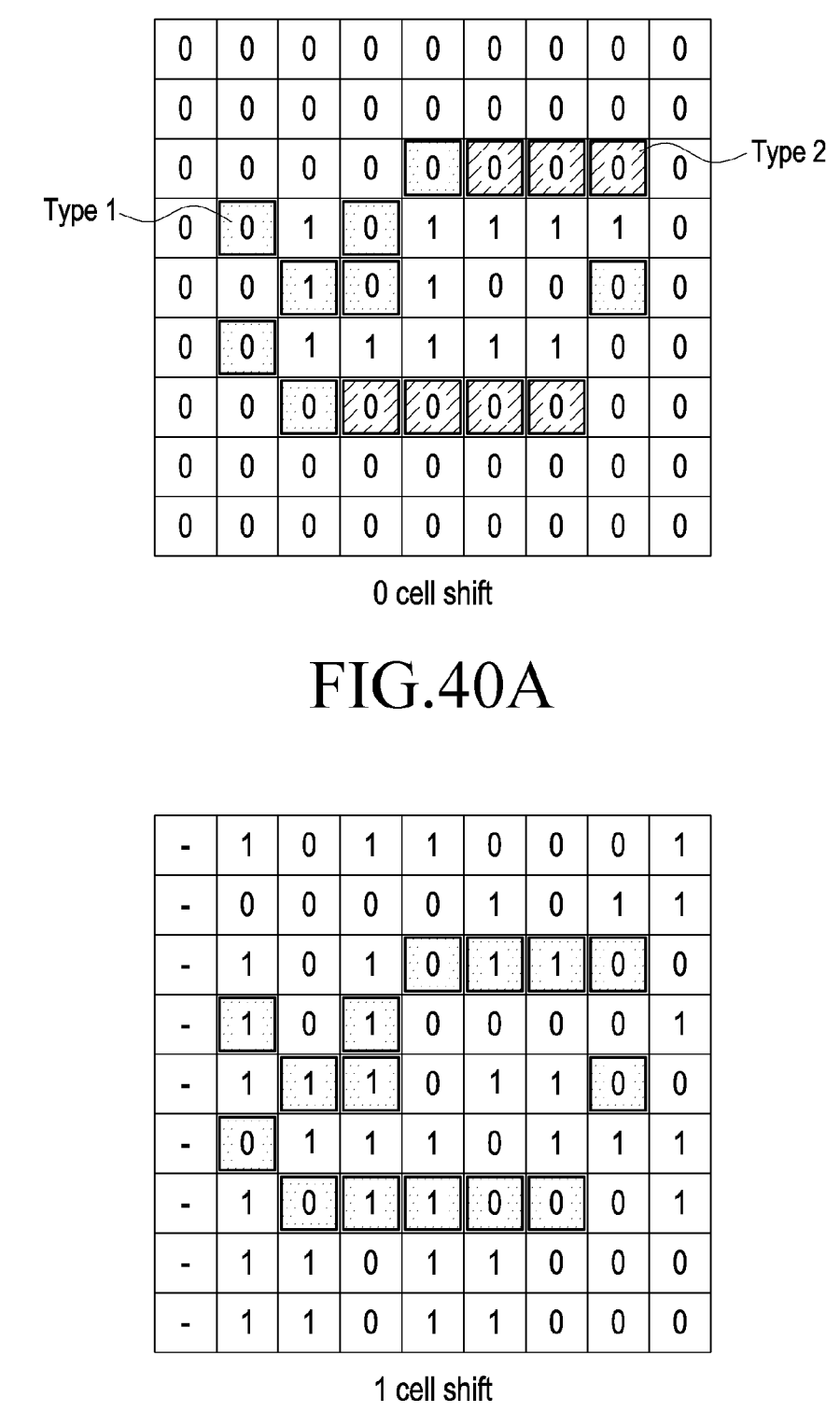

FIGS. 40A-40E illustrate a method of processing a bordering cell according to another embodiment of the disclosure;

Figures 41A, 41B:
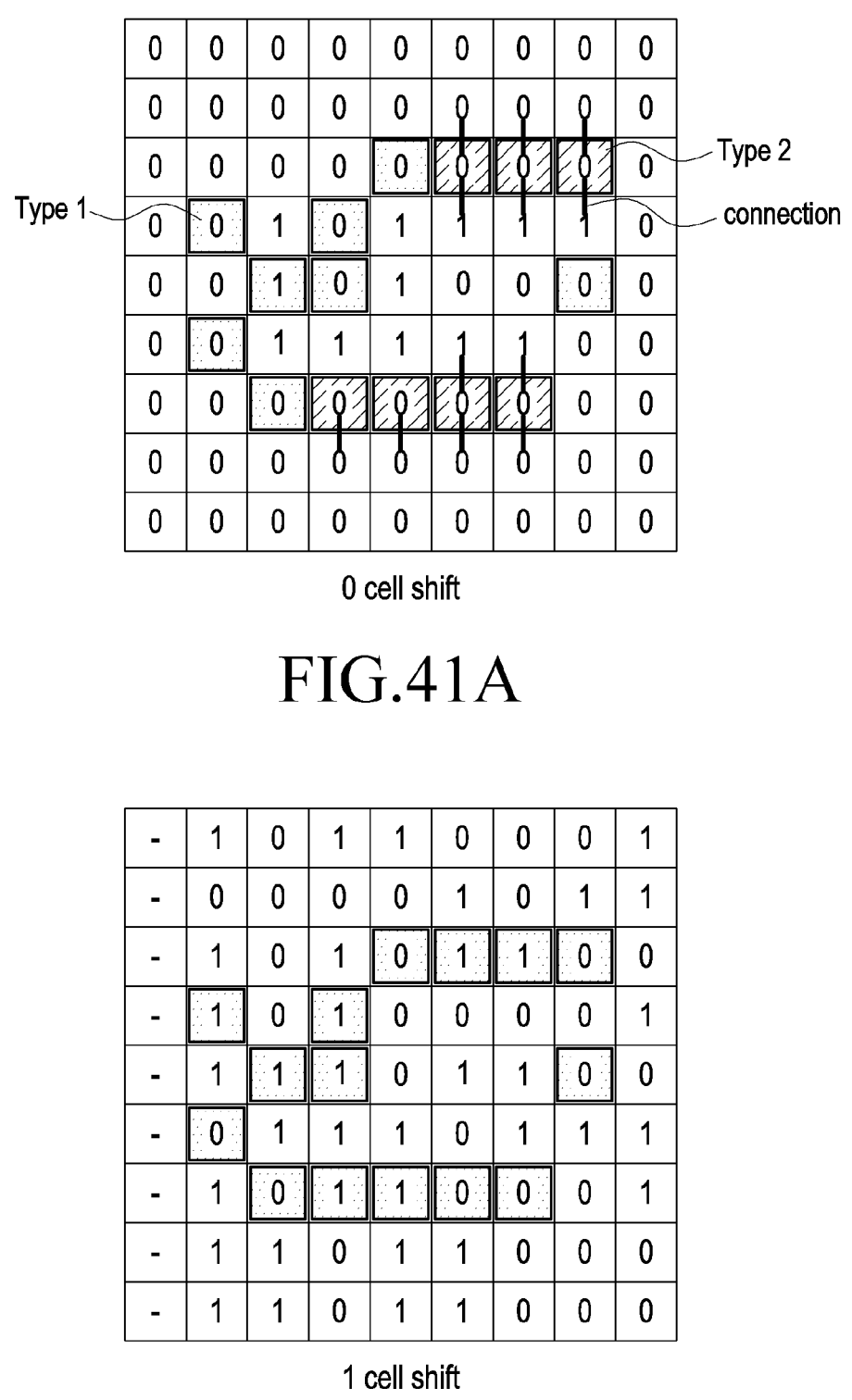

FIGS. 41A-41E illustrate a method of processing a bordering cell according to another embodiment of the disclosure;

FIGS. 44A-44H are views depicting an object segmentation method according to an embodiment of the disclosure;

FIGS. 45A-45F are views depicting an object segmentation method according to another embodiment of the disclosure;

FIGS. 46A-46C illustrate a triangulation method according to an embodiment of the disclosure;

FIG. 51 illustrates cellular automaton evolution according to an embodiment of the disclosure;

FIG. 52 illustrates 2D cellular automata rules according to an embodiment of the disclosure;

FIG. 64 illustrates a convolution computation according to an embodiment of the disclosure;

FIG. 68 illustrates connected components within a transition rule during approximation as a convolution kernel according to an embodiment of the disclosure;

Throughout the drawings, like reference numerals will be understood to refer to like parts, components, and structures.

DETAILED DESCRIPTION

Figure 1:
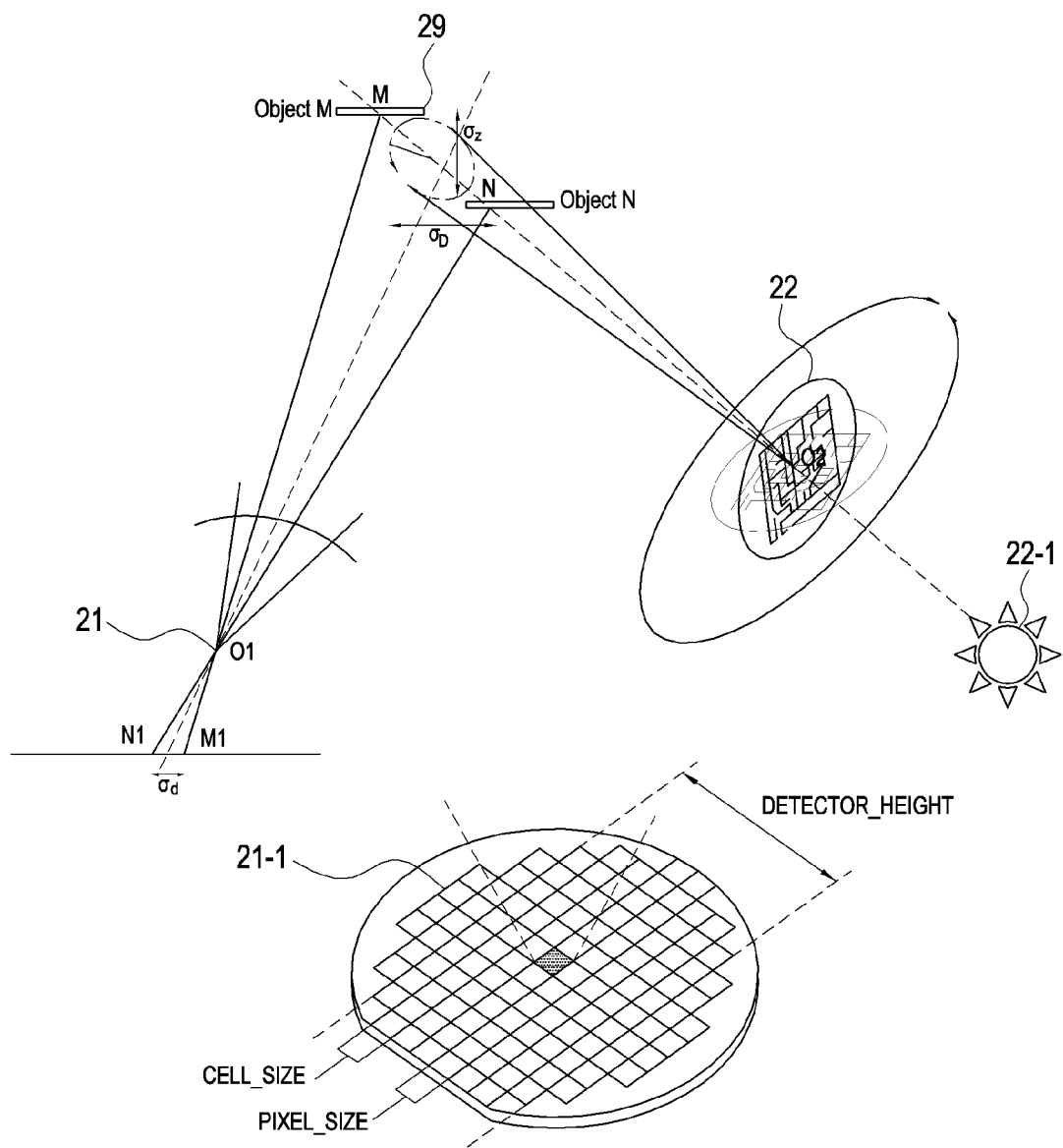
FIG. 1 illustrates a three-dimensional (3D) environmental map reconstruction system according to an embodiment of the disclosure.
Figure 71:
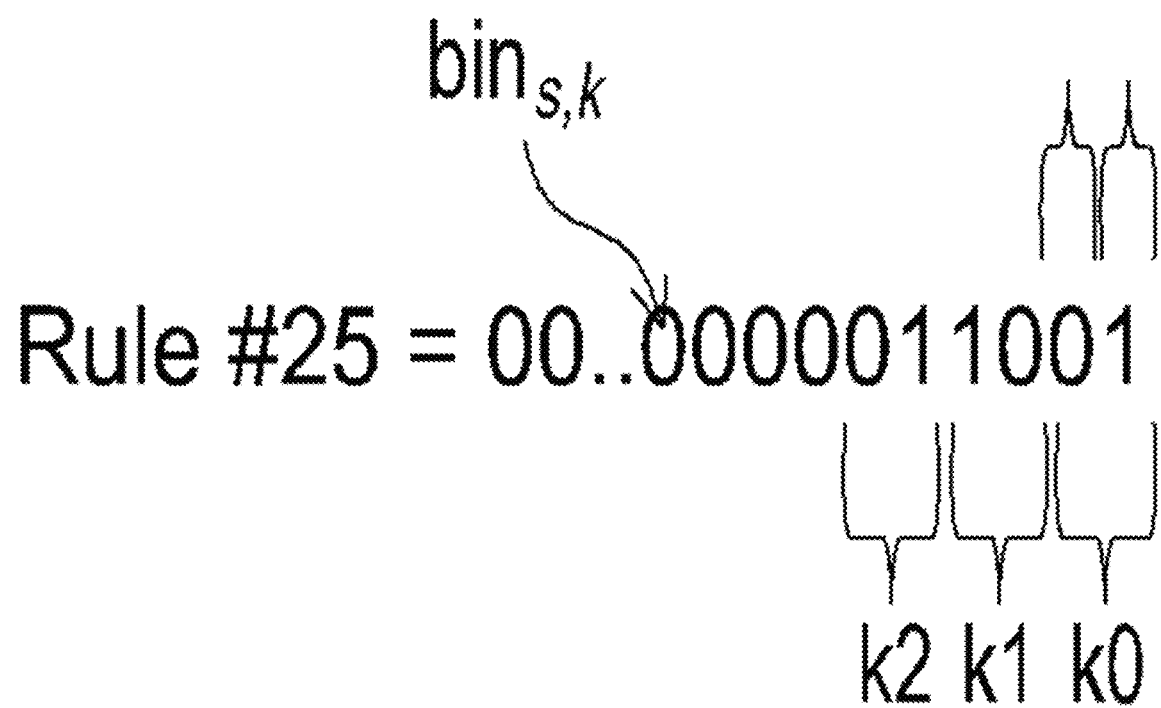
FIG. 71 illustrates an example rule according to an embodiment of the disclosure.

FIGS. 1 through 71, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will be described in detail with reference to the attached drawings. It is to be appreciated that only parts needed to understand operations according to embodiments of the disclosure will be described, while the remaining part will not be described lest it should obscure the subject matter of the disclosure. Although the terms used in the disclosure are defined in consideration of functions in the embodiments of the disclosure, the terms may be changed according to the intention of a user or an operator, or customs. Therefore, the disclosure should be understood, not simply by the actual terms used but by the meanings of each term lying within.

Many modifications may be made to the disclosure, and the disclosure may have various embodiments. Specific embodiments of the disclosure are described with reference to the accompanying drawings. However, the embodiments are not intended to limit the disclosure to the particular embodiments, and it is to be understood that the disclosure covers various modifications, equivalents, and/or alternatives to the embodiments within the scope and spirit of the disclosure.

Unless otherwise defined in the embodiments of the disclosure, the terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Now, a detailed description will be given of various embodiments of the disclosure with reference to the attached drawings.

FIG. 1 illustrates a three-dimensional (3D) environmental map reconstruction system according to an embodiment of the disclosure.

The 3D environmental map reconstruction system may include an electromagnetic wave (or light) source 22-1, an electromagnetic filter or mask 22, and a light receiving unit 21.

The electromagnetic wave source 22-1 irradiates (or projects) an electromagnetic wave beam.

The electromagnetic field filter or mask 22 forms a pattern of the spatial distribution of an electromagnetic field to be irradiated onto an object 29 (or 3D space) on the basis of a lens system.

The light receiving unit 21 detects an electromagnetic field reflected from the object 29 (or 3D space) and records the spatial distribution of the electromagnetic field. The light receiving unit 21 may include a detector 21-1.

According to an embodiment of the disclosure, the electromagnetic wave source 22-1, the electromagnetic field filter or mask 22, and the light receiving unit 21 may be included in an electronic device. The configuration of a terminal as an electronic device will be described below in detail.

Figure 2:
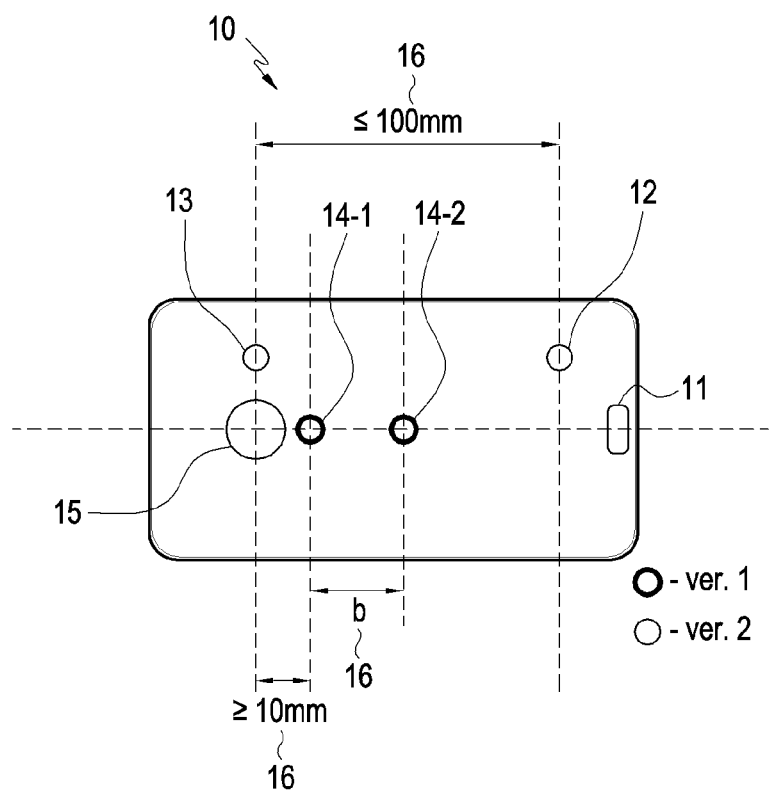
FIG. 2 illustrates a terminal according to an embodiment of the disclosure.

FIG. 2 illustrates a terminal according to an embodiment of the disclosure.

Referring to FIG. 2, a terminal 10 includes light projectors (or projectors) 11 and 12, infrared (IR) cameras 13 and 14, and a red, green, blue (RGB) camera 15.

The light projectors 11 and 12 project a pattern (or a two-dimensional (2D) pattern image).

The IR cameras 13, 14-1, and 14-2 capture an image (e.g., 2D image) of the projected pattern reflected from an object.

The RGB camera 15 captures a space or an object, for example, in a visible ray area.

In FIG. 2, the light projectors 11 and 12, and the IR cameras 13, 14-1 and 14-2 may be provided as indicated by reference numerals 12 and 13 (implementation method 1) or as indicated by reference numerals 11 and 14 (implementation 2). For example, the distances b (base) between the light projectors 11 and 12 and the IR cameras 13, 14-1, and 14-2 may be set to be equal to or less than 100 mm, as indicated by reference numerals 16 and 18. Further, the RGB camera 15 may be set apart from the IR cameras 14-1 and 14-2 by a distance of 10 mm or larger, as indicated by reference numeral 17.

Figure 3:
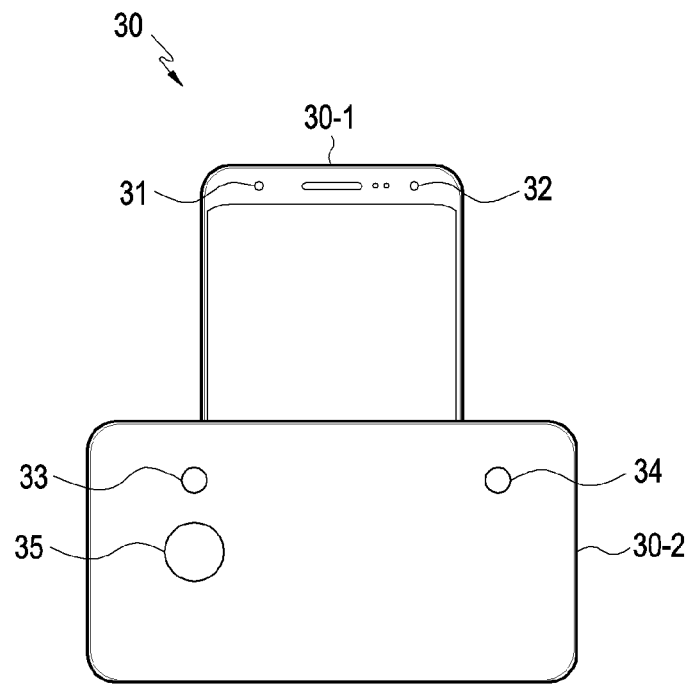
FIG. 3 illustrates a terminal according to another embodiment of the disclosure.

FIG. 3 illustrates a terminal according to another embodiment of the disclosure.

FIG. 3 illustrates the front surface 30-1 and rear surface 30-2 of a terminal 30.

The front surface 30-1 of the terminal 30 includes an IR camera 31 and a light projector 32. The rear surface 30-2 of the terminal 30 includes an IR camera 33, a light projector 34, and an RGB camera 35. A description redundant with the description of FIG. 1 is avoided herein.

Figure 4:
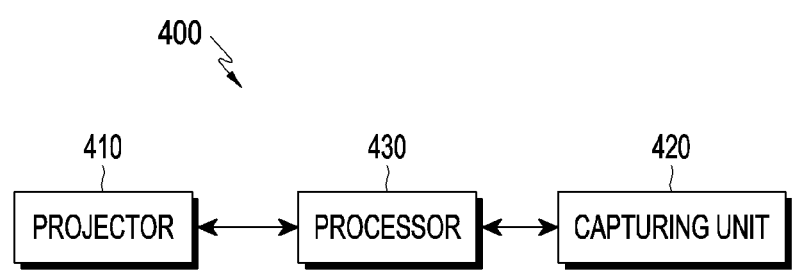
FIG. 4 illustrates a block diagram of a terminal according to an embodiment of the disclosure.

FIG. 4 illustrates a block diagram of a terminal according to an embodiment of the disclosure.

A description redundant with the descriptions of FIGS. 1 and 2 is avoided herein.

A terminal 400 includes a projector 410, a capturing unit 420, and a processor 430.

The projector 410 projects light. For example, the projector 410 may project a predetermined light pattern. Herein, the pattern may be projected by IR light.

The capturing unit 420 may capture an image of the projected light. For example, the capturing unit 420 may capture an image of the projected light which has been reflected. The capturing unit 420 may have an RGB capturing function, or the terminal 400 may further include a capturing unit that has the RGB capturing function.

The processor 430 provides overall control to the terminal 400. Particularly, the processor 430 may generate a pattern by evolving a cellular automaton. That is, the processor 430 may generate a pattern on the basis of the value of at least one cell included in a 2D image. The process of generating a pattern amounts to setting a value for each of a plurality of cells included in the 2D image.

One of at least two values may be assigned to each of the plurality of cells included in the 2D image. A cell is a unit that forms a 2D image and a pattern. For example, the at least two values are '0' and '1', and '0 or 1' may be assigned to each of the plurality of cells. Further, automaton evolution refers to a process of assigning one of at least two values to each of a plurality of cells. For example, the processor 430 may repeat an operation of assigning '0' or '1' to one of the plurality of cells and assigning '0' or '1' to one cell neighboring to the cell among the plurality of cells.

For example, assuming one-dimensional (1D) automaton evolution, the processor 430 may perform 1D evolution by the following [Equation 1].

$$a_i^{t+1} = \delta(a_{i-1}^t, a_i^t, a_{i+1}^t) = (a_{i-1}^t, a_i^t, a_{i+1}^t) \quad \text{[Equation 1]}$$

In another example, assuming 2D automaton evolution, the processor 430 may perform 2D evolution by the following [Equation 2].

$$a_{ij}^{t+1} = \delta(a_{i-1,j}^t, a_{i,j}^t, a_{i+1,j}^t, a_{i,j-1}^t, a_{i,j+1}^t) \quad \text{[Equation 2]}$$

When generating a pattern, the processor 430 may use an initial value set in a row or column of a plurality of cells included in a 2D image. For example, if the row or column includes five cells, the initial value of the row or column may be set to 10010.

In the above example, 1D evolution may be used for 2D evolution. Further, it is apparent that various embodiments of the disclosure are applicable to 2D or higher-order evolution.

The processor 430 may generate a pattern by determining the value of another cell neighboring one cell on the basis of the value of the one cell and the sum of the values of two cells neighboring the one cell in the 2D image.

The processor 430 may control the projector 410 to project the generated pattern. Further, the processor 430 may control the capturing unit 420 to capture a reflected image of the pattern. Herein, the processor 430 may calculate depth information for 3D environment modeling on the basis of the pattern and the reflected image of the pattern.

The processor 430 may generate a pattern on the basis of the values of cells in a row or column of the plurality of cells included in the reflected image of the pattern. Further, the processor 430 may determine the value of another cell neighboring a cell on the basis of the value of the cell and the values of two cells neighboring the cell. Further, the processor 430 may compare the values of the plurality of cells included in the reflected image of the pattern with the values of the plurality of cells included in the pattern generated on the basis of the values of the cells in the row or column, and may calculate depth information on the basis of the comparison result.

Depth information may be calculated on the basis of a match or mismatch between the values of the plurality of cells included in the pattern and the values of the plurality of cells included in the reflected image of the pattern.

The processor 430 may determine a lost area in the reflected image of the pattern. In this case, the processor 430 may generate a pattern for the lost area by automaton evolution.

The processor 430 may determine whether to perform automaton evolution according to whether a first row/column generated on the basis of one row/column included in the reflected image of the pattern matches a second row/column neighboring the one row/column. The match or mismatch may be determined on the basis of the Hamming distance between the first row/column and the second row/column.

Hereinbelow, theories and mathematical formulas related to the disclosure and specific embodiments of the disclosure will be described. Apparently, each theory, mathematic formula, and specific embodiment may be performed by a processor, even though it is not specified explicitly.

The afore-mentioned pattern may be referred to as a genetic pattern. This genetic pattern may be generated by cellular automata or cellular automaton evolution.

A method of generating a structured light pattern is provided according to an embodiment of the disclosure. A pattern generation process is the evolution of a cellular automaton in a 2D grid with the same resolution as that of an IR camera image. Cellular automata may be defined as a process of determining the values of neighbor cells on the basis of the initial value of an initial cell (or point) or the initial values of cells in an initial row or column in an image pattern. Herein, an initial value may be preset or received externally.

The result of the cellular automaton pattern evolution may be a constant 2D pattern based on local and global correlations, and a sub-pixel disparity map may be reconfigured according to the pattern evolution. Cellular automata are mathematical models for systems in which many simple components interact with each other to produce complex patterns of behavior. Many schemes are available for 1D cellular automata.

According to an embodiment of the disclosure, 1D and 2D cellular automata may use higher-order automata without restricting generality. The extension of 1D cellular automata to 2D cellular automata is important for extending the principle of the disclosure intended to generate a higher-order pattern.

A cellular automaton includes a regular lattice of sites (or cells). Each site takes on k possible values (species), and is updated in discrete time steps according to a rule that depends on the value of sites in some neighborhoods around it. The value $a_i^{t+1}$ (Equation 1) of a site at position i in 1D cellular automaton A1 depends on nearest neighbors and thus is determined by a rule that evolves according to the following equation.

There are several possible lattices and neighborhood structures for 2D cellular automata. A 5-neighbor cellular automaton evolves similarly by 1D cellular automata according to [Equation 2].

Further, in a special class of totalistic rules, the value of a site may depend on the sum of the values in the neighborhood.

$$a_{ij}^{t+1} = (a_{i-1,j}^t + a_{i,j}^t + a_{i+1,j}^t + a_{i,j-1}^t + a_{i,j+1}^t) \quad \text{[Equation 3]}$$

Figure 5A:
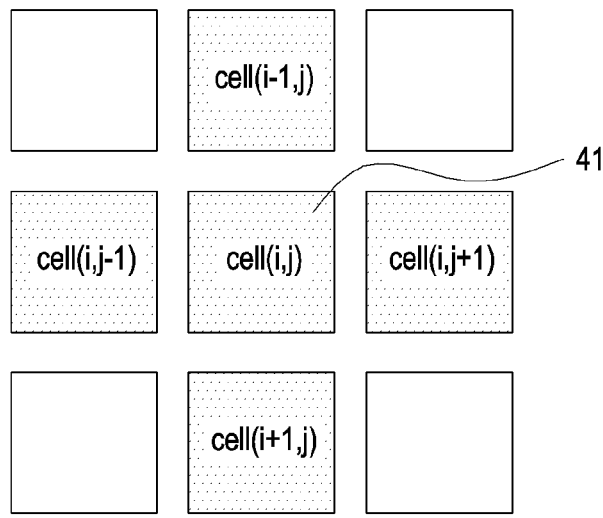
FIGS. 5A and 5B illustrate neighborhood structures considered for two-dimensional (2D) cellular automata according to various embodiments of the disclosure.
Figure 5B:
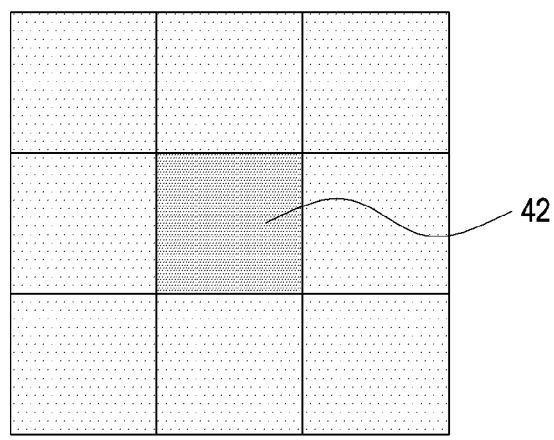

FIGS. 5A and 5B illustrate neighborhood structures considered for 2D cellular automata according to various embodiments of the disclosure.

Referring to FIGS. 5A and 5B, in cellular automaton evolution, the values of center cells 41 and 42 are updated according to a rule that depends on the values of shaded cells. A cellular automaton illustrated in FIG. 5A is referred to as a "five-neighbor square", and a cellular automaton illustrated in FIG. 5B is referred to as a "nine-neighbor square". These neighborhoods are sometimes referred to as the von Neumann neighborhood and the Moore neighborhood, respectively. Totalistic cellular automata rules take the value of the center site that depends on the sum of the values of the sites in the neighborhood. With outer totalistic rules, sites are updated according to their previous values and the sum of the values of the other sites in the neighborhood. For example, triangular and hexagonal lattices are also possible, but they are not used in the examples given here. Five-neighbor square, triangular, and hexagonal cellular automata rules may all be considered special cases of the general neighbor square rules.

Figure 6:
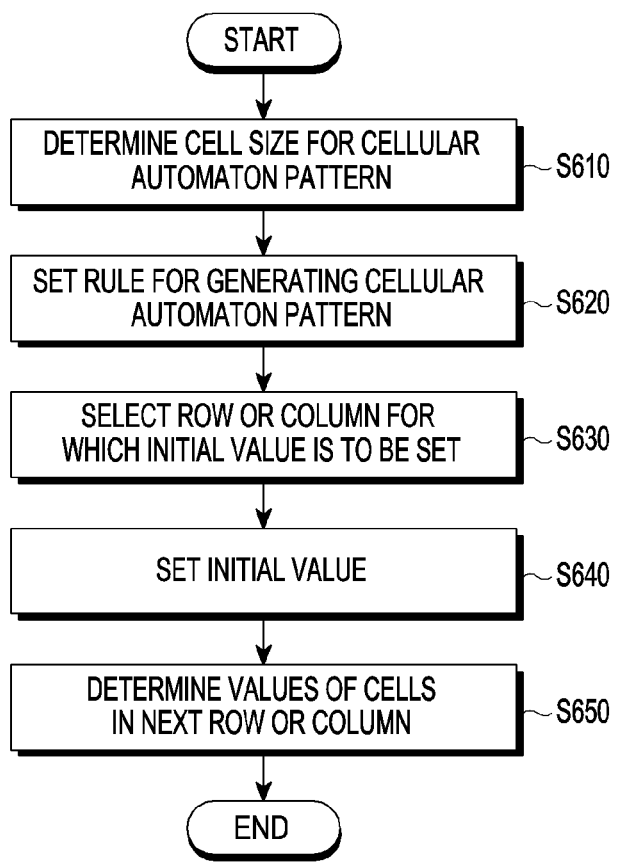
FIG. 6 is a flowchart illustrating a method of generating a different cellular automaton pattern according to an embodiment of the disclosure.

FIG. 6 is a flowchart illustrating a method of generating a cellular automaton pattern according to an embodiment of the disclosure.

First, the processor 430 determines the cell size for a cellular automaton pattern in operation S610. For example, the cell size for the cellular automaton pattern may be determined in pixels. For example, the cell size of the cellular automaton pattern may be determined to be 1×1, 2×2, and 3×3 (pixel×pixel).

Then, the processor 430 determines a rule for generating the cellular automaton pattern in operation S620, which will be described below in detail with reference to FIG. 8.

The processor 430 selects a row or column for which an initial value is to be set in operation S630. For example, the processor 430 may set the leftmost column of a 2D image with 3×3 pixels as the column for which an initial value is to be set. The row or column for which an initial value is to be set is determined to be at least one of the rows or columns of the 2D image.

The processor 430 may set the initial value in operation S640. For example, if the selected column for which an initial value is to be set includes 10 cells, the initial value may be set to 0110011100. Herein, each digit of the determined initial value corresponds to one of the cells.

The processor 430 determines the value of a row or column next to the initial row or column on the basis of the determined initial value and the determined pattern generation rule in operation S650. The next row or column to the initial row or column may be the row or column closest to the initial row or column.

The above operations S610 to 650 may be repeated until values are set for all cells of the 2D image.

While operations S610 to S650 may be performed sequentially, all of operations S610 to S650 are not necessarily performed. For example, if the initial value is set, the other operations except for the initial value setting operation S640 may be performed. An embodiment of generating a cellular automaton pattern will be described with reference to FIGS. 7 to 17.

Figures 7, 8:
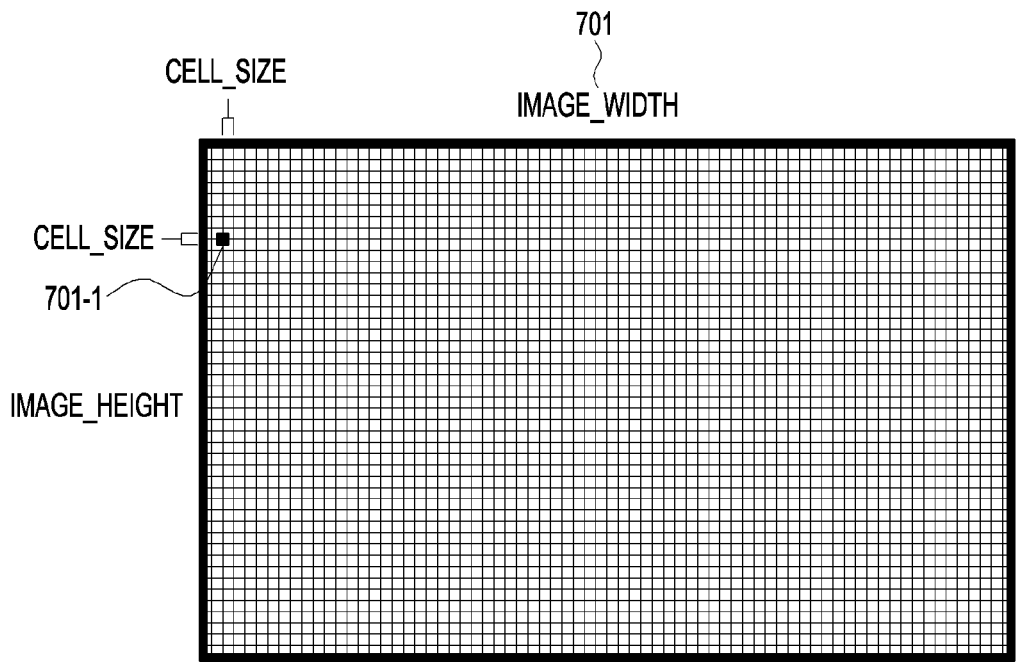
FIG. 7 illustrates a 2D image according to an embodiment of the disclosure.
FIG. 8 illustrates a rule for generating a different cellular automaton pattern according to an embodiment of the disclosure.

FIG. 7 illustrates a 2D image according to an embodiment of the disclosure.

The processor 430 may determine the cell size for a cellular automaton pattern.

Referring to FIG. 7, the width and height of a 2D image 701 are set to IMAGE_WIDTH and IMAGE_HEIGHT, respectively. In addition, the 2D image 701 includes a plurality of cells. For example, the 2D image 701 may include cells of the same size. In this case, the width and height of one cell 701-1 of the 2D image 701 may be set to CELL_SIZE. As described before, the size of one cell 701-1 in the 2D image 701 may be set in pixels.

The processor 430 may configure a rule for generating a cellular automaton pattern. The cellular automaton generation rule may be a scheme for determining the value of another cell neighboring a center cell of three contiguous cells on the basis of the values (or states) of the three contiguous cells. The three contiguous cells are included in one row or column.

FIG. 8 illustrates a rule for generating a cellular automaton pattern according to an embodiment of the disclosure.

To facilitate the description of the embodiment of the disclosure, a pattern generation rule is referred to as Rule #25. However, the rule for generating a cellular automaton pattern may also be referred to by any other name. Further, various rules may be available for generating a cellular automaton pattern, and are not limited to the following rule.

Referring to a table 801 illustrated in FIG. 8, s0 and s1 are values of a cell at the center of three contiguous cells selected from the 2D image 701. k0, k1, and k2 are sums of values of two cells on both sides of the center cell. Values 801-1, resulting from s0, s1, k0, k1, and k2, are values of a cell neighboring the center cell.

S may be defined by generalizing S0 and S1 according to [Equation 4].

$$s = S_i$$ [Equation 4]

Further, the sum of the values of two cells neighboring a cell that has the defined value s is defined as k by [Equation 5]. The cell that has the defined value s and the two neighboring cells may be contiguous in one row or column. In another example, the sum of two cells apart from the cell that has the defined value s by a predetermined number of cells may be defined as k.

$$k = \sum_{k=j, i \neq j}^{neighborhood} S_i$$ [Equation 5]

The result of applying the determined values s and k to Rule #25 801-1 may be calculated by [Equation 6].

$$S_i^{next\ epoch} = bin_{s,k} = bin_{S_i, \sum_{j, i \neq j}^{neighborhood} S_j}$$ [Equation 6]

Figures 9, 10:
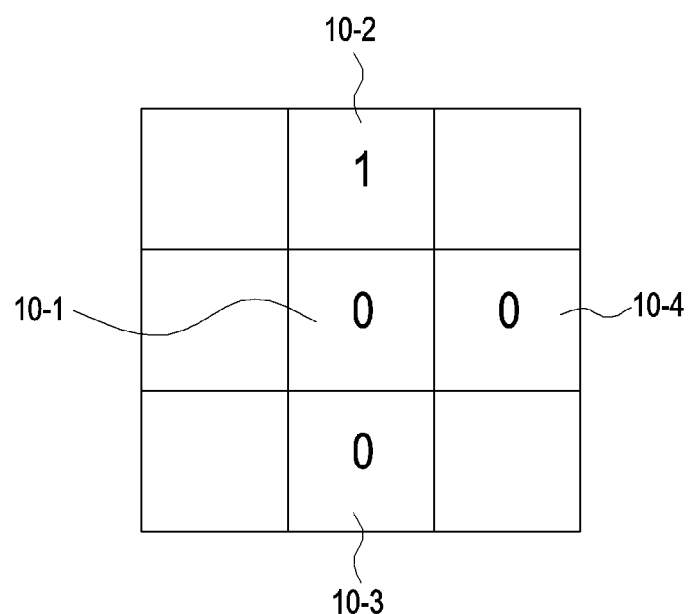
FIG. 9 illustrates contiguous cells according to an embodiment of the disclosure.
FIG. 10 illustrates adjacent cells according to an embodiment of the disclosure.

For example, referring to FIG. 9, the processor 430 may select three contiguous cells, Cell(i−1), Cell(i), and Cell(i+1) in a column of the 2D image 701. Referring to FIG. 10, the three contiguous cells, Cell(i−1), Cell(i), and Cell(i+1) are denoted by reference numerals 10-2, 10-1, and 10-3, respectively, and may have values of 1, 0, and 0, respectively. In this case, s is 0, and K is the sum of 1 and 0, that is, 1. Then, the result of applying s and k to Rule #25 801-1, $S_i^{next\ epoch}$ is 0 according to [Equation 7].

$$S_i^{next\ epoch} = 0 \text{ if } s = 0 \rightarrow s0, k = \sum_{j, i \neq j}^{2} S_j = 1 \rightarrow k1$$ [Equation 7]

The result 0 is set as the value of a cell 10-4.

According to an embodiment, Rule #25 801-1 may be defined by FIG. 71.

With reference to FIGS. 11 to 18, a detailed description will be given of a method of generating a pattern on the basis of cellular automaton generation.

Figure 11:
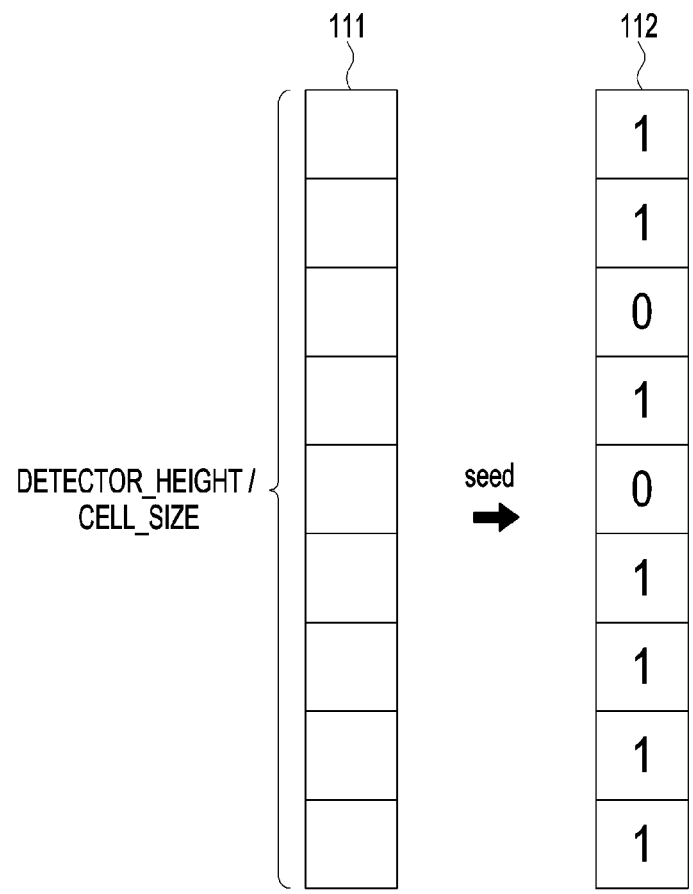
FIG. 11 is a view depicting a method of setting an initial value according to an embodiment of the disclosure.

FIG. 11 is a view depicting a method of setting an initial value according to an embodiment of the disclosure.

According to an embodiment of the disclosure, it is assumed that a 2D plane includes 9×9 cells, that is, 9 cells in a horizontal direction by 9 cells in a vertical direction. 9×9 may be determined according to the size of a detector that detects a pattern reflected from an object.

Figure 12:
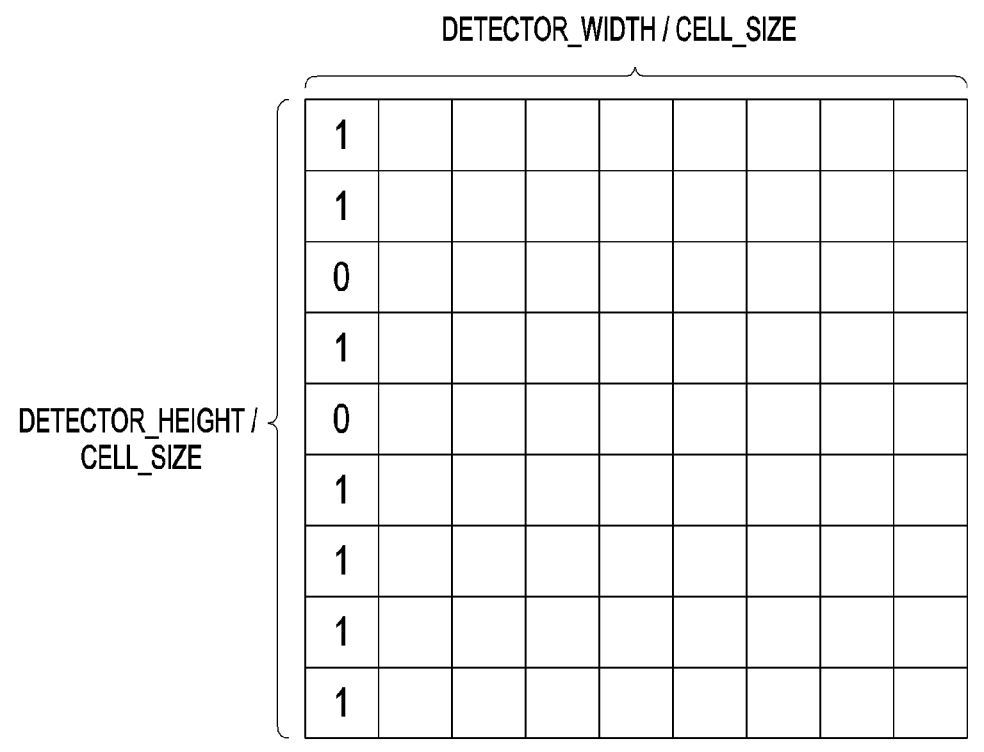

Referring to FIG. 11, the processor 430 selects one of the columns of cells included in a 2D plane, as indicated by reference numeral 111. The processor 430 may set 110101111 as an initial value for each of the cells of the selected column, as indicated by reference numeral 112. FIG. 12 illustrates the result of setting an initial value according to an embodiment of the disclosure.

FIGS. 13 to 17 illustrate a detailed cellular automaton process according to an embodiment of the disclosure.

Figure 13:
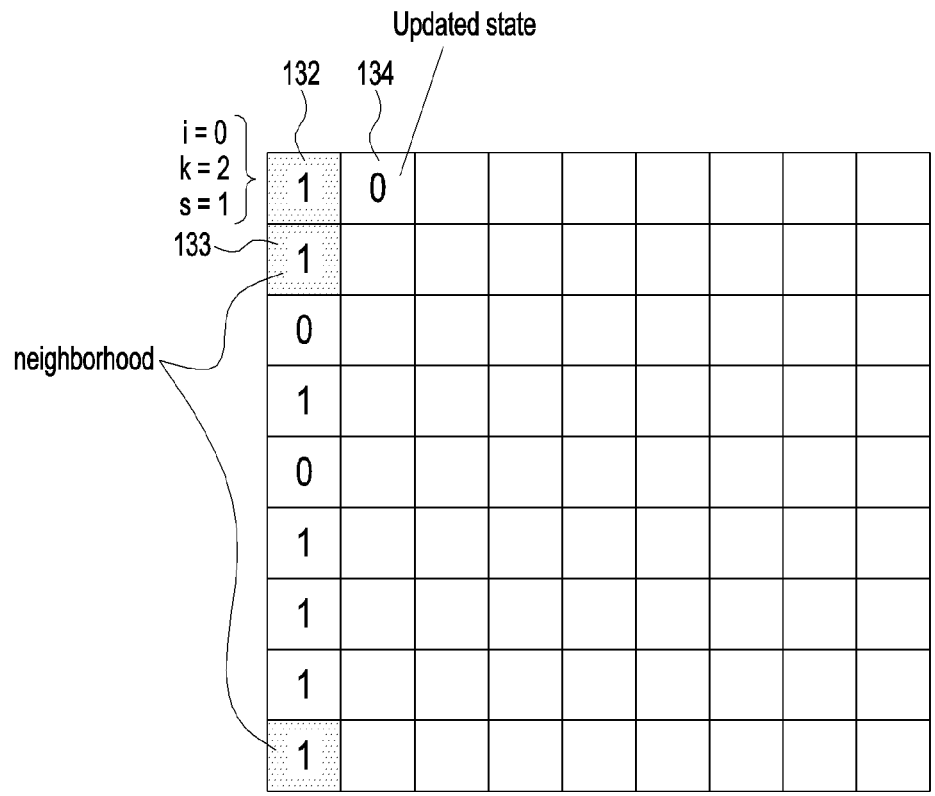

FIG. 13 illustrates a case in which index i of the uppermost cell 132 (s in Rule #25) of a selected column in a 2D image is set to 0 according to an embodiment of the disclosure. In other words, the processor 430 determines the cell 132 and neighbor cells 131 and 133 of the cell 132 to be initial targets to which Rule #25 is to be applied.

The value (or state) of the cell 132 in the middle of the three contiguous cells 131, 132, and 133 is 1. Further, the sum k of the values of the neighbor cells 131 and 133 of the cell 132 is 2. Application of s and k to Rule #25 results in an updated value (or state) 135 that is 0.

Figure 14:
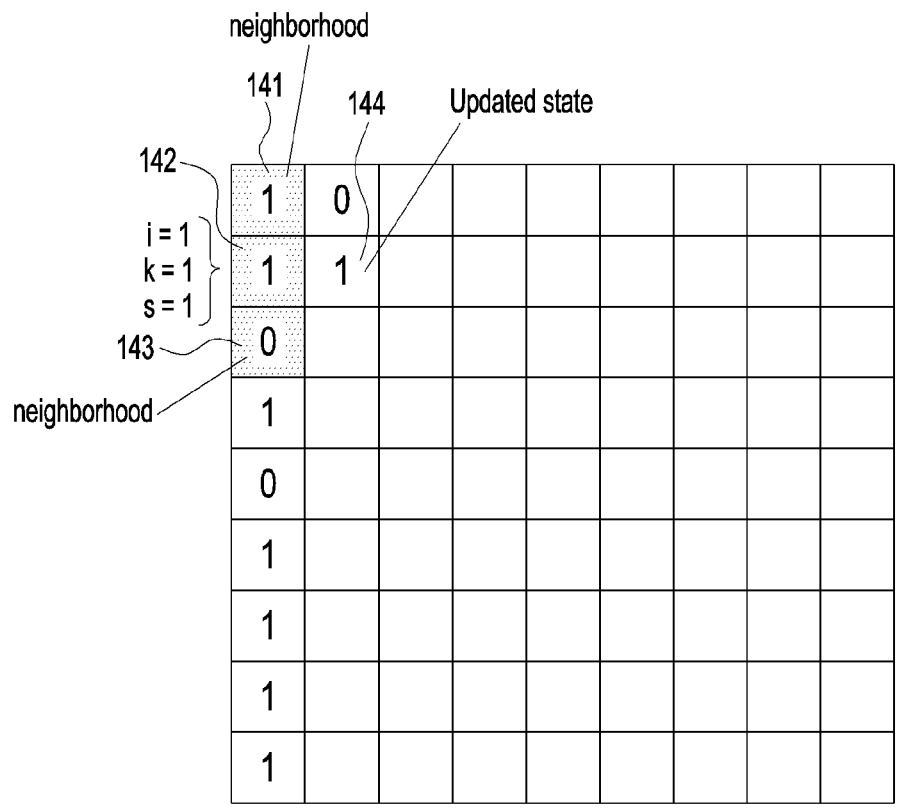

FIG. 14 illustrates an operation for index i that is 1, subsequent to the operation in FIG. 13. According to an embodiment of the disclosure, the value of a cell 142 in the middle of three contiguous cells 141, 142, and 143 is 1. In addition, the sum k of the values of the cells 141 and 143 neighboring the cell 142 is 1. An updated value 145 resulting from application of s and k to Rule #25 is 1.

FIG. 15 illustrates an operation for index i that is 2, subsequent to the operation in FIG. 14. According to an embodiment of the disclosure, the value of a cell 152 in the middle of three contiguous cells 151, 152, and 153 is 0. In addition, the sum k of the values of the cells 151 and 153 neighboring the cell 152 is 2. An updated value 154 resulting from application of s and k to Rule #25 is 1.

Figures 16A, 16B, 16C, 16D:
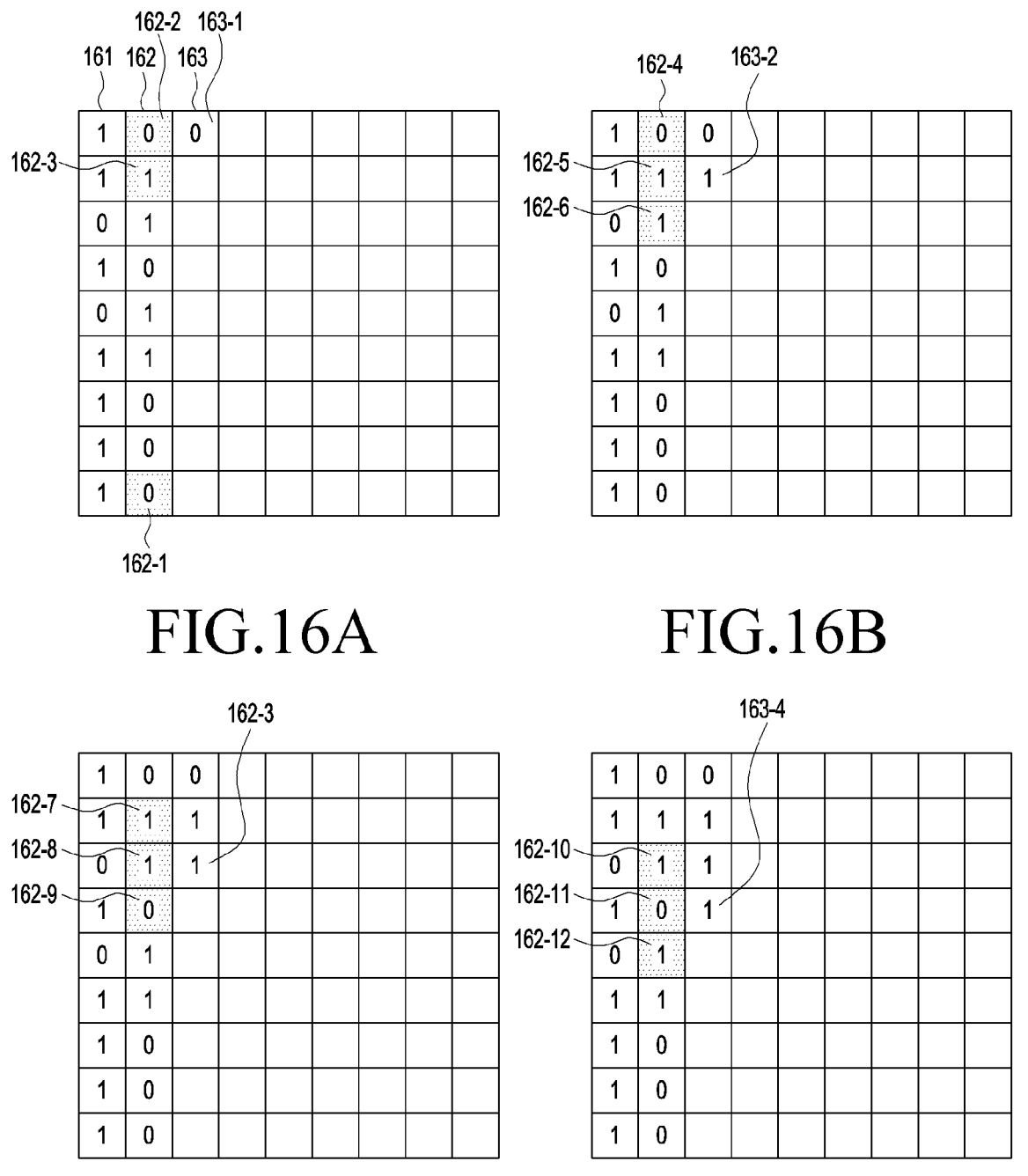

(a) of FIG. 16 illustrates a column 162 updated on the basis of a column 161 for which an initial value has been set. The contiguous cells of the updated column 162 have a value of 011011000. Further, the processor 430 may update the value of a cell 163-1 in the column 163 to 0 on the basis of updated values of contiguous cells 162-1, 162-2, and 162-3 in the updated column 162.

(b) of FIG. 16 illustrates the result of updating the value of a cell 163-2 on the basis of three contiguous cells 162-4, 162-5, and 162-6. (c) of FIG. 16 illustrates the result of updating the value of a cell 163-3 on the basis of three contiguous cells 162-7, 162-8, and 162-9. (d) of FIG. 16 illustrates the result of updating the value of a cell 163-3 on the basis of three contiguous cells 162-10, 162-11, and 162-12.

FIG. 17 illustrates a result of implementing the foregoing embodiment on the basis of the operations illustrated in FIGS. 13 to (d) of 16. Referring to FIG. 17, it may be noted that the values of all cells included in a 2D image have been updated.

The 2D image 101 is a pattern obtained by performing cellular automaton according to an embodiment of the disclosure. Since a self-pattern may be formed with a cellular automaton according to a predetermined rule, wasting memory resources and communication resources may be prevented.

Figure 18:
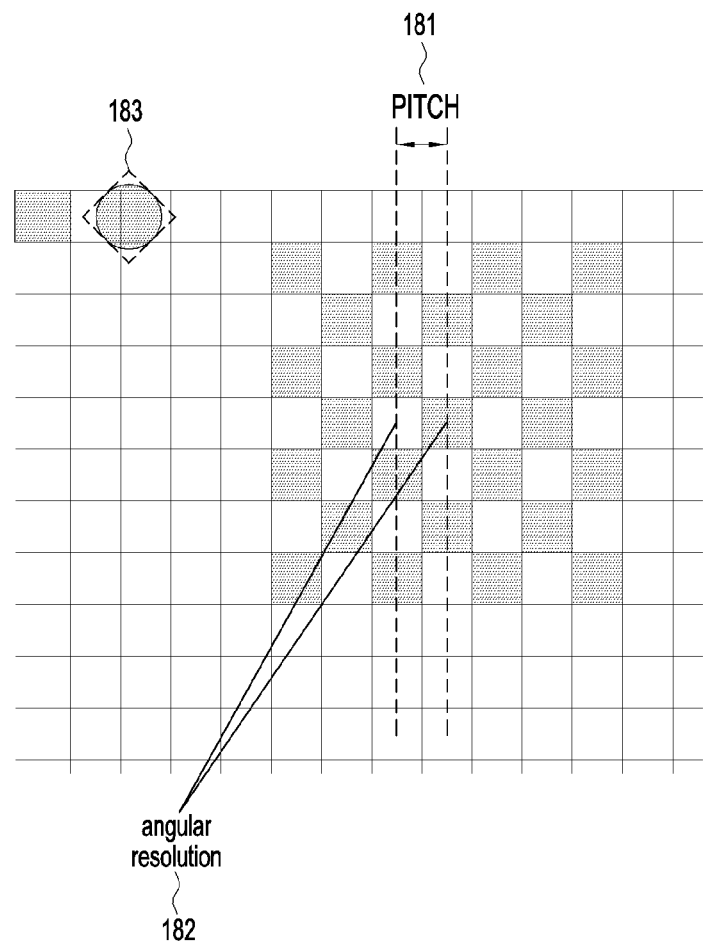
FIG. 18 is a view depicting a method of determining a pitch size for an electromagnetic field filter, and a cell size for generating a cellular automaton according to an embodiment of the disclosure.

FIG. 18 is a view depicting a method of determining the pitch size for an electromagnetic field filter, and the cell size for generation of a cellular automaton according to an embodiment of the disclosure.

It is assumed that parameters IMAGE_HEIGHT and IMAGE_WIDTH, which represent the size of a 2D image, are preset.

Each angular resolution AREsc 182 of a lens system in a detector using a viewing angle parameter FOVc is determined by [Equation 9].

$$ARESc = \frac{CEE_{SIZE} * FOVc}{\sqrt{DETECTOR\_HEIGHT^2 + DETECTOR\_WIDTH^2}} \quad \text{[Equation 9]}$$

Each angular resolution, AREsp of a filter using a viewing angle parameter FOVp is determined by [Equation 10].

$$ARESp = \frac{PITCH * FOVp}{\sqrt{FILTER\_HEIGHT^2 + FILTER\_WIDTH^2}} \quad \text{[Equation 10]}$$

If AREsc and AREsp are equal, the pitch size 181 for an electromagnetic field filter is determined on the basis of [Equation 11] according to [Equation 9] and [Equation 10].

$$\frac{PITCH}{CELL_{SIZE}} = \frac{\sqrt{FILTER\_HEIGHT^2 + FILTER\_WIDTH^2}}{\sqrt{DETECTOR\_HEIGHT^2 + DETECTOR\_WIDTH^2}} * FOVc/FOVp \quad \text{[Equation 11]}$$

Further, the cell size for the cellular automaton is determined by [Equation 12].

$$IMAGE\_HEIGHT = CELL\_SIZE/PITCH * FILTER\_HEIGHT;$$

$$IMAGE\_WIDTH = CELL\_SIZE/PITCH * FILTER\_WIDTH; \quad \text{[Equation 12]}$$

In addition, the processor 430 may map the positions of cellular automaton cells according to the filter pitch size so that the center of a feature (I, J) of a filter array is equal to (j*IMAGE_WIDTH/CEll$_{SIZE}$+I)*FILTER_HEIGHT/PITCH.

Further, the processor 430 may design the shape of a pattern according to a modification to the size of a diffracted image at a corner of a rectangle, as indicated by reference numeral 183. In this case, the radius of the corner may be set to 1.22*PITCH, FIG. 19 illustrates a 2D image according to an embodiment of the disclosure.

Figure 19:
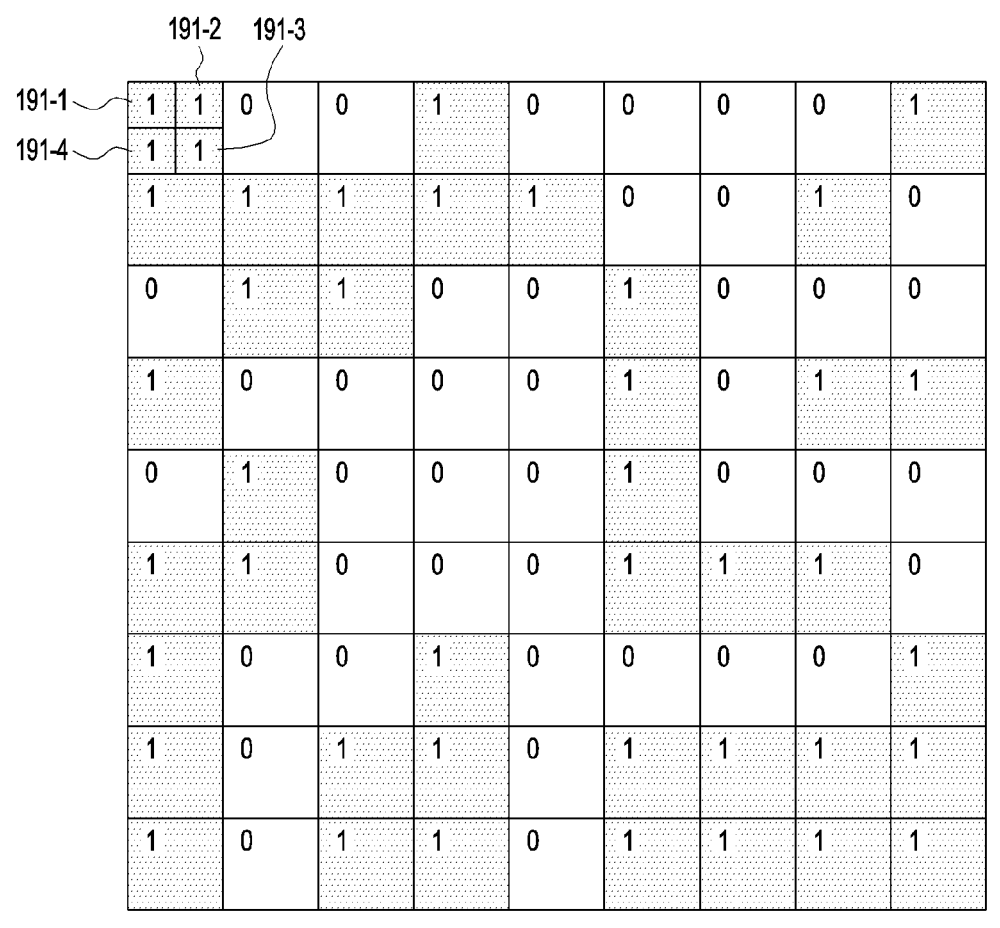

Referring to FIG. 19, the 2D image 191 is an image for which a pixel configuration has been considered. For example, a first cell in the top left position in FIG. 17, having a value of 1, may include 4 pixels (2×2 pixels). To represent the value of 1 for the first cell in the top left position in FIG. 17, all of pixels 191-1 to 191-4 may be 1 in the 2D image 191.

Figure 20:
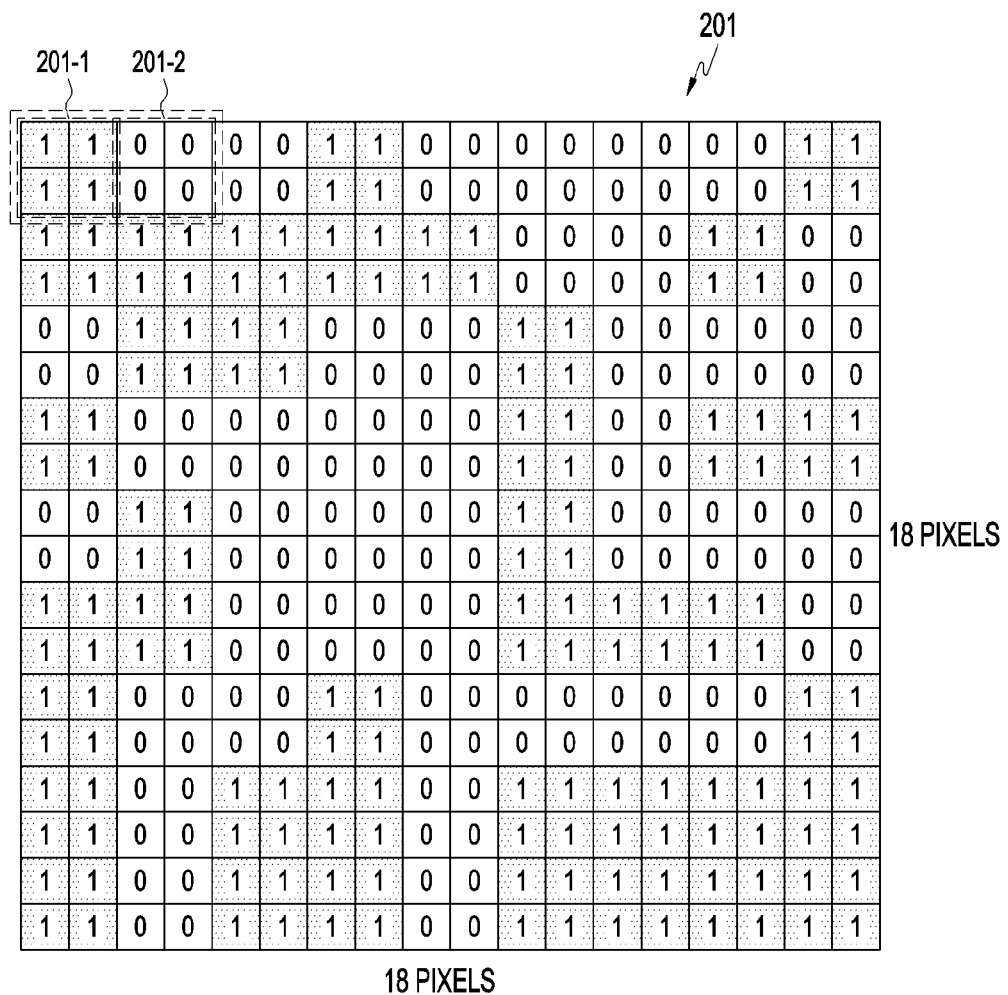
FIG. 20 illustrates a 2D image according to another embodiment of the disclosure.

FIG. 20 illustrates a 2D image according to another embodiment of the disclosure.

Referring to FIG. 20, a 2D image 201 includes 18×18 pixels. In the 2D image 201, one cell may be represented by four pixels. For example, four pixels 201-1 included in the 2D image 201 may represent the value 1 of a first cell in the top left position in FIG. 17. In another example, four other pixels 201-2 included in the 2D image 201 may represent the value 0 of a second cell to the left of the first cell located in the top left position in FIG. 17.

Figure 21:
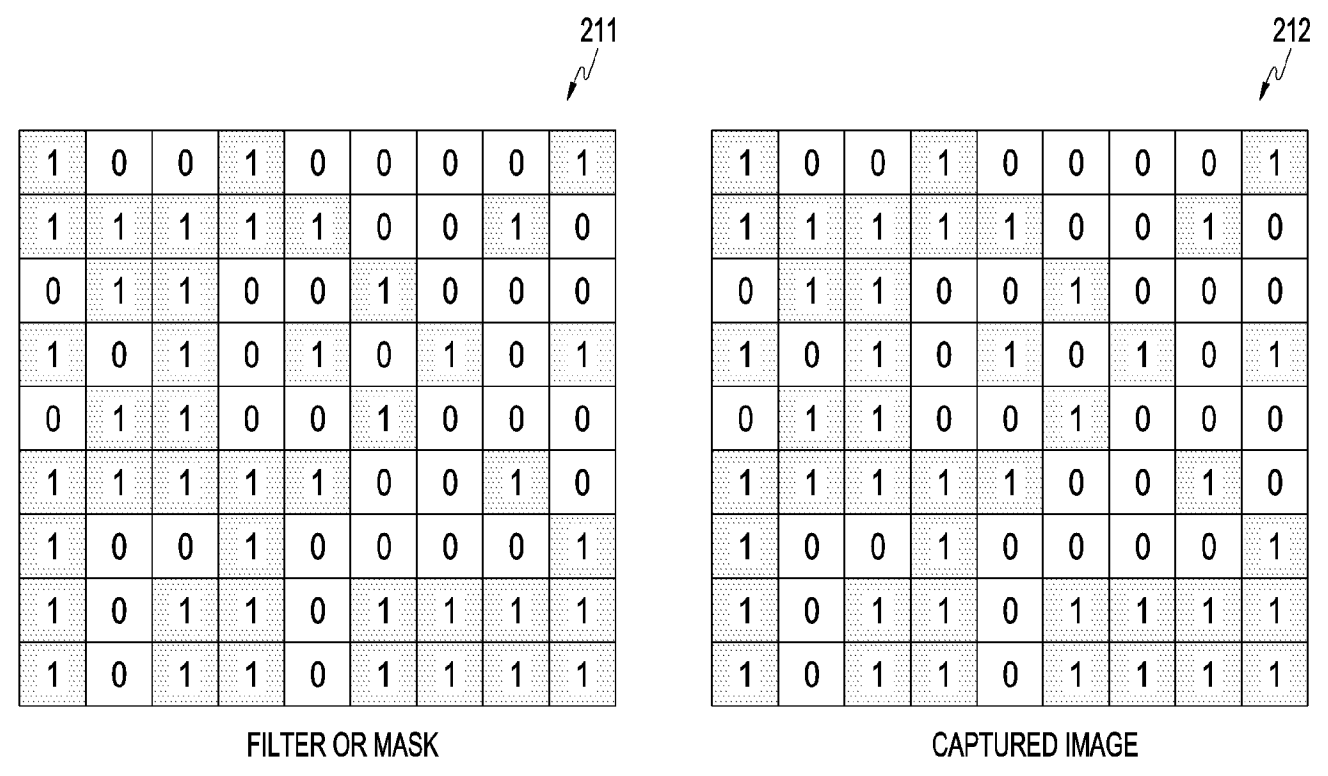

FIG. 21 illustrates a process of projecting and capturing a cellular automaton pattern according to an embodiment of the disclosure.

FIG. 21 illustrates an embodiment in which a pattern 211 generated with a cellular automaton (hereinafter, referred to as a cellular automaton pattern) is projected onto a plane with a zero depth disparity across a total area. The depth disparity may be defined as the distance between a light projector that projects a cellular automaton pattern and the plane.

Referring to FIG. 21, the cellular automaton pattern 211 includes a pattern generated with a cellular automaton. As light projected by the light projector passes through a filter or mask, the cellular automaton pattern 211 may be generated.

For example, the processor 430 may project the cellular automaton pattern 211 onto the plane with zero depth disparity across the total area by means of the light projector and the filter or mask.

In this case, a reflected cellular automaton pattern 212 has the depth parity of 0 across its total area, and thus may be identical to the cellular automaton pattern 211.

Figure 22:
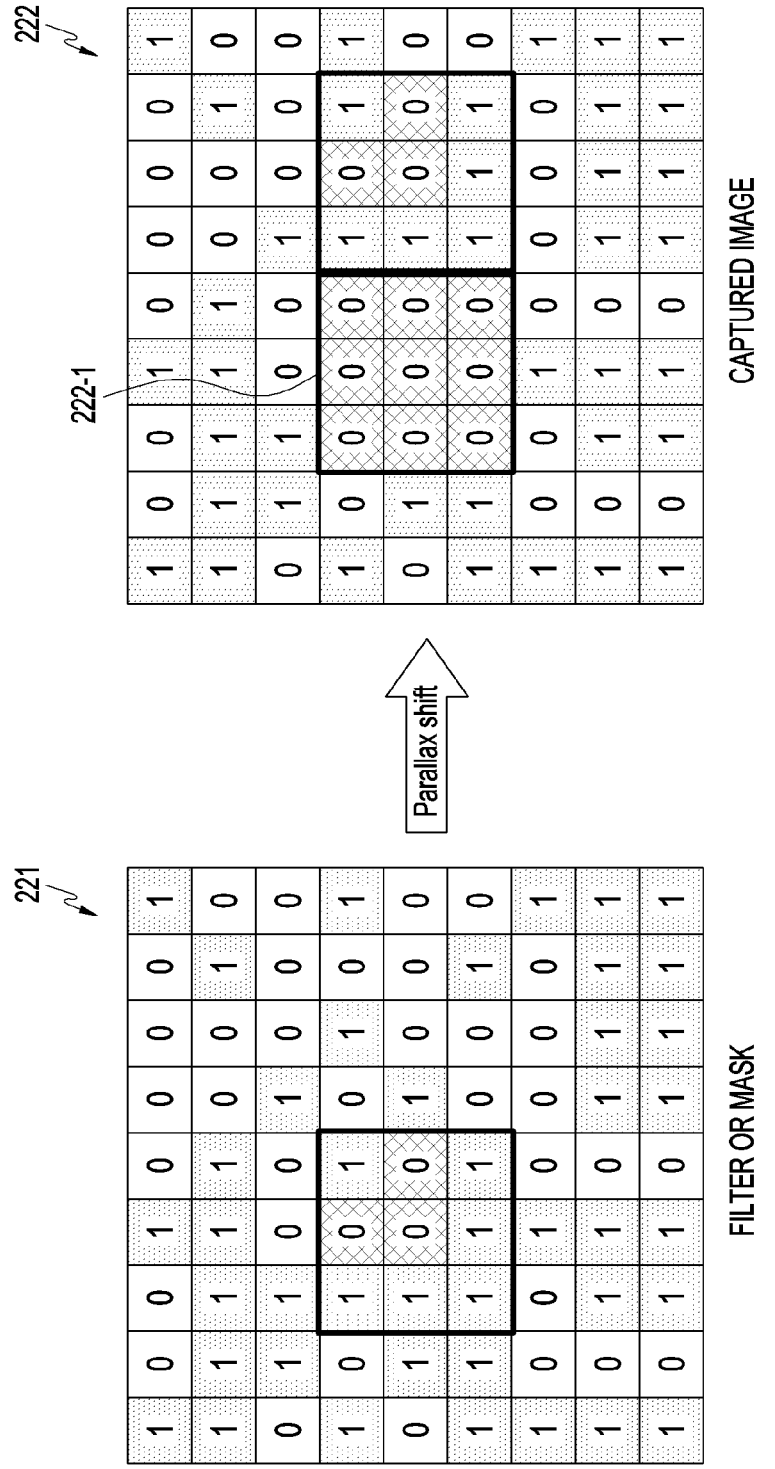
FIG. 22 illustrates a process of projecting and capturing a cellular automaton pattern according to another embodiment of the disclosure.

FIG. 22 illustrates a process of projecting and capturing a cellular automaton pattern according to another embodiment of the disclosure.

In the illustrated case of FIG. 22, a cellular automaton pattern is projected to a 3D space with a non-zero depth disparity.

A light projector for projecting a cellular automaton pattern 221 may be set apart from a camera (a detector or a light receiving unit) for capturing a pattern reflected from a space by a predetermined distance. For example, the light projector and the camera may be provided on one surface of a terminal, set apart from each other by a predetermined gap. Thus, the angle at which the cellular automaton pattern 221 is projected from the light projector onto an object in a 3D space is different from the angle at which the cellular automaton pattern 221 is reflected from the object and received at the camera. Therefore, the cellular automaton pattern 221 reflected from the object may be shifted in a predetermined direction.

For example, the processor 430 may project the cellular automaton pattern 221 to the 3D space. Herein, the captured pattern 222 of the cellular automaton pattern 221 reflected from the object may be shifted in a predetermined direction (parallax shift in FIG. 22). Herein, the size of the area 222-1 from which the cellular automaton pattern 221 has been shifted is depth information between the camera and the object.

Figure 23:
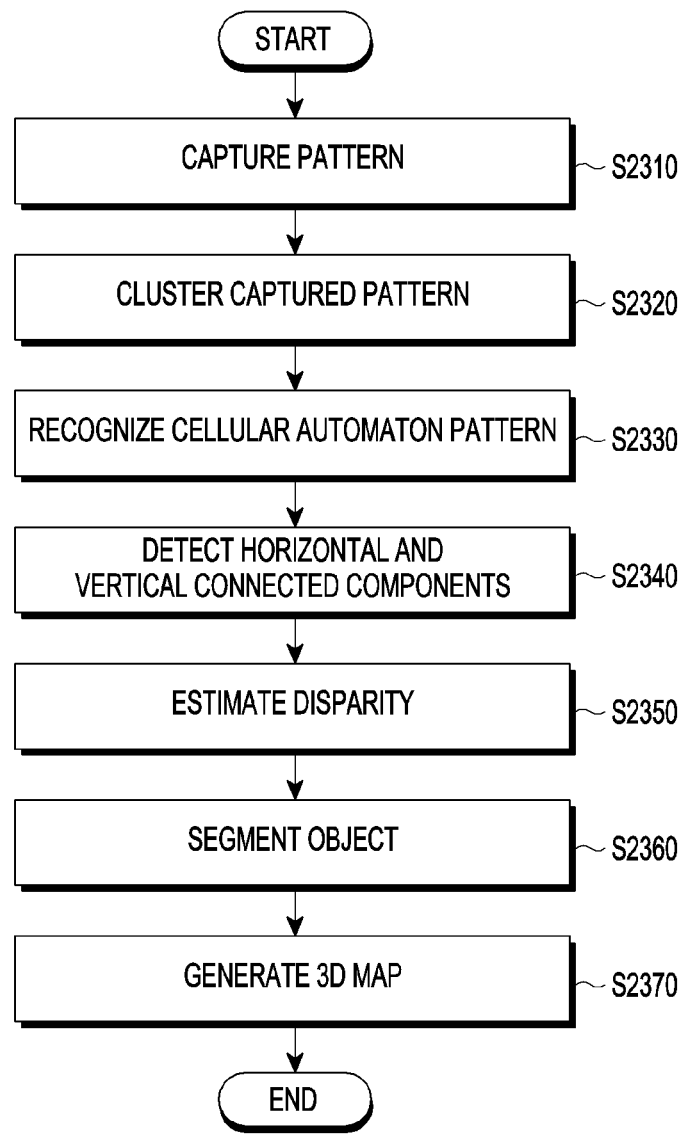
FIG. 23 is a flowchart illustrating a method of decoding a cellular automaton pattern according to an embodiment of the disclosure.

FIG. 23 is a flowchart illustrating a method of decoding a cellular automaton pattern according to an embodiment of the disclosure.

The processor 430 captures the cellular automaton pattern that has been projected and then reflected in operation S2310. Further, the processor 430 determines the values of cells included in the cellular automaton pattern by clustering the captured cellular automaton pattern, and then recognizes the cellular automaton pattern in operations S2320 and S2330. For example, the value of each cell in the cellular automaton pattern may be determined to be 0 or 1. In another example, the value of each cell in the cellular automaton pattern may be selected from among 0 and positive integers. The processor 430 detects horizontal and vertical connected components of the clustered pattern in operation S2340. The processor 430 estimates depth disparity on the basis of the horizontal and vertical connected components in operation S2350. The processor 430 performs object segmentation on the basis of the estimated depth disparity. The processor 430 generates a 3D map in operation S2370.

Figure 24A:
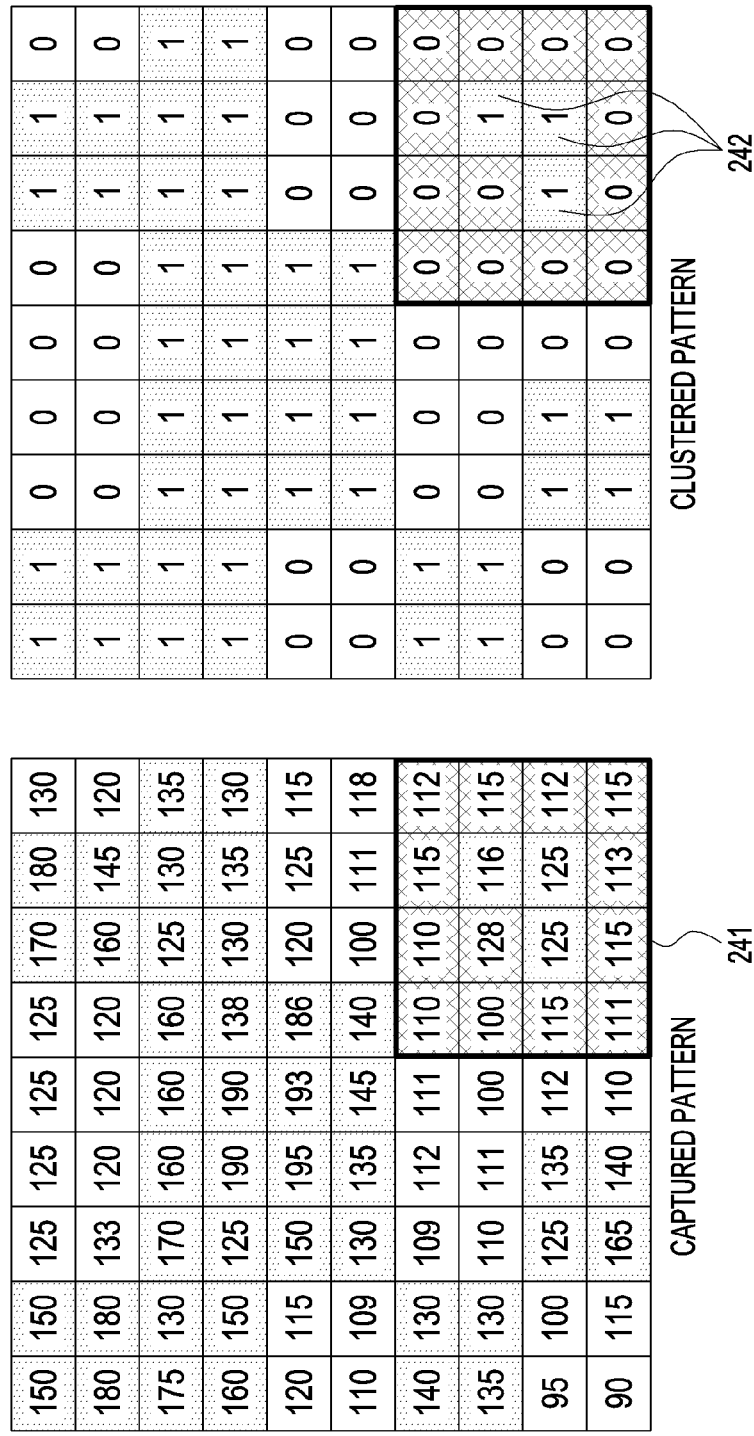
FIGS. 24A and 24B illustrate a clustering method according to an embodiment of the disclosure.
Figure 24B:
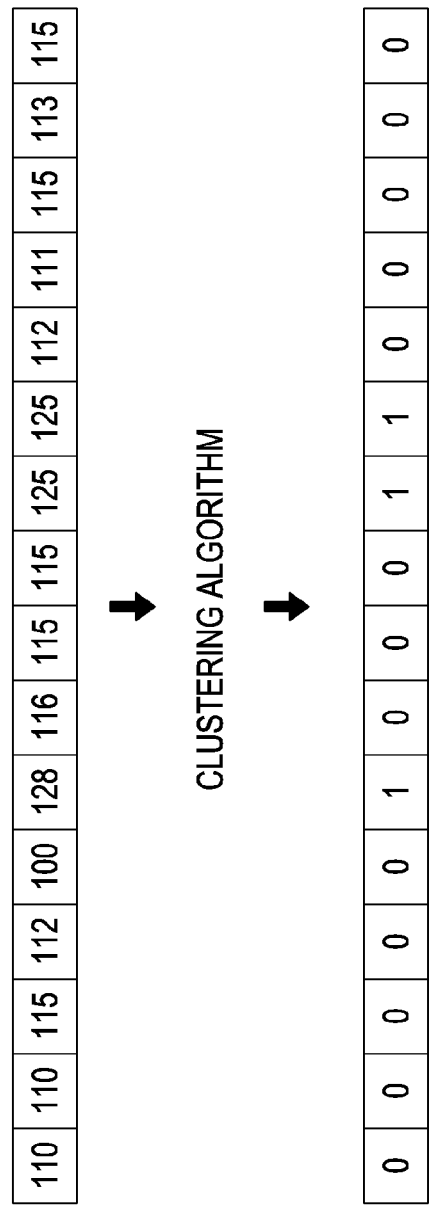

FIGS. 24A and 24B illustrate a clustering method according to an embodiment of the disclosure.

In FIG. 24A, the left pattern is an example of a captured cellular automaton pattern. The captured cellular automaton pattern has pixel values (0 to 255 or above).

The processor 430 may perform clustering on the basis of the cluster window CLUSTER_WINDOW of a predetermined size. Referring to the left pattern of FIG. 24A, the processor 430 performs clustering on the basis of a 4×4 cluster window 2*CELL_SIZE*2*CELL_SIZE.

Referring to FIG. 24B, the processor 430 may cluster the value of each pixel within the cluster window to 0 or 1 by a clustering algorithm (e.g., a K-means algorithm).

The right pattern in FIG. 24A is the clustered result. Herein, a part 242 of the values within the cluster window may be different from values of the projected cellular automaton pattern. This error may be caused by pixel blending, data loss, and so on.

FIGS. 25A to 25E illustrate clustered results according to an embodiment of the disclosure.

FIG. 25A illustrates the result of capturing a cellular automaton pattern with each cell mapped to 2×2 pixels and clustering the captured cellular automaton pattern. For example, four pixel values 252 to 254 may be mapped to one cell.

FIG. 25B illustrates the values of the top left pixels of the cells, each mapped to four pixels, FIG. 25C illustrates the values of the top right pixels of the cells, each mapped to four pixels, FIG. 25D illustrates the values of the bottom left pixels of the cells, each mapped to four pixels, and FIG. 25E illustrates the values of the bottom right pixels of the cells, each mapped to four pixels.

FIGS. 26A to 26F illustrate a method of recognizing a cellular automaton pattern according to an embodiment of the disclosure.

According to an embodiment, the method of recognizing a cellular automaton pattern uses the foregoing method of generating a cellular automaton pattern.

Figures 26A, 26B:
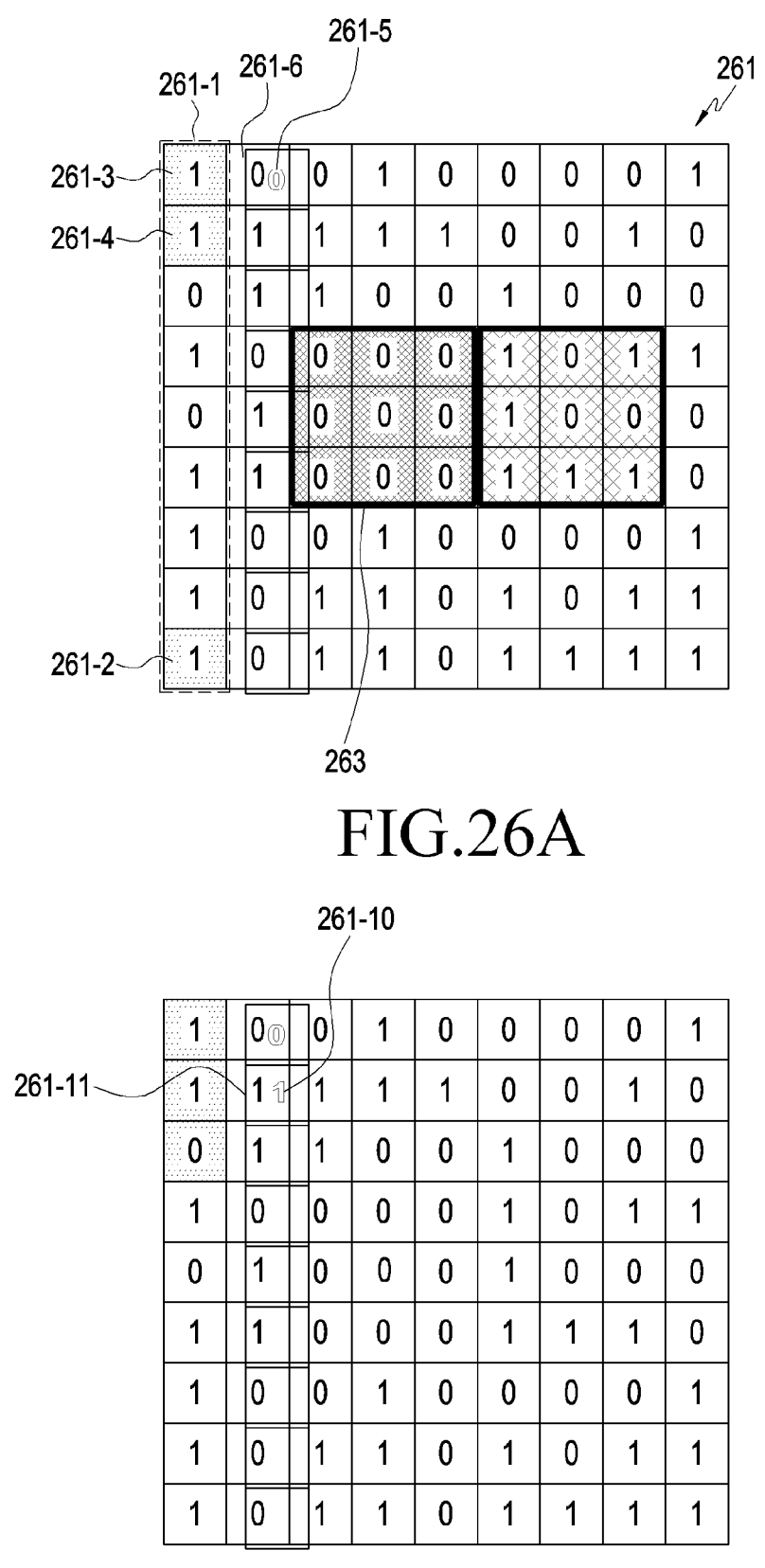

FIG. 26A illustrates a clustered cellular automaton pattern 261. The clustered cellular automaton pattern 261 may include a shadow area 263 due to object-incurred shifting.

The processor 430 may recognize the clustered cellular automaton pattern 261 by comparing the clustered cellular automaton pattern 261 with a pattern generated with a cellular automaton on the basis of an initial value.

For example, the processor 430 may perform a cellular automaton process by using the clustered value 110101111 of a first column 261-1 in the cellular automaton pattern 261 as an initial value. Herein, the cellular automaton process is identical to the foregoing example of cellular automaton pattern generation. The processor 430 may obtain a value of 0 by applying values 261-2, 261-3, and 261-4 of the first column 261-1, which are 1 in the cellular automaton pattern 261 to Rule #25. The processor 430 may compare the obtained value 261-5, which is 0 (it may be stored in a temporary array of the memory), with a clustered value 262-6 which is 0.

Then, the processor 430 in FIG. 26B may obtain a value 261-1, which is 1, by applying values 1, 1 and 0 (in a highlighted area) of the first column 261-1 in the cellular automaton pattern 261 to Rule #25. The processor 430 may compare the obtained value 261-10, which is 1, with a clustered value 262-11 which is 0.

Figure 26C:
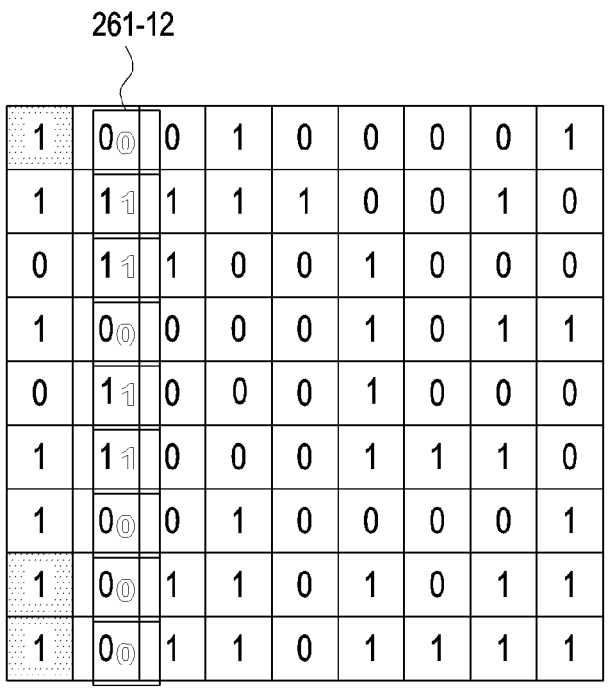

FIG. 26C illustrates the result 261-12 of repeating the above-described operation for the first column 261-1 of the cellular automaton pattern 261.

Figure 26D:
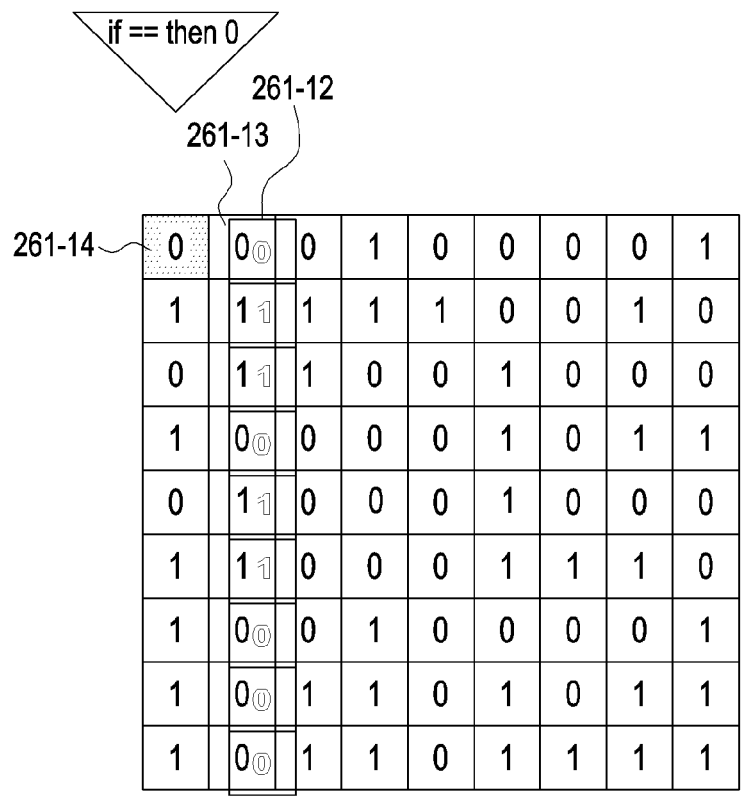

FIG. 26D illustrates a method of comparing the result 261-12 with a second column 261-13 of the cellular automaton pattern 261. For example, since the first value 0 of the result 261-12 is equal to the first value 0 of the second column 261-13, the processor 430 sets the value of the first cell of a current column 261-14 to 0.

Figures 26E, 26F:
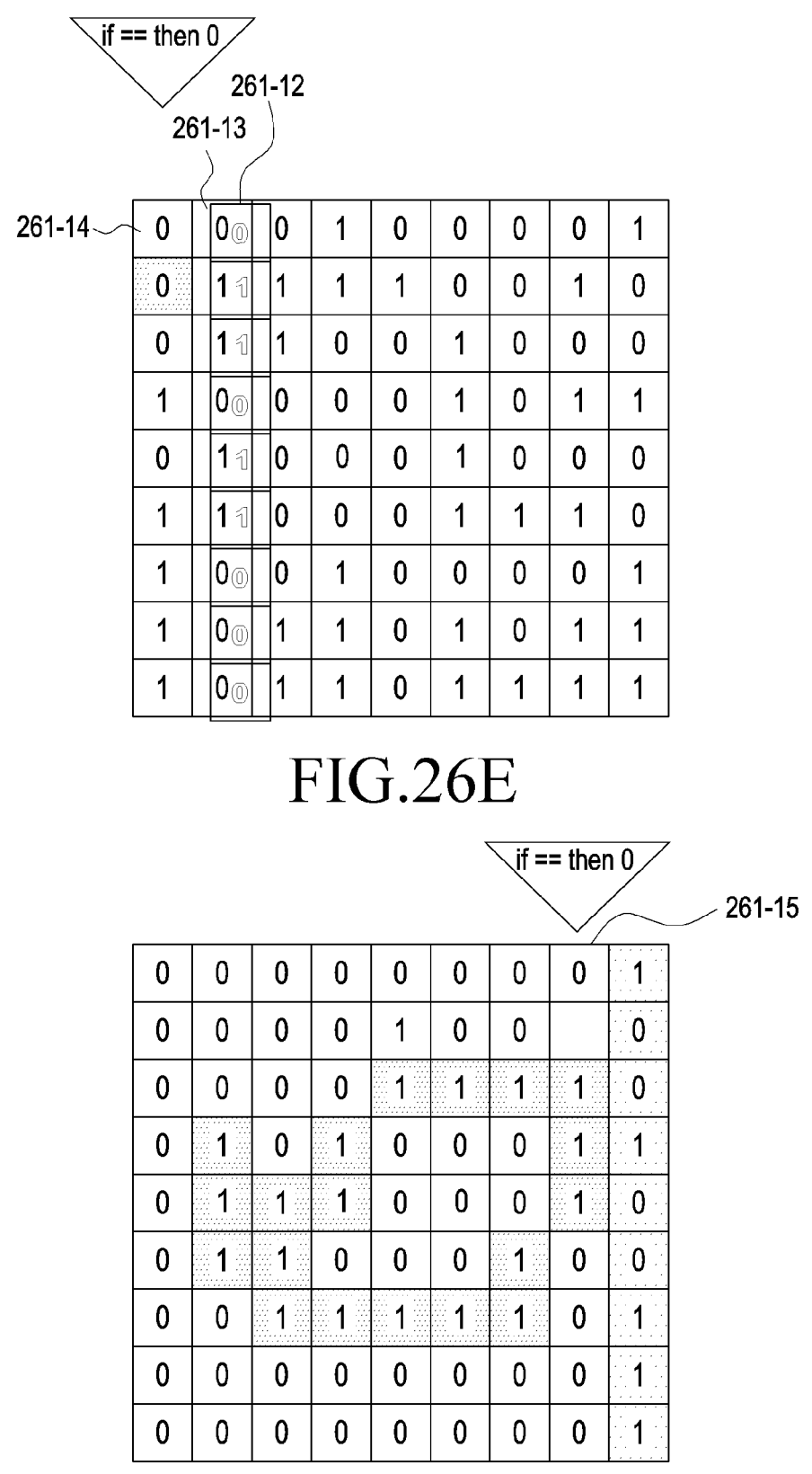

Then, as illustrated in FIG. 26E, since the second value 1 of the result 261-12 is equal to the second value 0 of the second column 261-13, the processor 430 sets the value of the second cell of the current column 261-14 to 0.

FIG. 26F illustrates the result of applying the operations described in reference to FIGS. 26A to 26E to up to the $8^{th}$ column 261-15 of the cellular automaton pattern 261.

FIG. 27 illustrates indexes of a cellular automaton pattern according to an embodiment of the disclosure. Specifically, FIG. 27 illustrates a vertical disjoint set 271 and a horizontal disjoint set 272 for cell indexes of a cellular automaton pattern.

Figure 28:
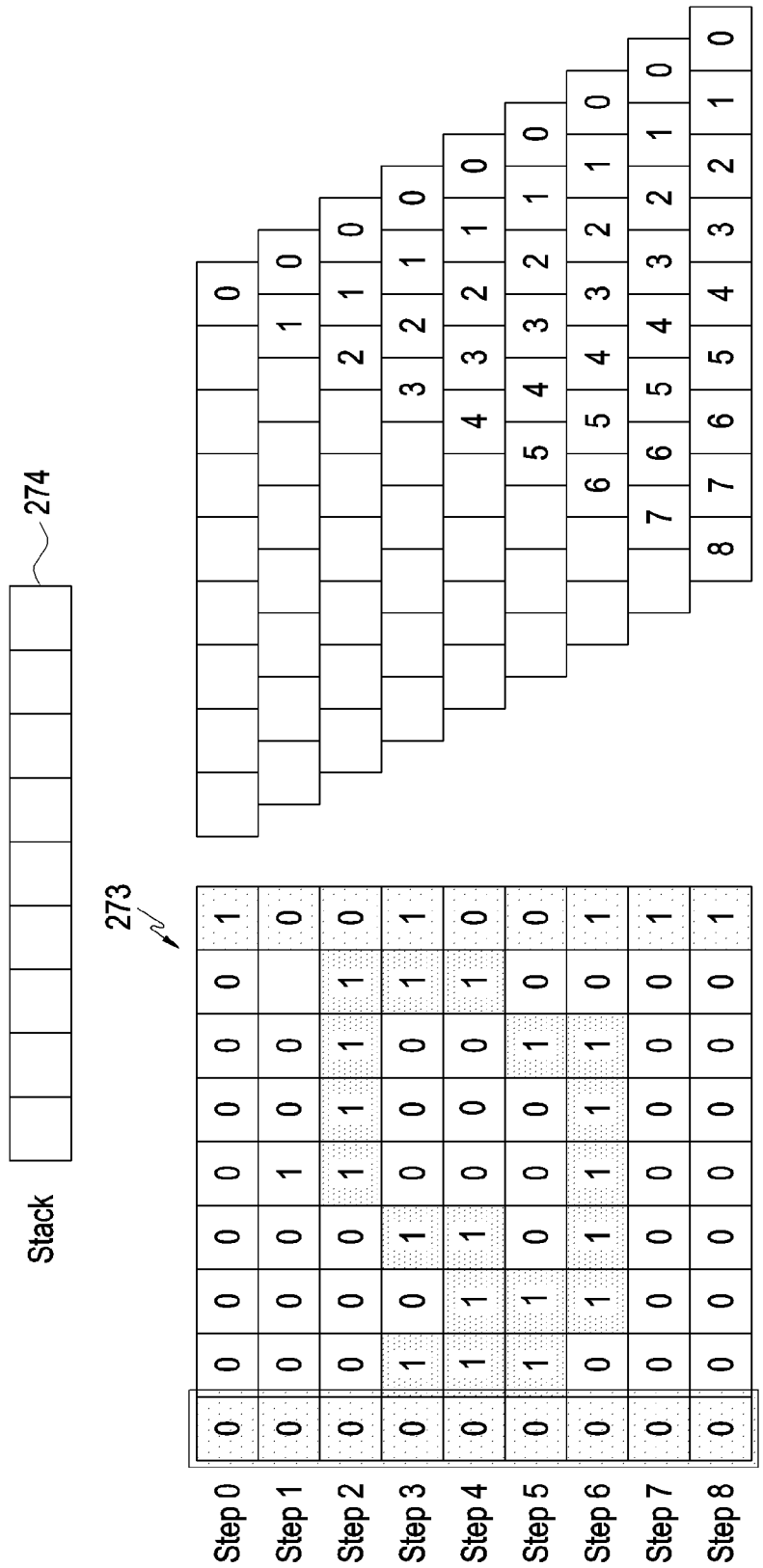
FIG. 28 illustrates a method of processing indexes in a cellular automaton pattern according to an embodiment of the disclosure.

FIG. 28 illustrates a method of processing indexes of a cellular automaton pattern according to an embodiment of the disclosure. Specifically, FIG. 28 illustrates a process of sequentially inserting the indexes of the first column of a cellular automaton pattern 273 into a memory stack 274.

FIGS. 29A to 29H illustrate a method of detecting horizontal and vertical connected components according to an embodiment of the disclosure.

Figure 29A:
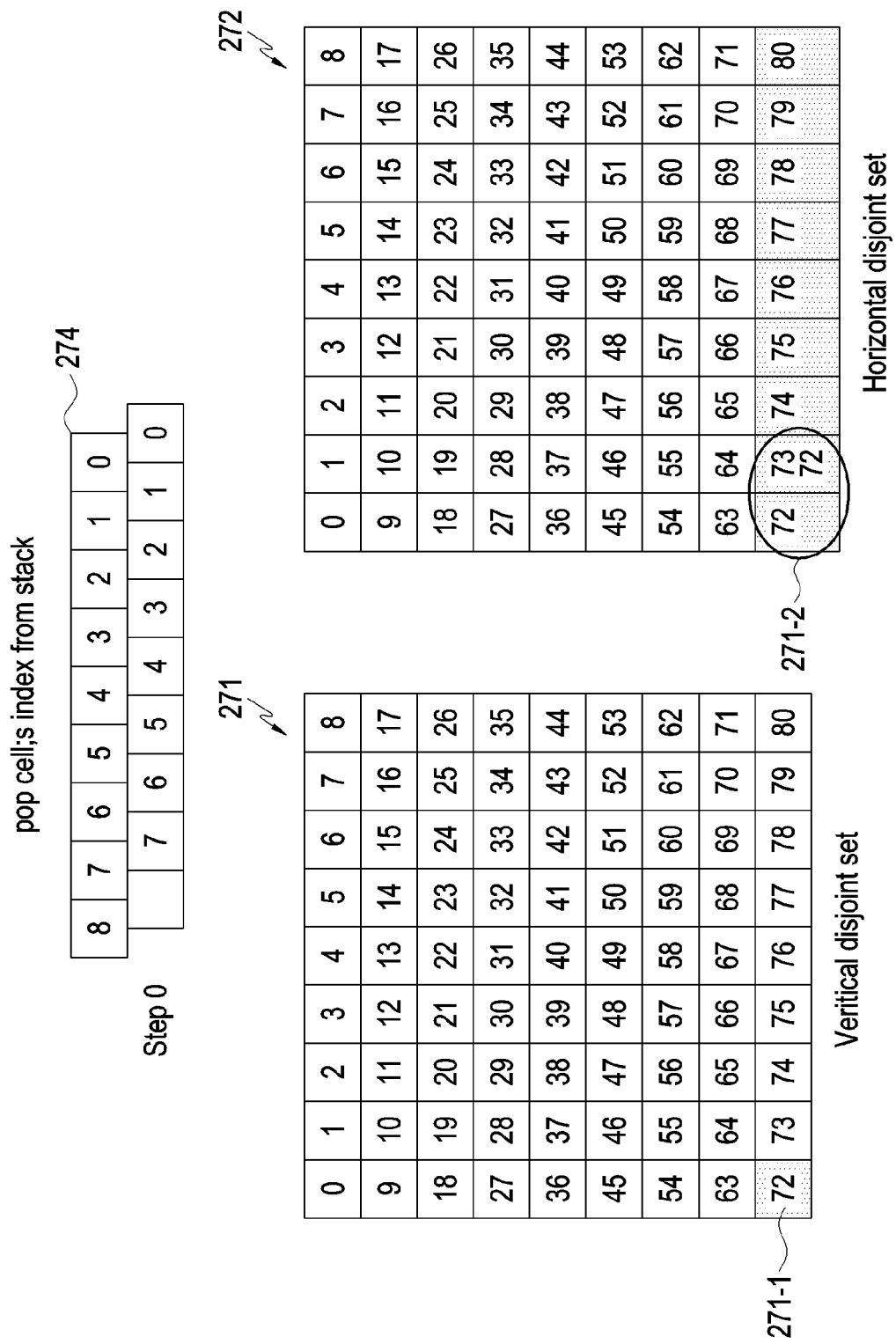

Referring to FIG. 29A, the processor 430 acquires order 8 of a cell 271-1 from a stack 274. Further, the processor 430 may acquire index i of the cell 271-1, that is, 72 (=8×9) by [Equation 13].

$$i = n \frac{\text{DETECTOR}_{WIDTH}}{\text{CELL}_{SIZE}} + C_i, \quad \text{[Equation 13]}$$

$$\left( C_i \text{ — column index}, o \leq C_i < \frac{\text{DETECTOR}_{WIDTH}}{\text{CELL}_{SIZE}} \right)$$

The processor 430 detects cells 271-1 and 271-2 with index 72 from the vertical disjoint set 271 and the horizontal disjoint set 272, respectively. Further, the processor 430 defines, as 72, a parent index for the vertical disjoint set 271 and the horizontal disjoint set 272. The processor 430 merges the cell with index 72 in the vertical disjoint set 271 with up to a cell with parent index 72. The processor 430 merges the cell with index 72 in the horizontal disjoint set 272 with up to a cell with index 73 (=72+1).

Figure 29B:
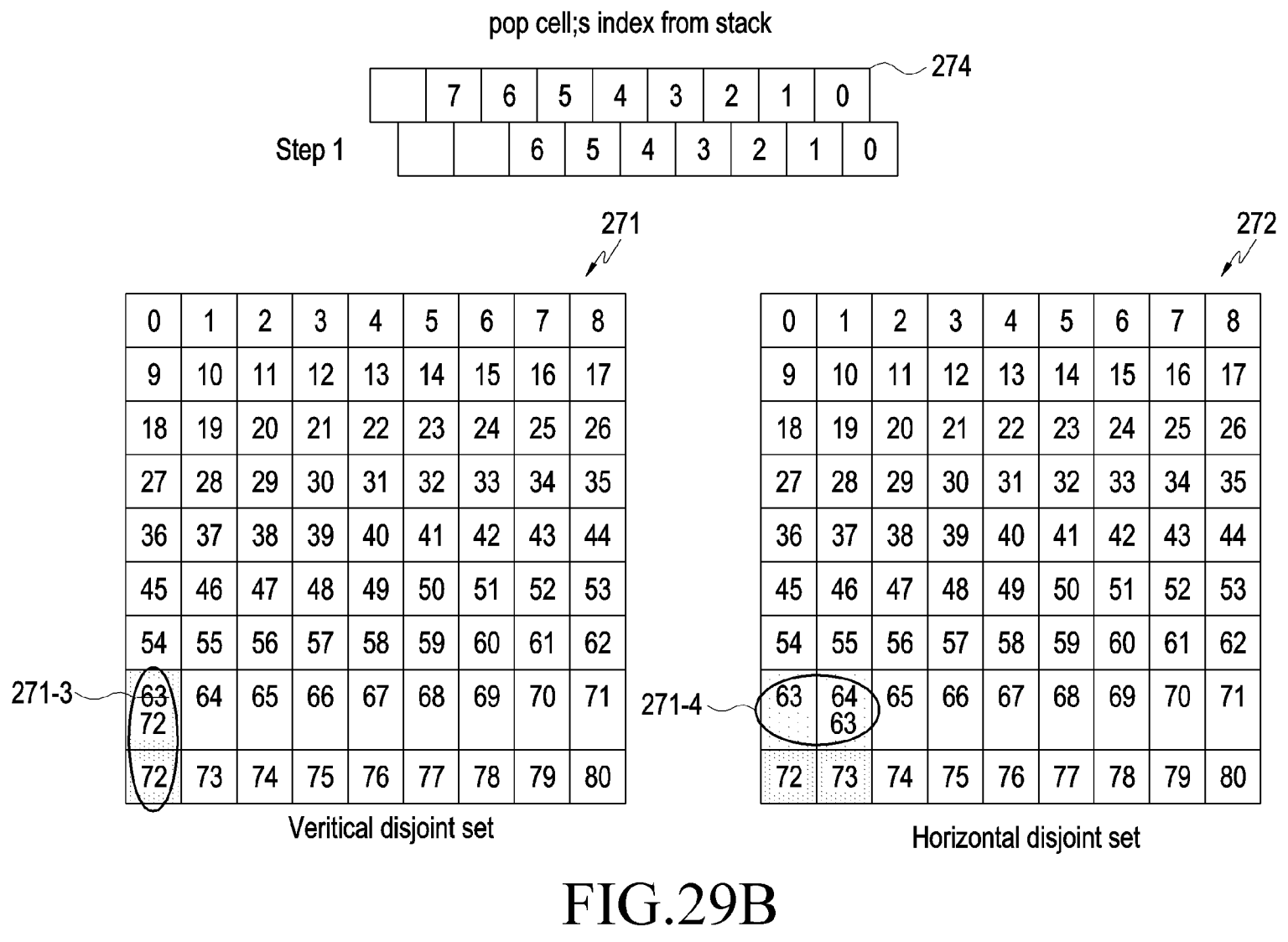

The processor 430 may repeat the operation described with reference to FIG. 29A for the next cell. Referring to FIG. 29B, the processor 430 acquires order 7 of the cell 271-1 from the stack 274. In addition, the processor 430 may acquire index i of the cell 271-1, that is, 63 (=7×9) by [Equation 13]. The processor 430 detects cells 271-3 and 271-4 with index 63 from the vertical disjoint set 271 and the horizontal disjoint set 272, respectively. Further, the processor 430 defines, as 72, the parent index for the vertical disjoint set 271 and the horizontal disjoint set 272. The processor 430 merges the cell with index 63 in the vertical disjoint set 271 with up to the cell with parent index 72. The processor 430 merges the cell with index 63 in the horizontal disjoint set 272 with up to the cell with index 64 (=63+1). The result of completing the above operation for the first columns of the vertical disjoint set 271 and the horizontal disjoint set 272 is illustrated in FIG. 29C.

Figure 29D:
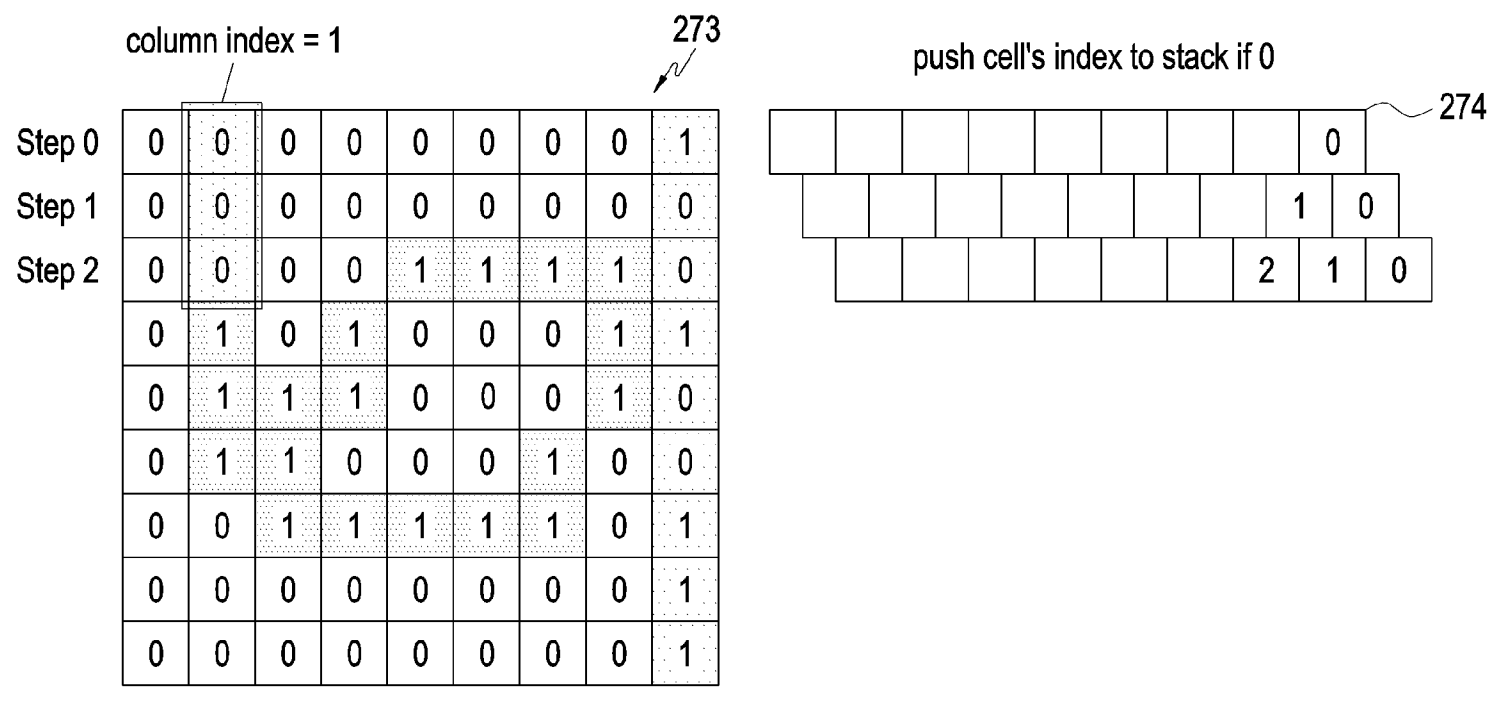
Figure 29E:
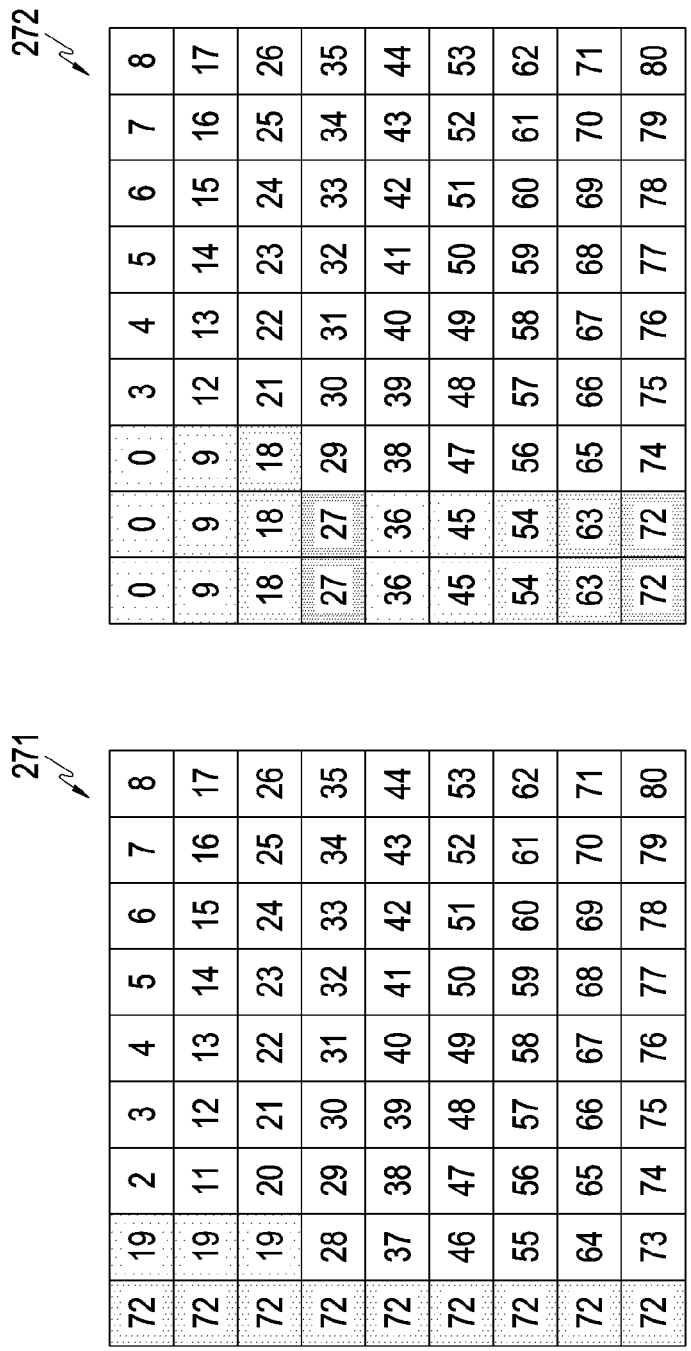

FIG. 29D illustrates a method of detecting horizontal and vertical connected components in the first to third cells of the second column (Ci=1), and FIG. 29E illustrates the result of detecting the horizontal and vertical connected components in the first to third cells of the second column (Ci=1).

Figure 29F:
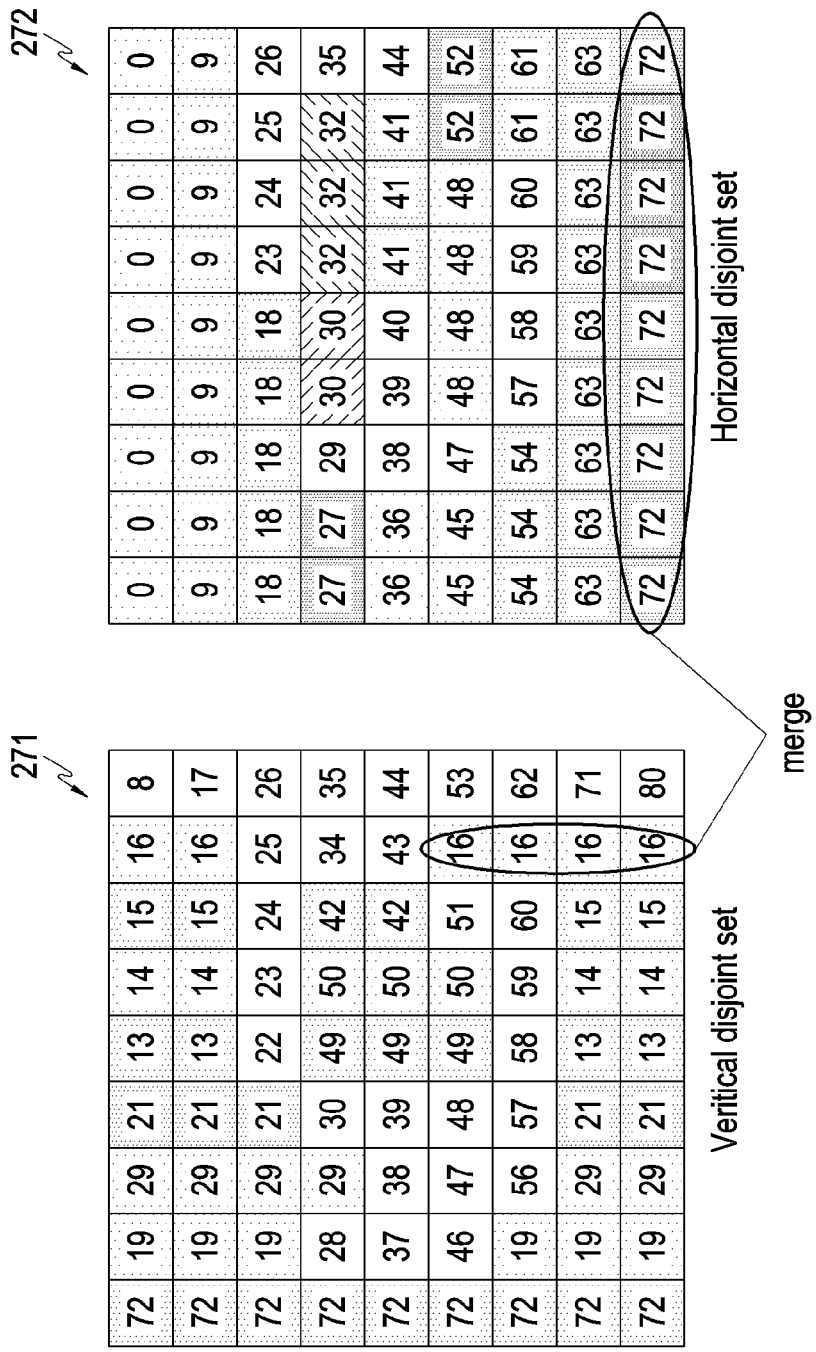

FIG. 29F illustrates the result of performing the method of detecting horizontal and vertical connected components, for the $8^{th}$ column (Ci=7) of the cellular automaton pattern 273.

Figure 29G:
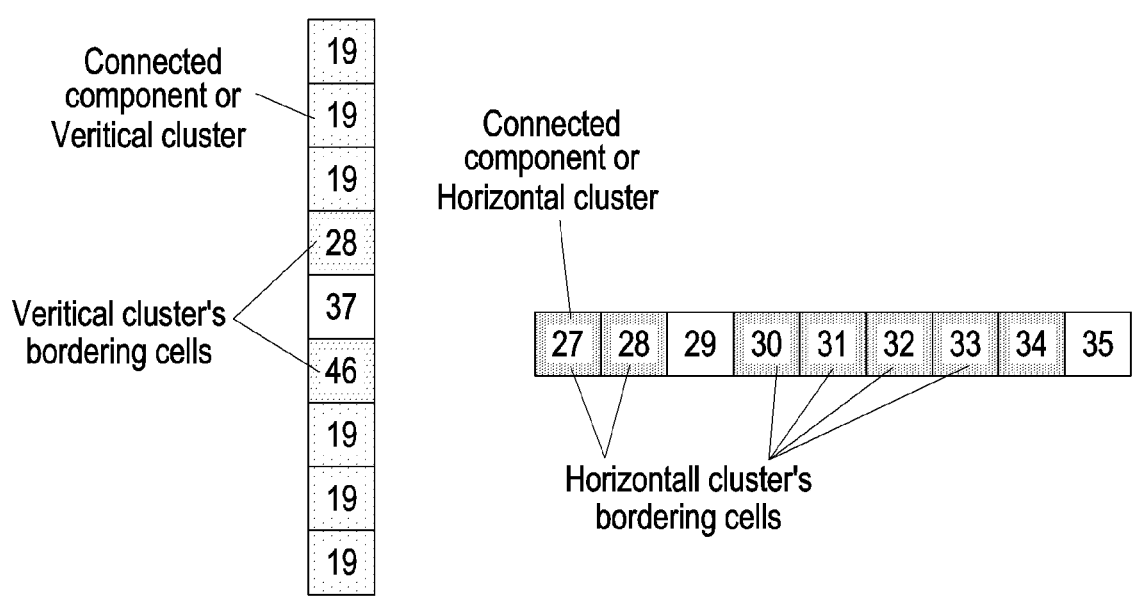

FIG. 29G illustrates the borders of the vertical disjoint set 271 and the horizontal disjoint set 272 according to an embodiment of the disclosure.

Figure 29H:
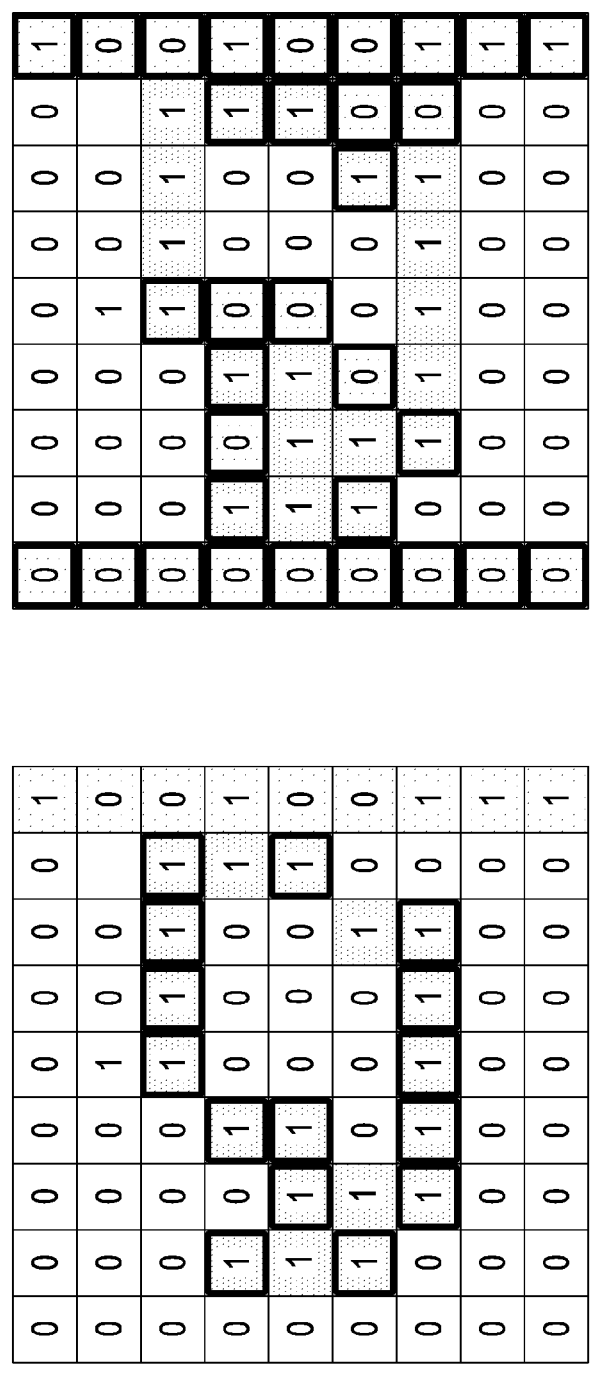

FIG. 29H illustrates borders of the cellular automaton pattern 273 according to an embodiment of the disclosure.

FIGS. 30A to 30H illustrate a method of estimating the disparity for a vertical cluster according to an embodiment of the disclosure.

The processor 430 may estimate the disparity between a projected cellular automaton pattern (hereinafter, referred to as an original pattern) and a reflected and captured cellular automaton pattern (hereinafter, referred to as a captured pattern) of the projected cellular automaton pattern. Disparity estimation as described below may be performed for all of the remaining recognized cells except for bordering cells of a cellular automaton pattern, described with reference to FIG. 29H.

Figure 30A:
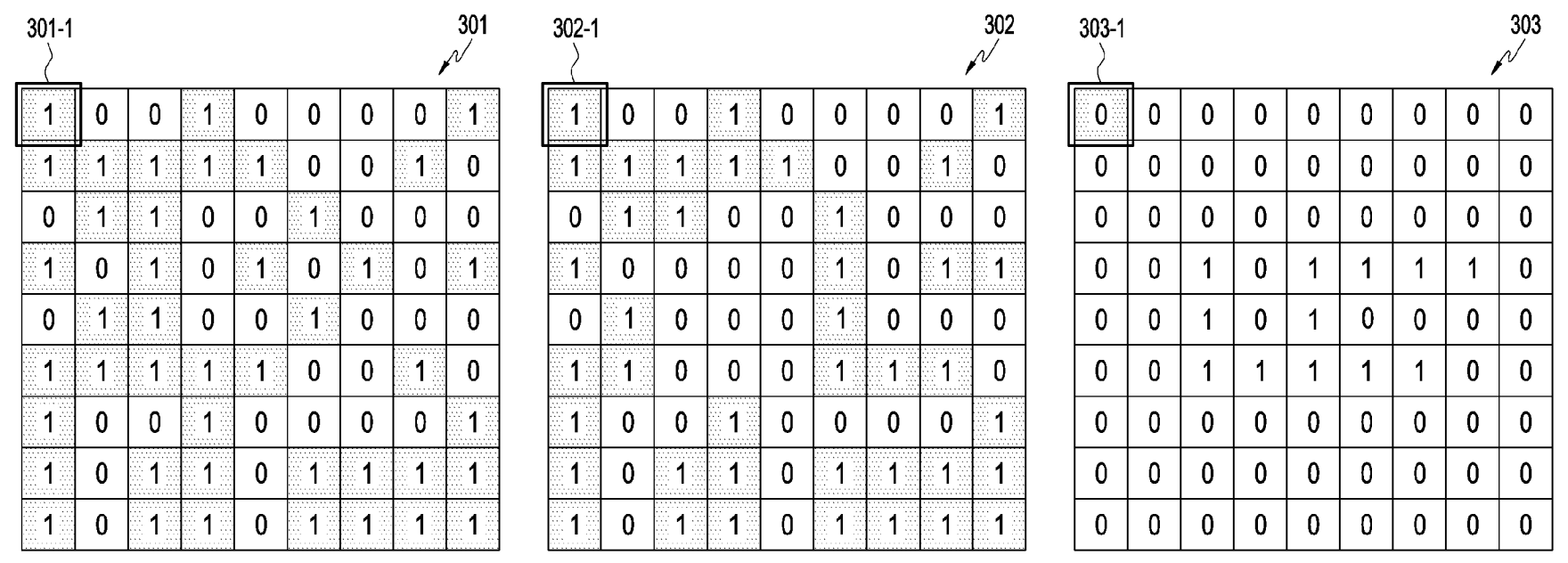

FIG. 30A illustrates an original pattern 301, and a non-shifted captured pattern 302. Referring to FIG. 30A, the processor 430 may calculate the differences between all cells of the original pattern 301 and the captured pattern 302. For example, the processor 430 may record (or store) the difference 303-1 as being 0 between the value 1 of a first cell 301-1 of the original pattern 301 and the value 1 of a first cell 302-1 of the captured pattern 302.

Figure 30B:
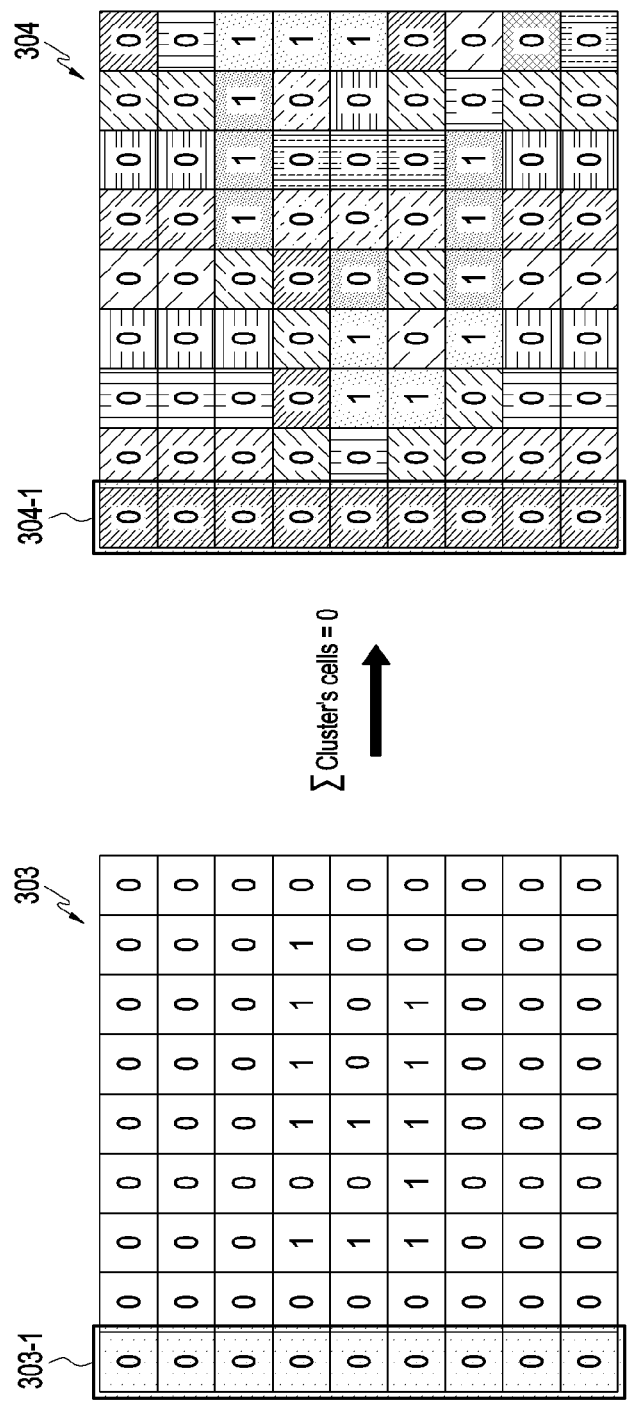

Referring to FIG. 30B, the processor 430 may determine the difference values of a cluster 304 of connected cells on the basis of the result 303 of calculating the differences. For example, if a first column 303-1 of the difference result 303 is connected, the processor 430 may set the sum of the values of cells in the first column 303-1 as the difference values of cells in a first column 304-1 of the cluster 304. Therefore, the differences of cells in the first column 304-1 of the cluster 304 are set to 0.

Figure 30C:
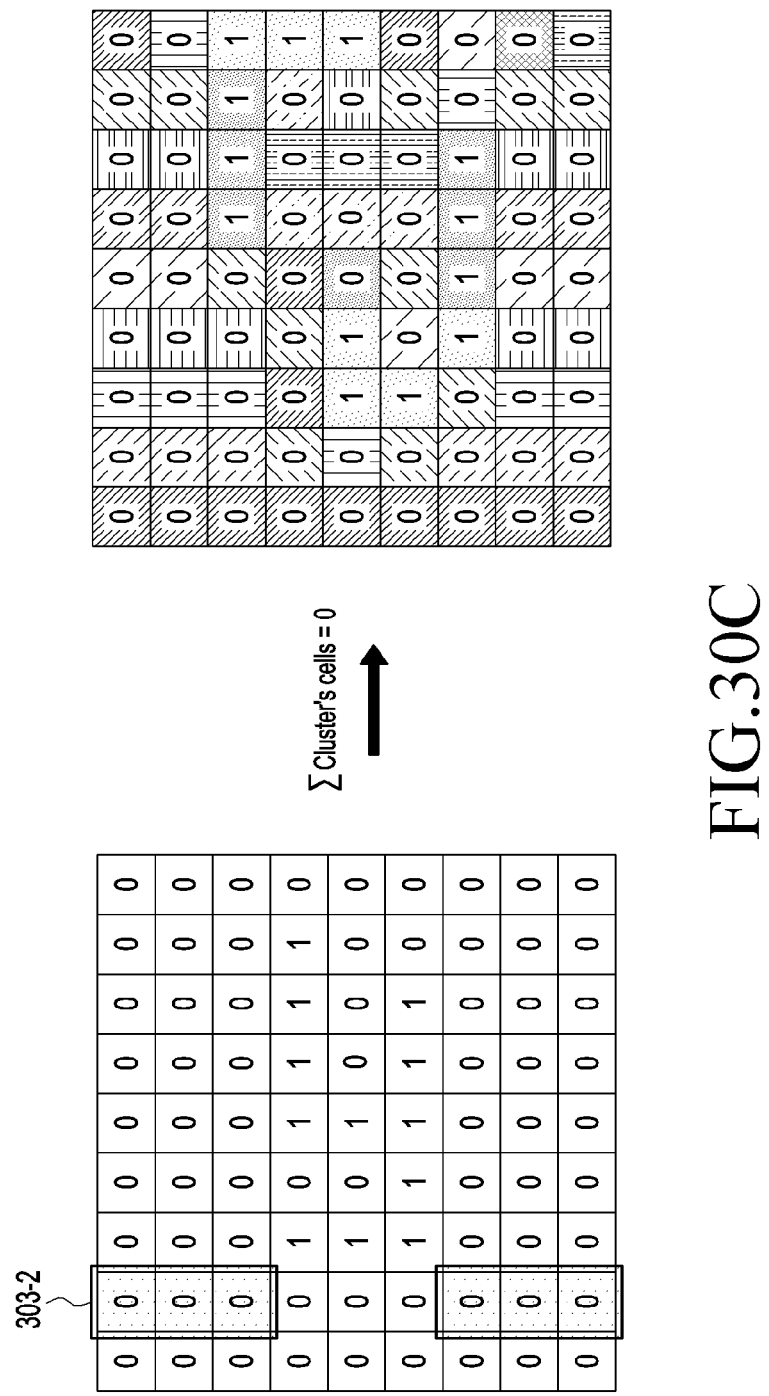

Referring to FIG. 30C, for a second column 303-2 of the difference result 303, the processor 430 may determine the sum of the values of the remaining cells except for bordering cells to be cluster differences between the original pattern 301 and the captured pattern 302.

Figure 30D:
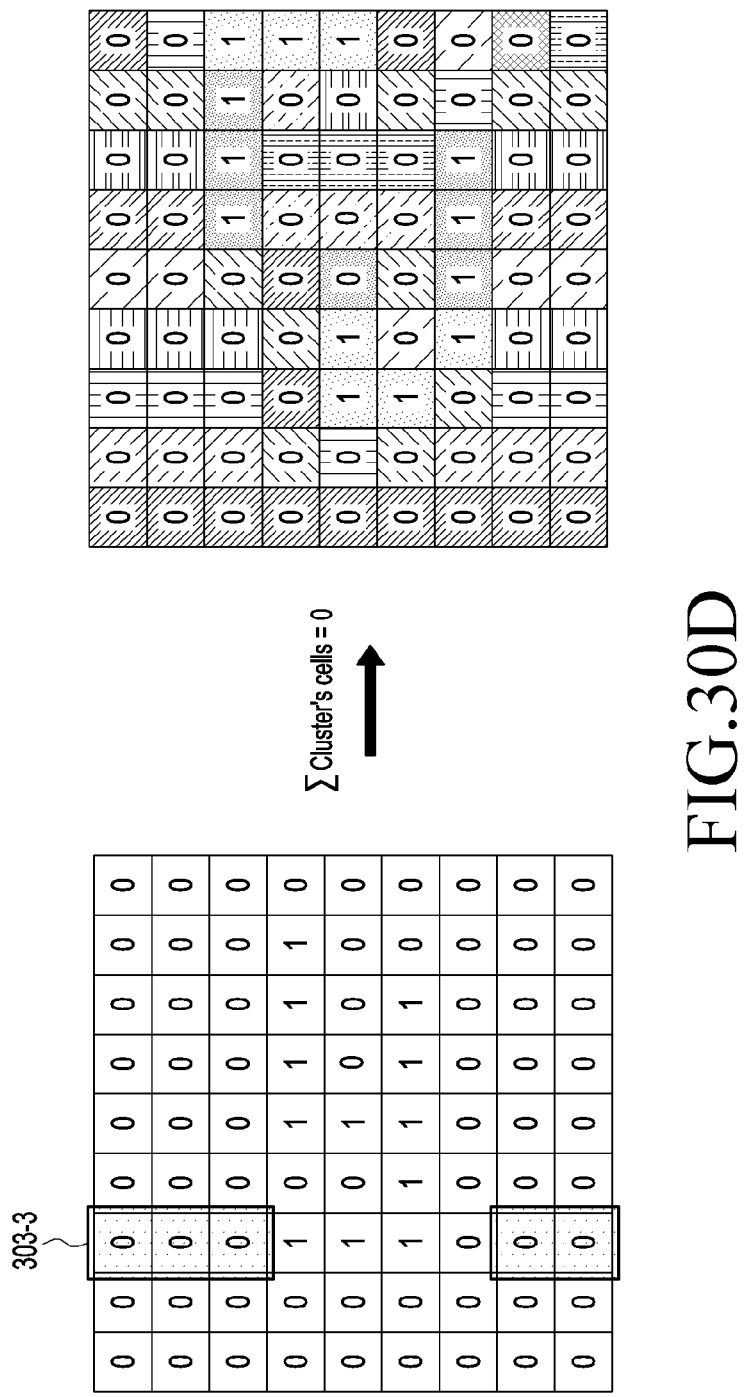

Referring to FIG. 30D, for a third column 303-3 of the difference result 303, the processor 430 may determine the sum of the values of the remaining cells, except for bordering cells, to be cluster differences between the original pattern 301 and the captured pattern 302.

Figure 30E:
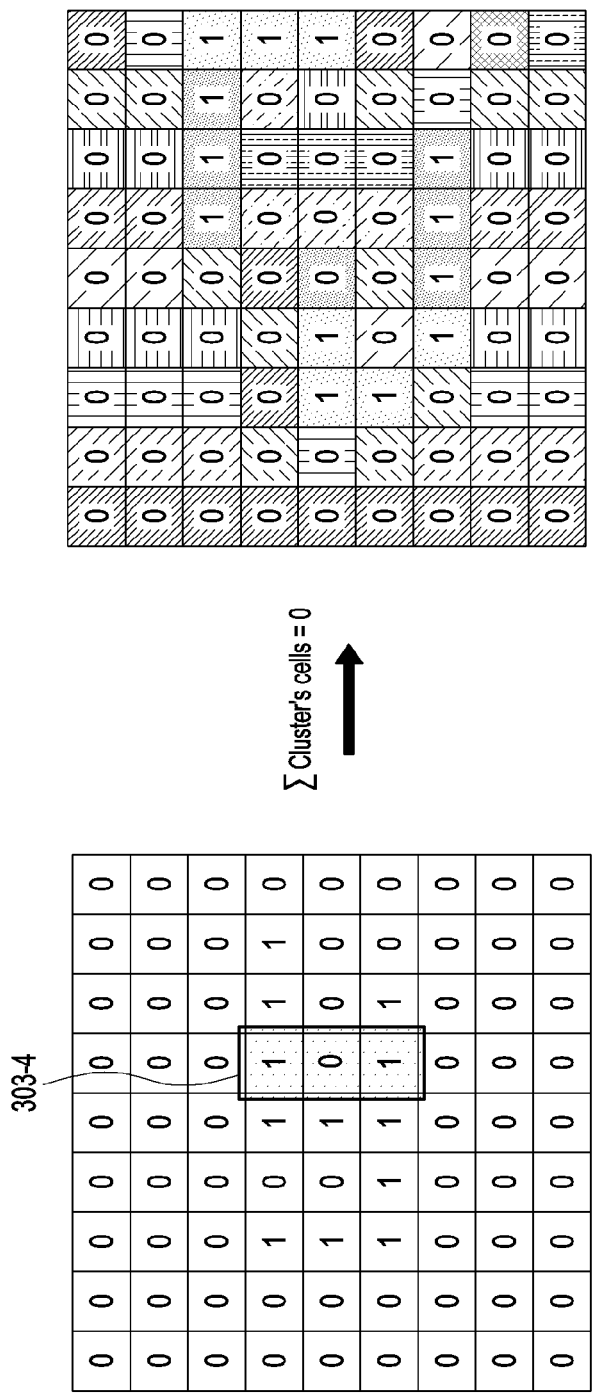

Referring to FIG. 30E, for a sixth column 303-4 of the difference result 303, the processor 430 may determine the sum of the values of the remaining cells, except for the bordering cells, to be cluster differences between the original pattern 301 and the captured pattern 302.

Figure 30F:
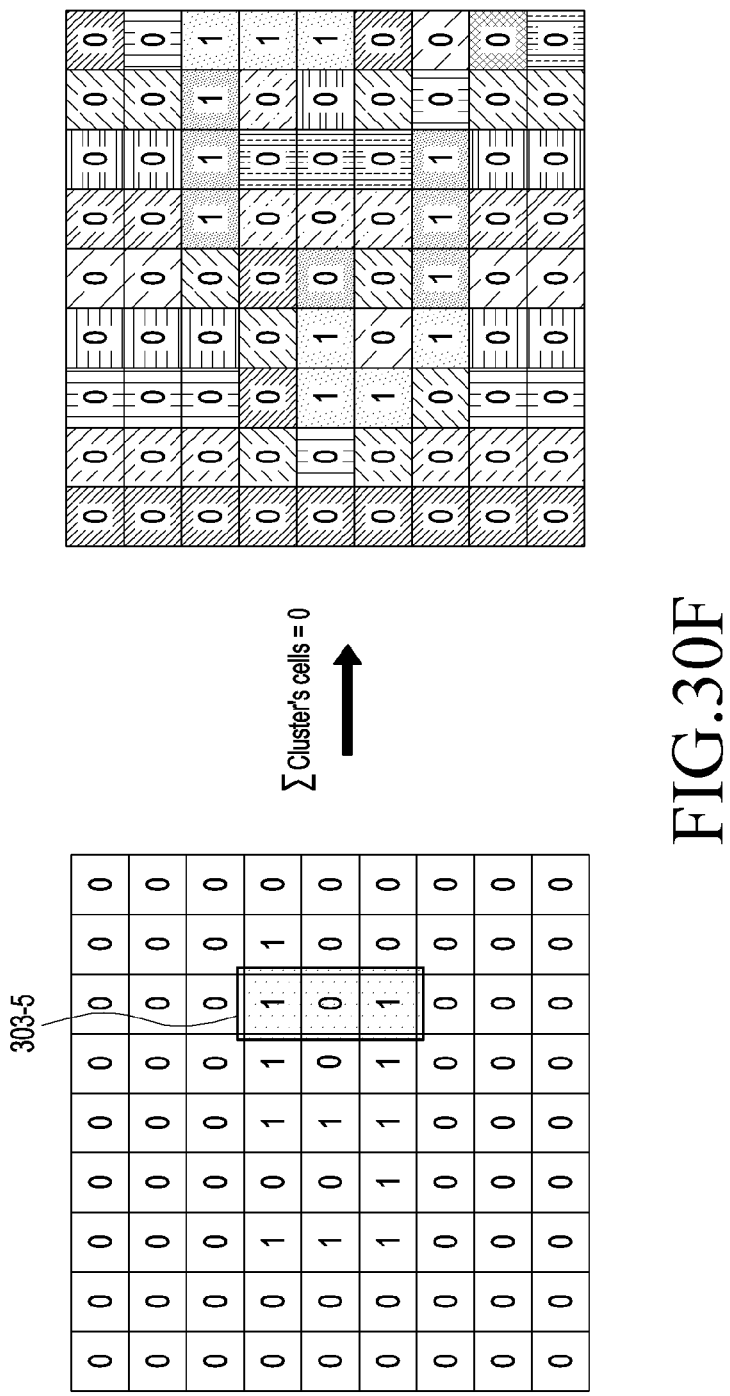

Referring to FIG. 30F, for a seventh column 303-5 of the difference result 303, the processor 430 may determine the sum of the values of the remaining cells, except for the bordering cells, to be cluster differences between the original pattern 301 and the captured pattern 302.

Figure 30G:
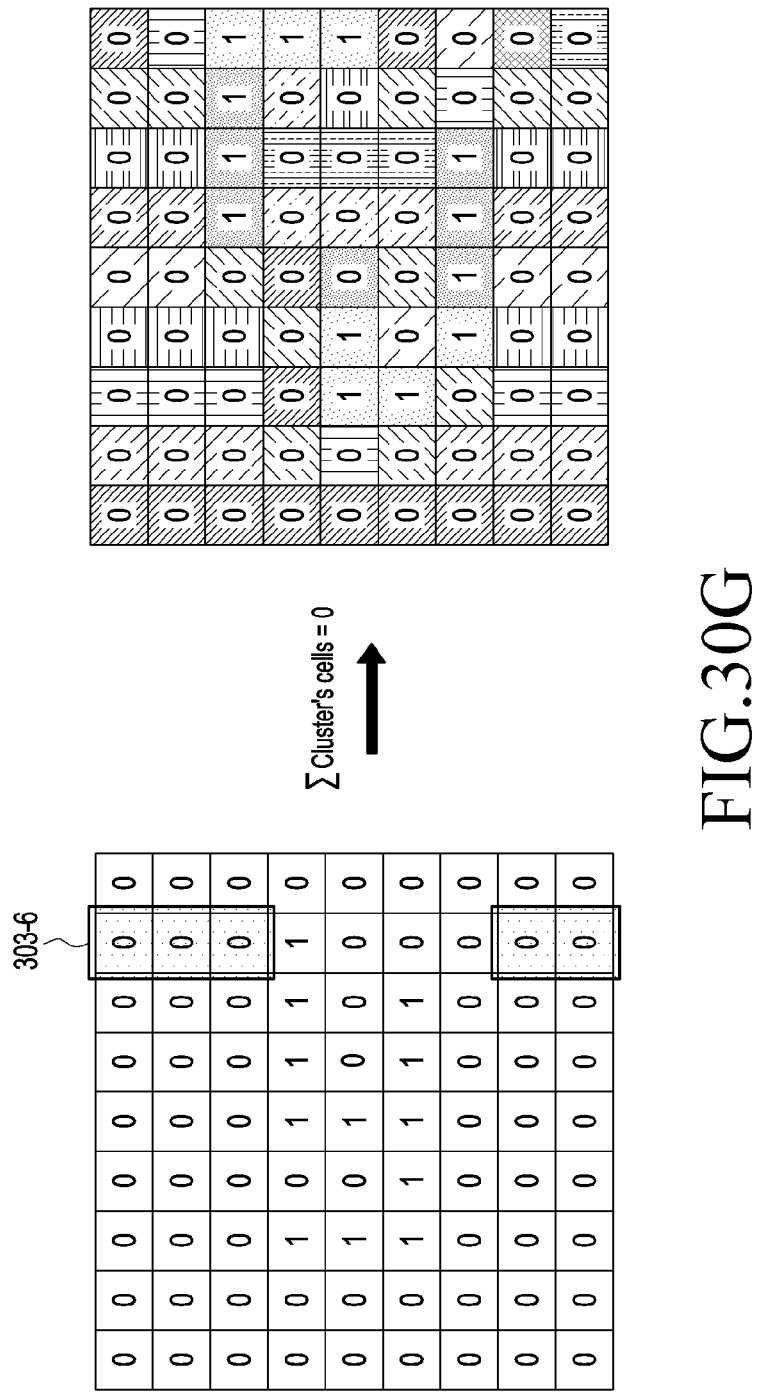

Referring to FIG. 30G, for an eighth column 303-6 of the difference result 303, the processor 430 may determine the sum of the values of the remaining cells, except for the bordering cells, to be cluster differences between the original pattern 301 and the captured pattern 302.

Figure 30H:
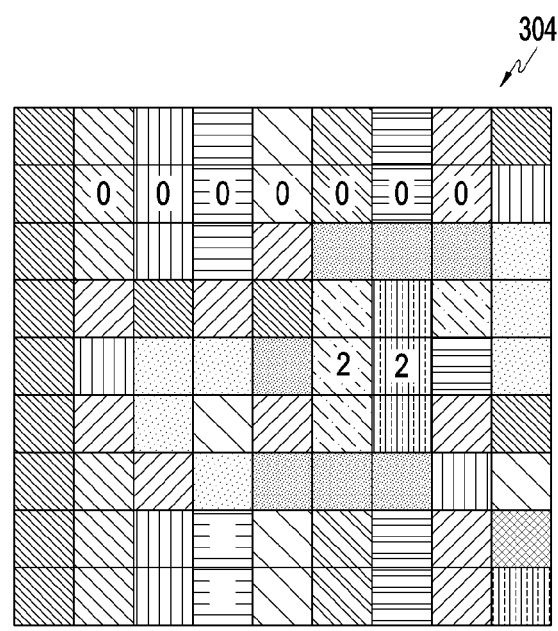

FIG. 30H illustrates cluster difference values between the original pattern 301 and the captured pattern 302. Herein, connected cells have the same difference value.

FIGS. 31A to 31D illustrate a method of estimating the disparity for a horizontal cluster according to an embodiment of the disclosure.

Figure 31A:
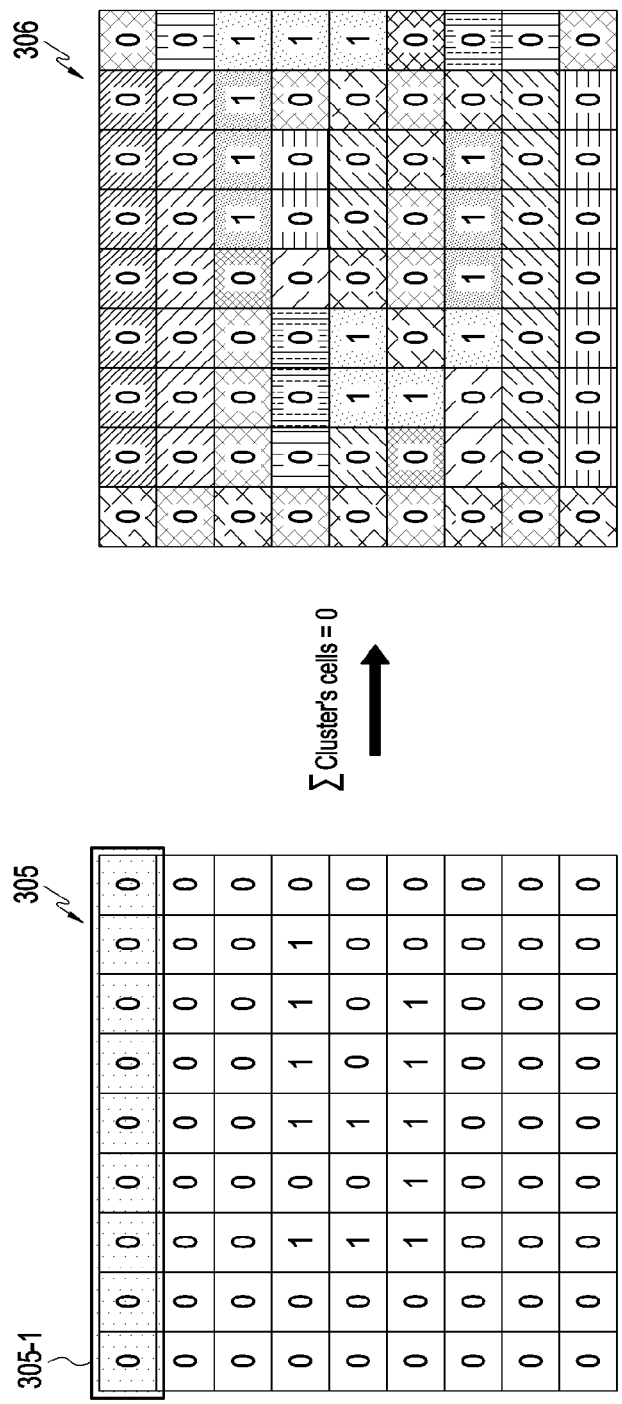
FIGS. 31A-31D illustrate a method of estimating a disparity for a horizontal cluster according to an embodiment of the disclosure.

FIG. 31A illustrates the original pattern 301 and the non-shifted captured pattern 302.

Referring to FIG. 31A, the processor 430 may determine difference values of a cluster 306 of connected cells on the basis of a difference result 305. For example, if a first row 305-1 of the difference result 305 is connected, the processor 430 may set the sum of the values of cells in the first row 305-1 as the difference values of cells in a first row 305-1 of a cluster 306. Therefore, the differences of cells in the first row 305-1 of the cluster 304 are set to 0.

Figure 31B:
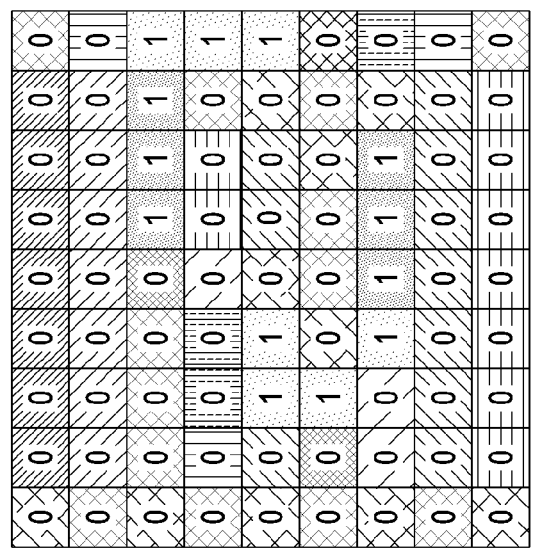
Figure 31B:
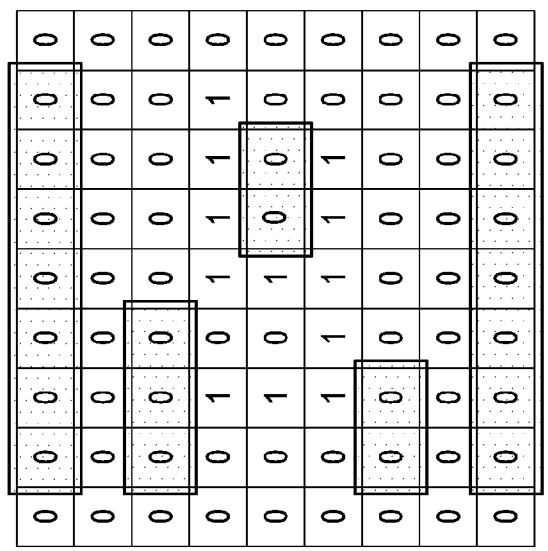
Figure 31C:
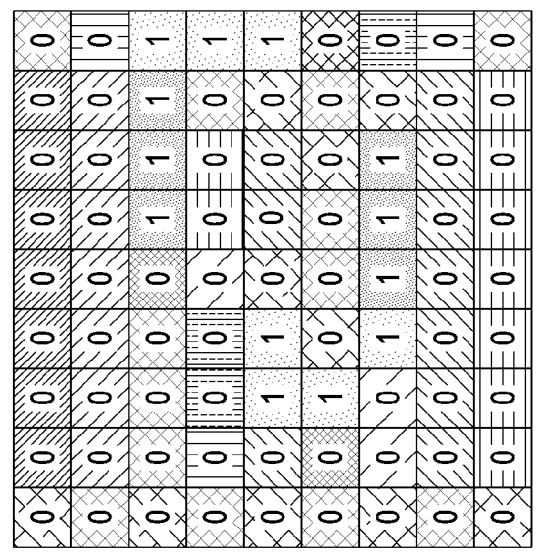
Figure 31C:
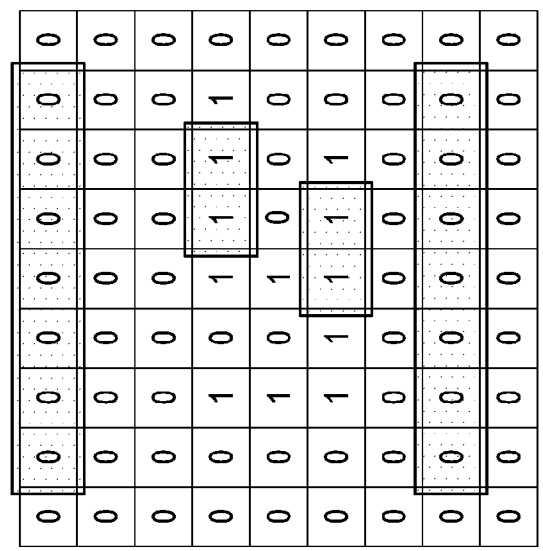

Referring to FIG. 31B, for the first, third, fifth, seventh, and ninth rows of the difference result 305, the processor 430 may determine the sum of the values of the cells inside clusters except for the bordering cells to determine the difference sum between the original pattern 301 and the captured pattern 302. Therefore, the sum of values of cells inside of clusters 304 of said rows in the difference result 305 is determined to 0. Referring to FIG. 31C, an another example of clusters is depicted for the first, fourth, sixth, and eighth rows of the difference result 305, the processor 430 may determine herein the difference sum between the original pattern 301 and the captured pattern 302 as 4, due to the fourth and sixth rows.

Figure 31D:
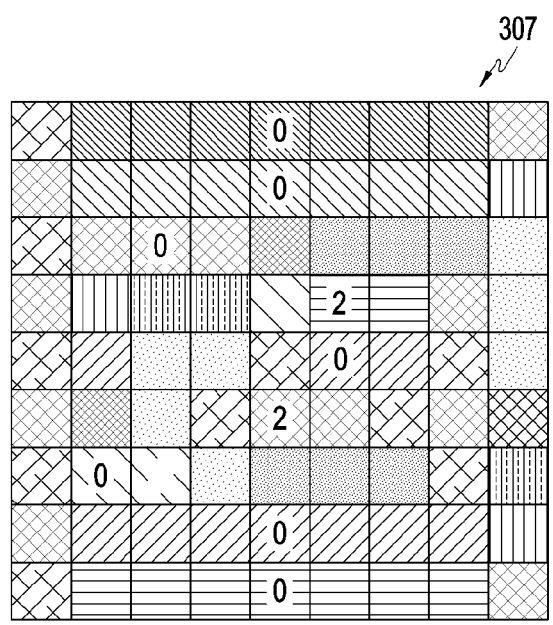

FIG. 31D illustrates cluster difference values 307 between the original pattern 301 and the captured pattern 302. Herein, connected cells have the same difference value except the fourth and the sixth rows.

Figure 32A:
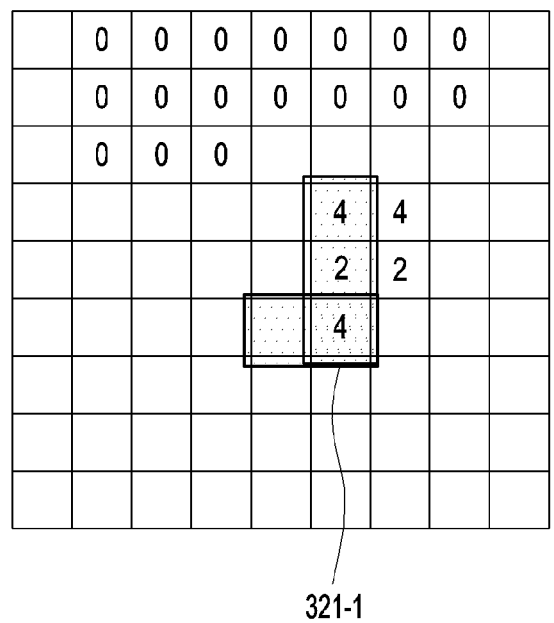
FIGS. 32A and 32B illustrate a method of determining the sum of a vertical cluster difference and a horizontal cluster difference according to an embodiment of the disclosure.
Figure 32B:
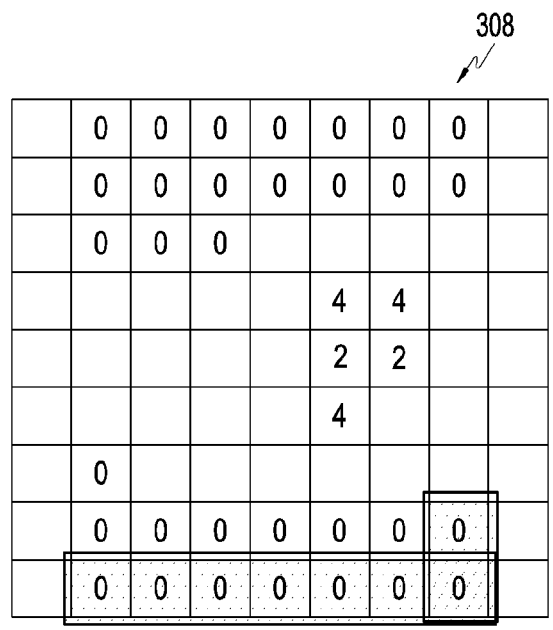

FIGS. 32A and 32B illustrate a method of determining the sum of a vertical cluster difference and a horizontal cluster difference according to an embodiment of the disclosure.

Referring to FIG. 32A, the processor 430 may determine the sums of difference values by comparing all rows of the result 307 of horizontal cluster differences with all rows of the result 304 of vertical cluster differences. The processor 430 may not determine the sums of difference values for bordering cells among contiguous cells. For example, the processor 430 may determine the difference value of a cell 321-1 in which the first row of the result 307 of horizontal cluster differences meets with the second column of the result 304 of vertical cluster differences. The value of the overlapped cell 321-1 may be the sum of the difference value 0 of the first row of the result 307 of horizontal cluster differences and the difference value 0 of the second column of the result 304 of vertical cluster differences.

Referring to FIG. 32B, the processor 430 may determine the sum 4 of the difference value 2 of the sixth row of the result 307 of horizontal cluster differences and the difference value 2 of the sixth column of the result 304 of vertical cluster differences to be the difference value of a cell 321-1 in which the sixth row of the result 307 of horizontal cluster differences meets with the sixth column of the result 304 of vertical cluster differences.

FIG. 32B illustrates a table 308 resulting from the operation of determining the sum of difference values for every row of the result 307 of horizontal cluster differences and every column of the result 304 of vertical cluster differences.

Figure 33A:
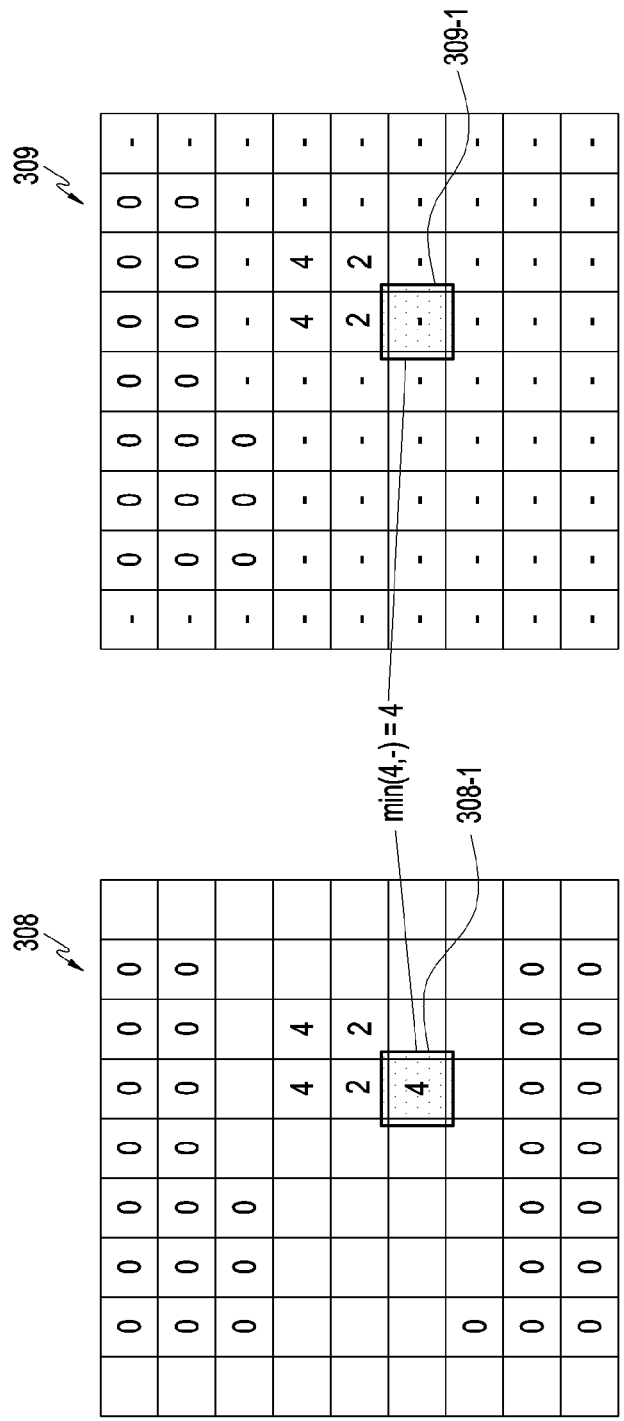
FIGS. 33A and 33B illustrate a method of determining a shift table according to an embodiment of the disclosure.
Figure 33B:
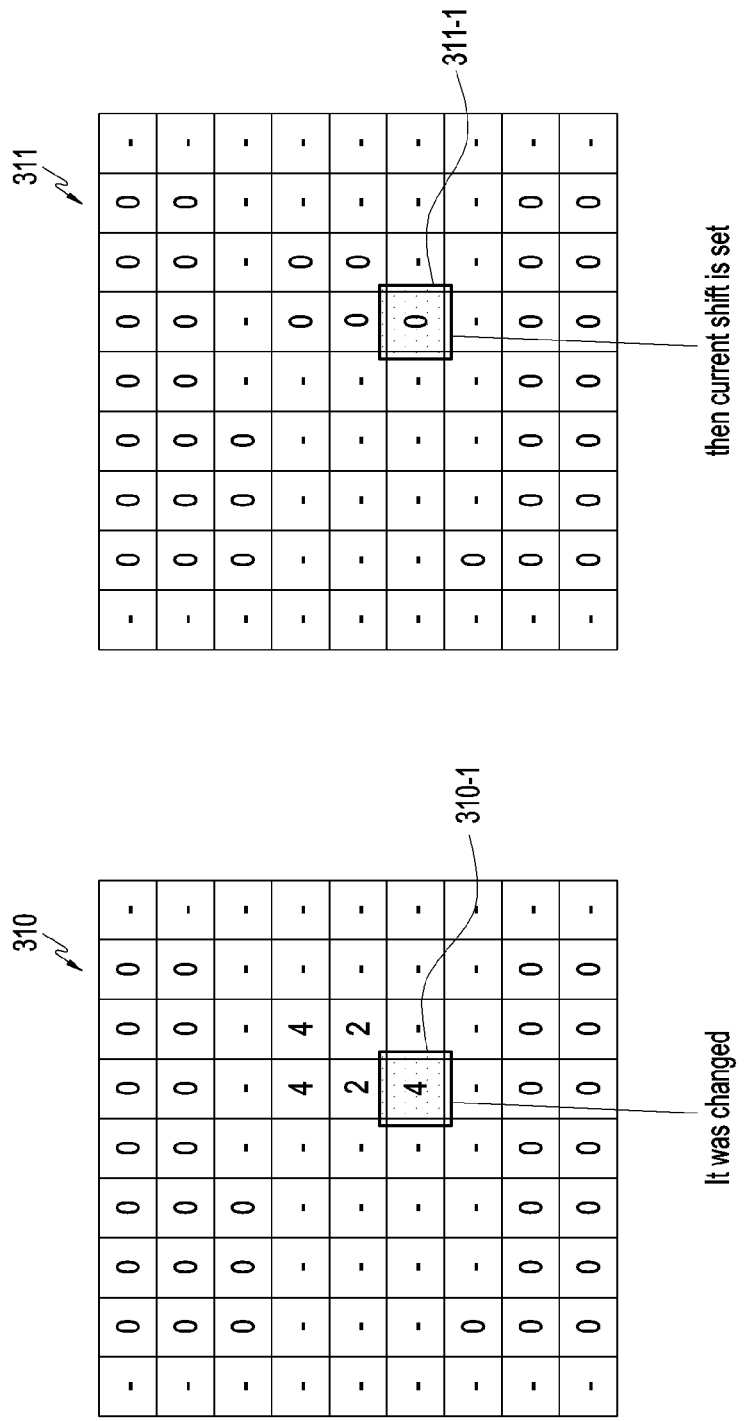

FIGS. 33A and 33B illustrate a method of determining a shift table according to an embodiment of the disclosure.

The processor 430 may generate a shift table by using the result table 308 illustrated in FIG. 32B.

For example, referring to FIG. 33A, the processor 430 may determine a minimum difference value by comparing the value of every cell of the result table 308 with the value of a cell in an uncertainty initial table 309. In this case, [Equation 14] may be used.

$$\text{Argmin}_{shift}(\text{difference}_{horizontal}+\text{difference}_{vertical})^* \quad \text{[Equation 14]}$$

Herein, cells that are compared with each other may be at the same position in the respective tables. Further, if the value of a specific cell is not set, the processor 430 may determine the comparison result for the specific cell to be 0.

For example, the processor 430 may compare the value of a cell 308-1 in the result table 308 with the value of a cell 309-1 in the initial table 309. For example, since the value of the cell 309-1 in the initial table 309 is not set, min(4, −) for the value 4 of the cell 308-1 in the result table 308 and the value of the cell 309-1 in the initial table 309 may be determined to be 4. Meanwhile, the processor 430 may not perform the cell value comparison operation for the bordering cells illustrated in FIG. 29H.

A minimum cell difference table 310 illustrated in FIG. 33B lists minimum values between the values of cells in the result table 310 and the values of cells in an initial table 311 on the basis of the cell value comparison method of FIG. 33A. If the minimum difference of a cell is changed in the minimum cell difference table 310, the processor 430 may update the shift amount. For example, if the processor 430 determines that the value 4 of a cell 310-1 of the minimum cell difference table 310 has been changed, the processor 430 may update the current shift amount 311-1, which is 0.

FIGS. 34A to 34G illustrate a method of estimating the disparity for a vertical cluster according to another embodiment of the disclosure.

A description redundant with the description of FIGS. 30A to 30H will not be provided herein.

FIGS. 34A to 34G illustrate an original pattern 341, and a pattern 342 obtained by shifting one captured pattern by one cell.

Figure 34A:
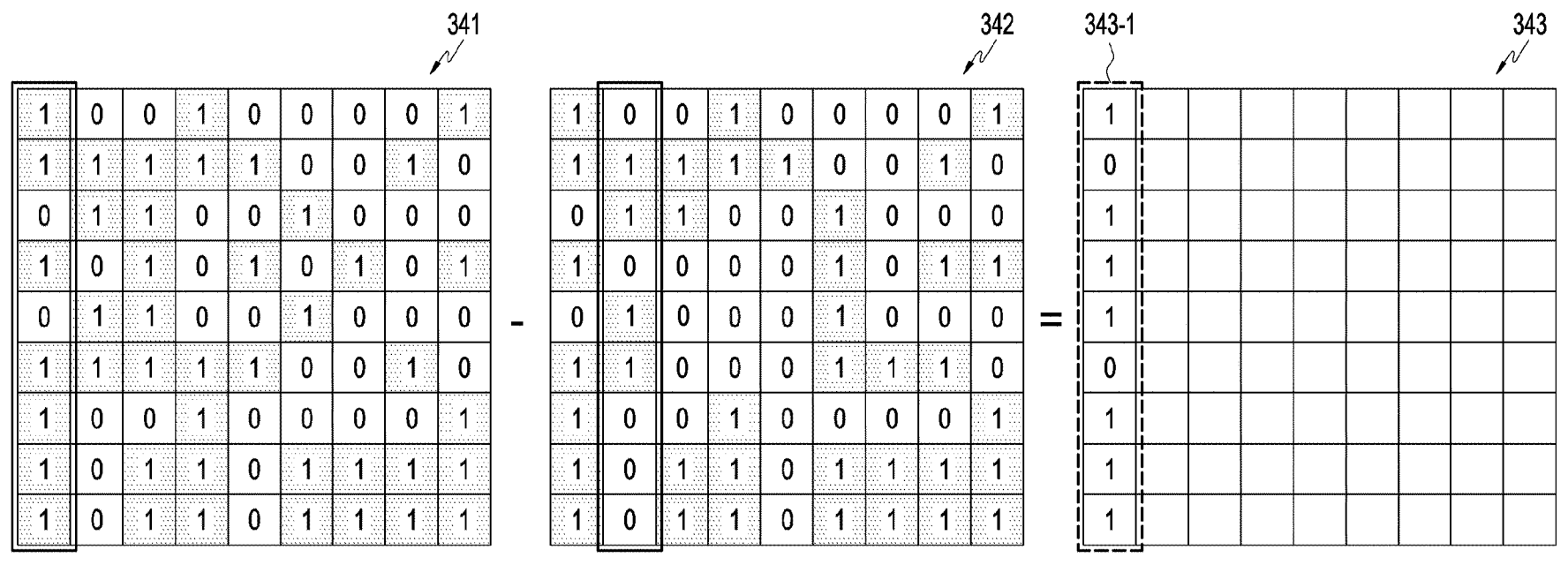

Referring to FIG. 34A, the processor 430 may determine the difference values between the values of cells in the first column of the original pattern 341 and the values of cells in the second column of the shifted pattern 342. In this case, the processor 430 may determine the difference values between cells in the same rows among the cells of the first column of the original pattern 341 and the cells of the second column of the shifted pattern 342. Further, the processor 430 may record the determined difference values in the rows of a first column 343-1 of a table 343.

Figure 34B:
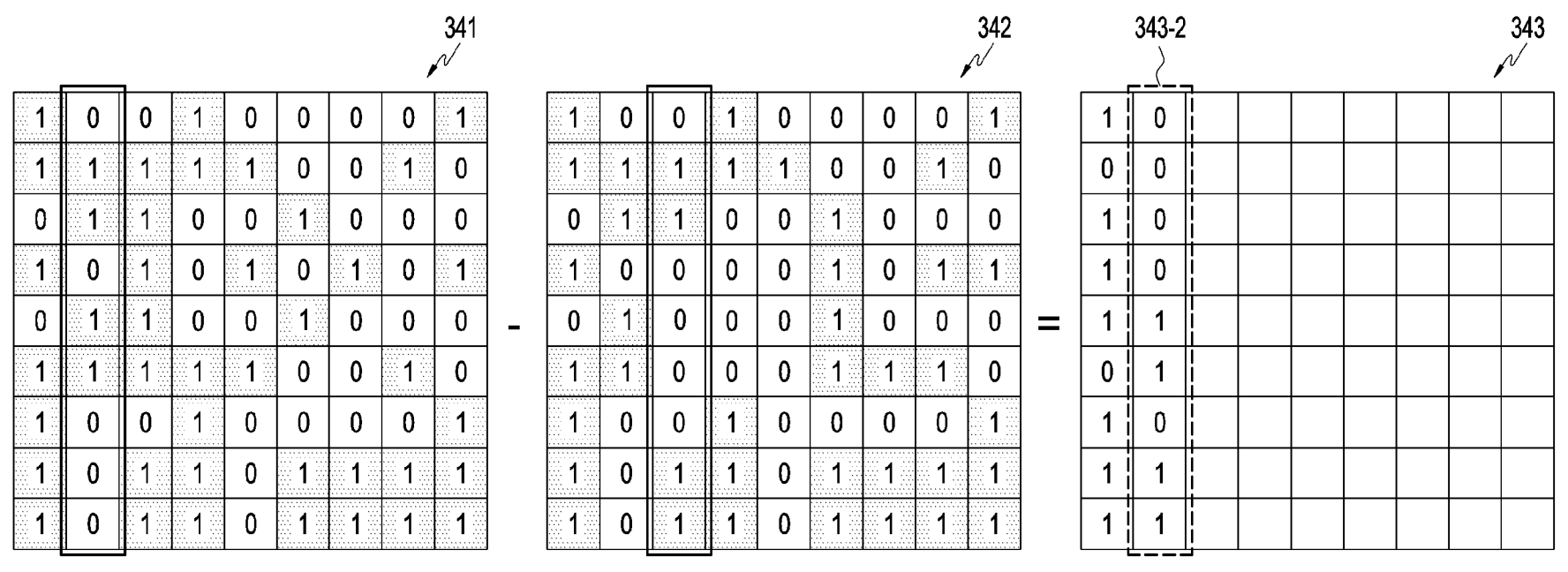

Referring to FIG. 34B, the processor 430 may determine the difference values between the values of cells in the second column of the original pattern 341 and the values of cells in the third column of the shifted pattern 342. The processor 430 may record the determined difference values in the second column 343-2 of the table 343.

Figure 34C:
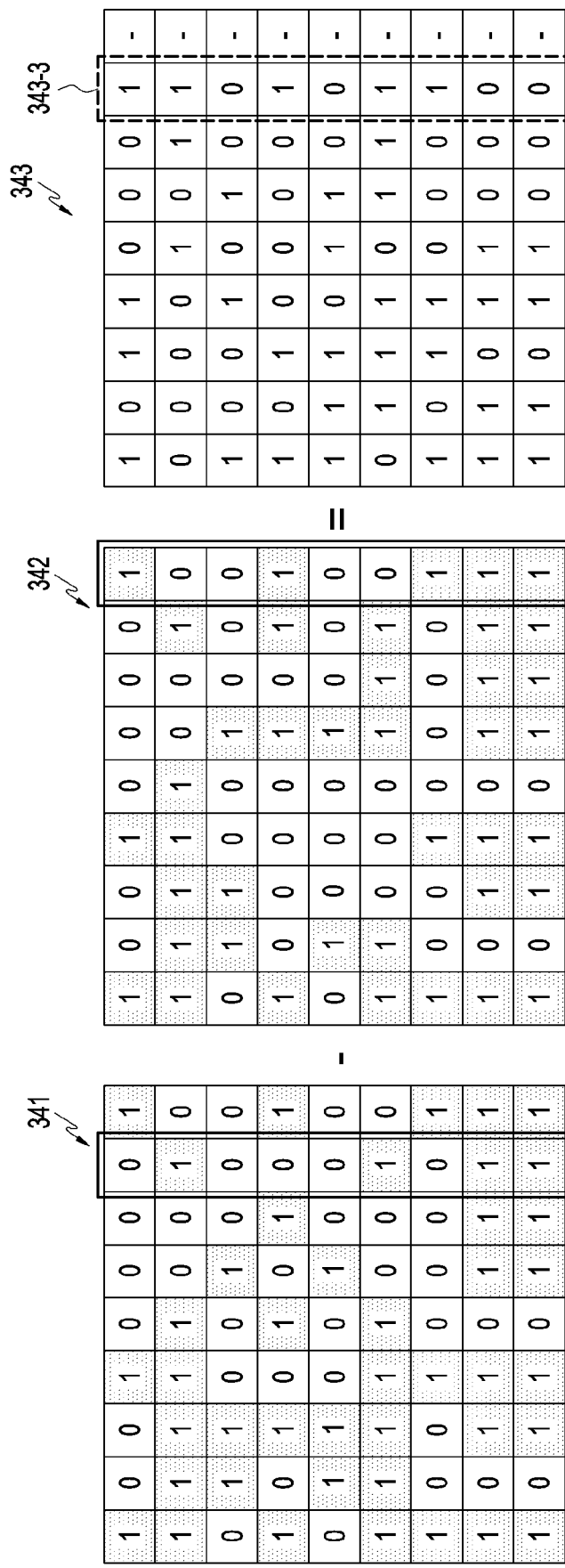

Referring to FIG. 34C, the processor 430 may determine the difference values between the values of cells in the second and eighth column of the original pattern 341 and the values of cells in the ninth column of the shifted pattern 342. The processor 430 may record the determined difference values in the rows of an eighth column 343-2 of the table 343.

Figure 34D:
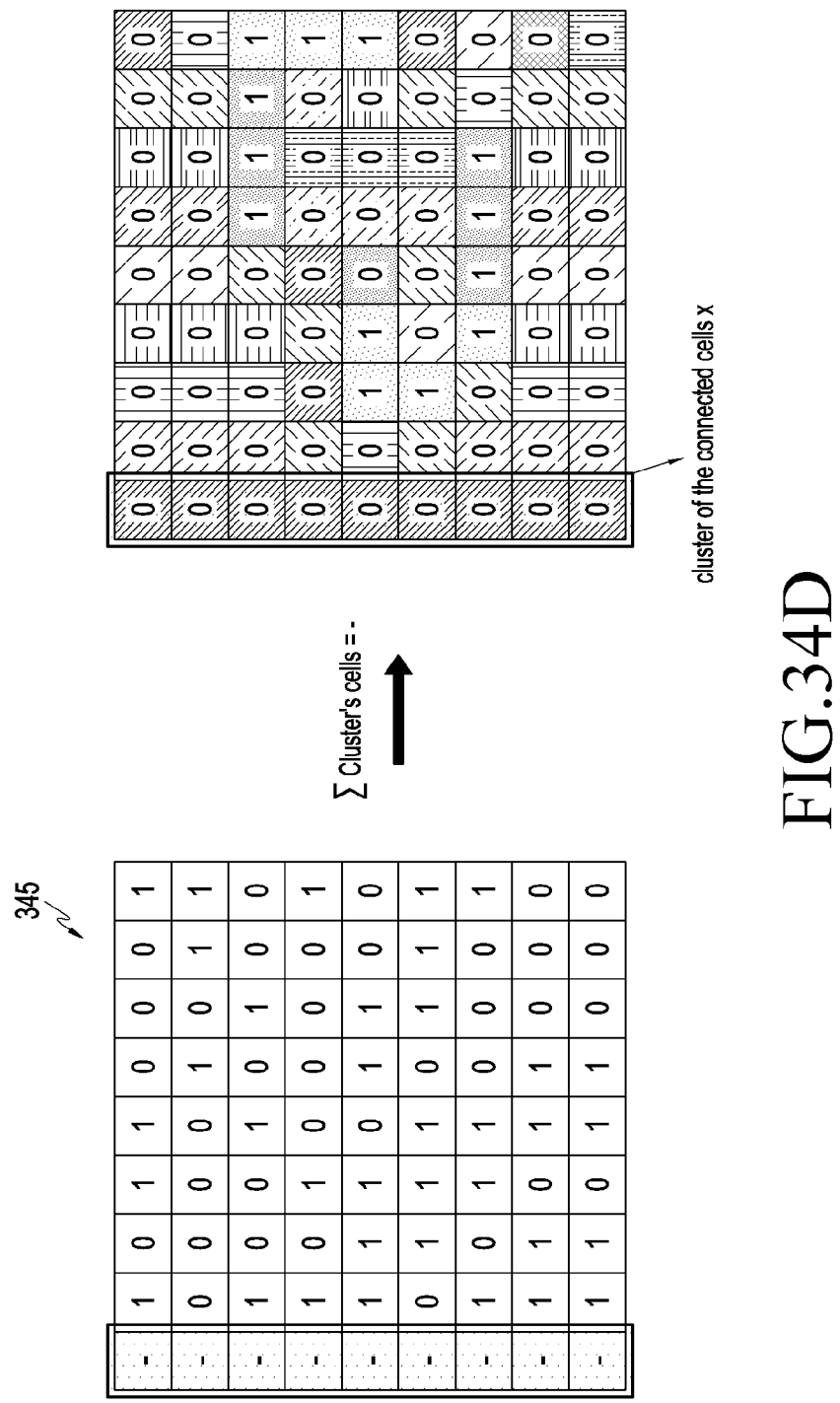

A table 345 illustrated in FIG. 34D may be obtained by shifting the position of the ninth column of the table 343 illustrated in FIG. 34C to the position of the first column.

Figure 34E:
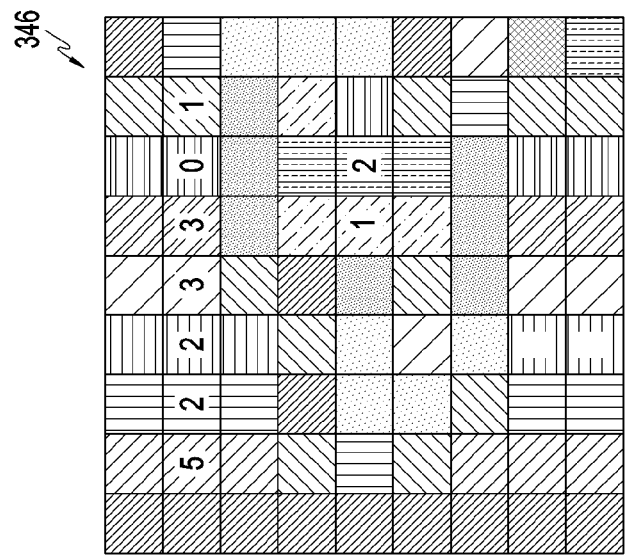

A table 346 illustrated in FIG. 34E includes results of accumulating difference values for vertical clusters on the basis of the table 345 of FIG. 34D. Herein, the method of accumulating difference values for vertical clusters has been described in detail with reference to FIGS. 30A to 30H, and thus will not be described herein.

Figure 34F:
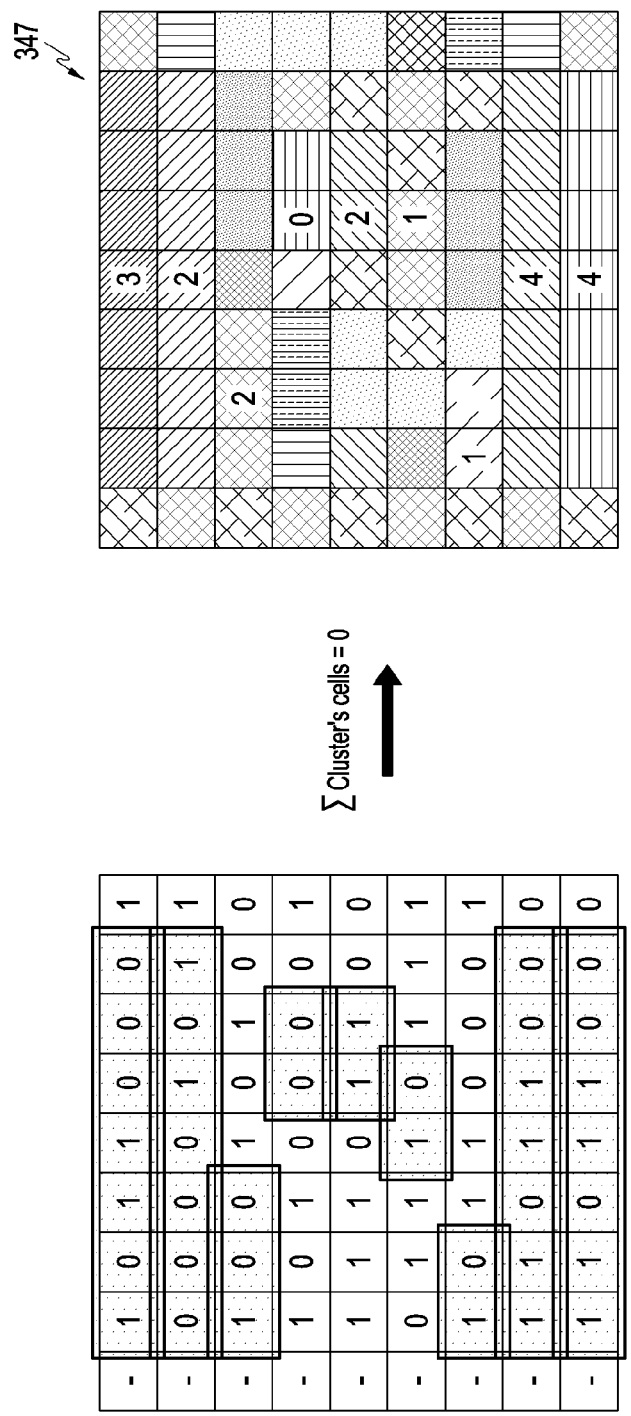

A table 347 illustrated in FIG. 34F includes results of accumulating difference values for horizontal clusters on the basis of the table 345 of FIG. 34D. Herein, the method of accumulating difference values for horizontal clusters has been described in detail with reference to FIGS. 31A to 31D, and thus will not be described herein.

The processor 430 may sum difference values by comparing all of the rows of vertical cluster difference values 346 with all of the rows of horizontal cluster difference values 347. The summation of difference values has been described in detail with reference to FIGS. 32A and 32B, and thus will not be described herein.

For example, FIG. 34G illustrates a table 348 including the result values of the summation of difference values obtained on the basis of the vertical cluster difference values 346 and the horizontal cluster difference values 347.

Figure 35A:
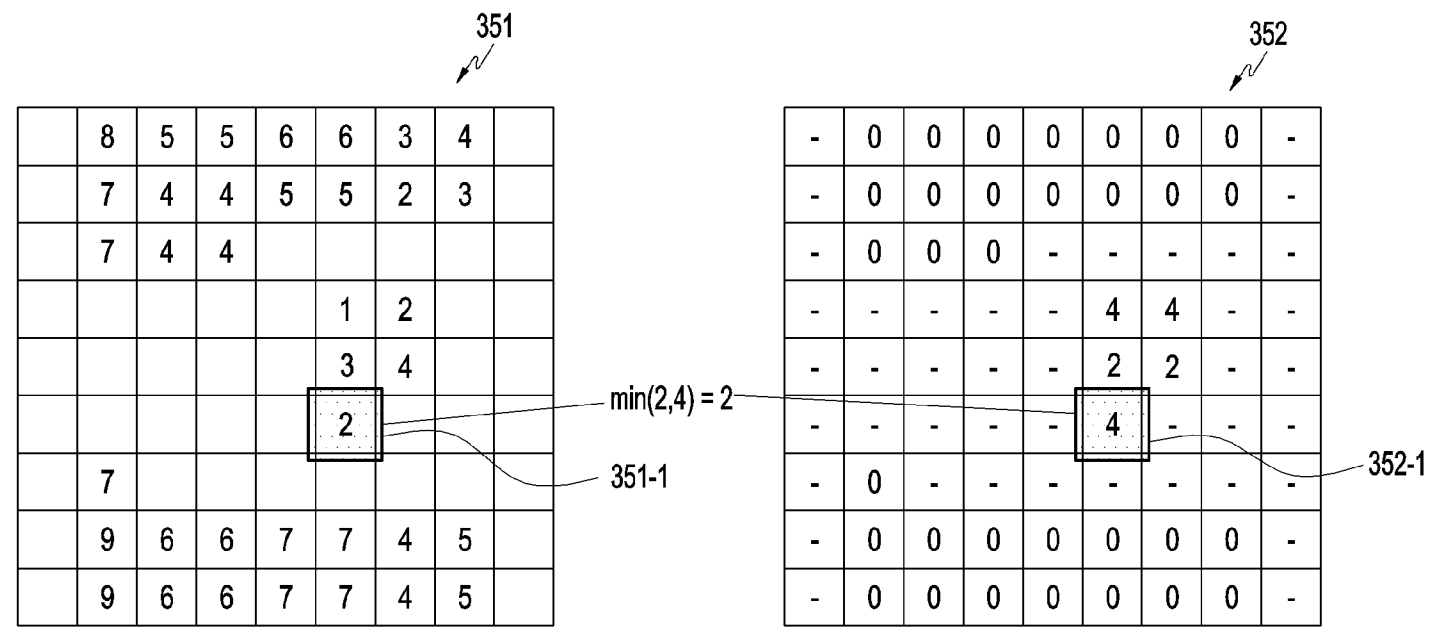
Figure 35B:
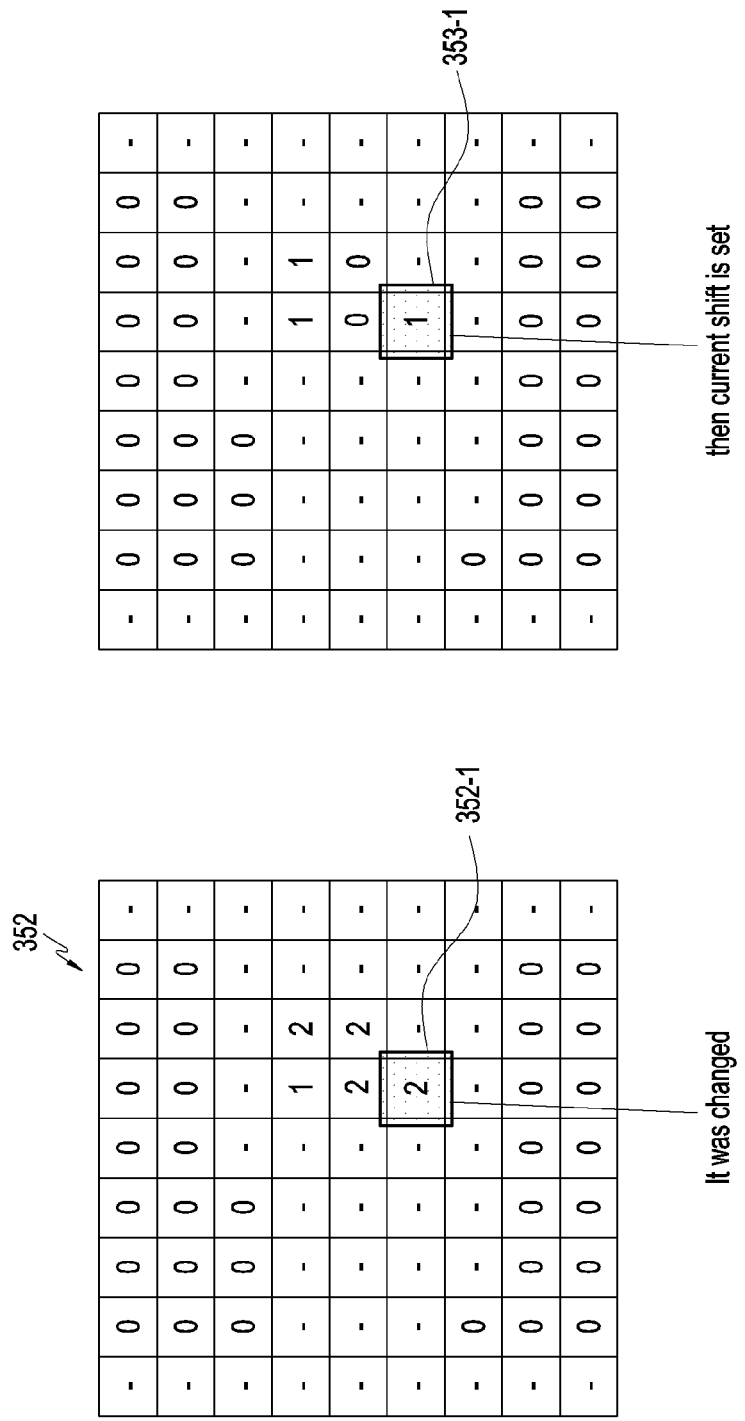

FIGS. 35A and 35B illustrate a method of determining a shift table according to another embodiment of the disclosure.

The processor 430 may generate a shift table by using the result table 348 illustrated in FIG. 34G.

For example, referring to FIG. 35A, the processor 430 may determine the minimum difference values by comparing the values of all cells in the result table 348 with the values of all cells in the minimum cell difference table 310 illustrated in FIG. 33A. In this case, [Equation 14] may be used. Cells that are compared with each other may be at the same position in the respective tables. Further, if the value of a specific cell is not set, the processor 430 may determine the comparison result for the specific cell to be 0.

For example, the processor 430 may determine min(2,4) for the value 2 of a cell 351-1 in the result table 348 and the value 4 of a cell 310-11 in the minimum cell difference table 310 to be 2.

Further, the processor 430 may not perform the cell value comparison operation, for example, for the bordering cells illustrated in FIG. 29H.

A minimum cell difference table 352 in FIG. 35B is the result of comparing the values of the cells in the result table 348 with the values of the cells in the minimum cell difference table 310 in FIG. 33A, on the basis of the cell value comparison method described with reference to FIG. 35A.

If the minimum difference of a cell is changed in the minimum cell difference table 352, the processor 430 may update the shift amount. For example, if the processor 430 determines that the value 2 of a cell 352-1 of the minimum cell difference table 352 has been changed, the processor 430 may update the current shift amount 353-1, which is 1.

Figure 36A:
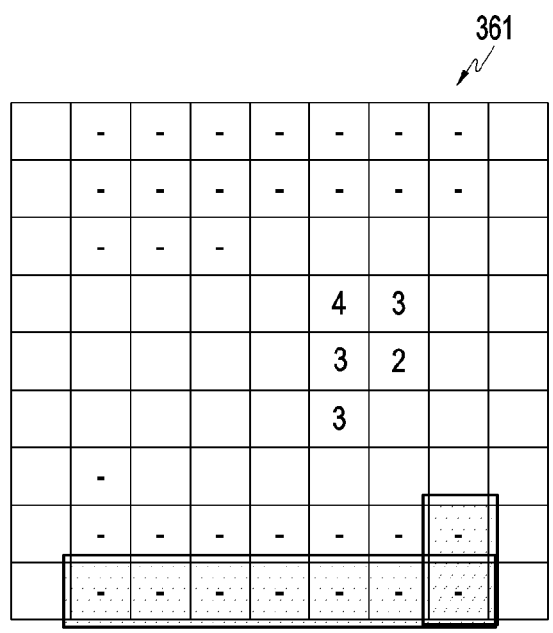
FIGS. 36A-36C illustrate a method of determining a shift table according to another embodiment of the disclosure.
Figure 36B:
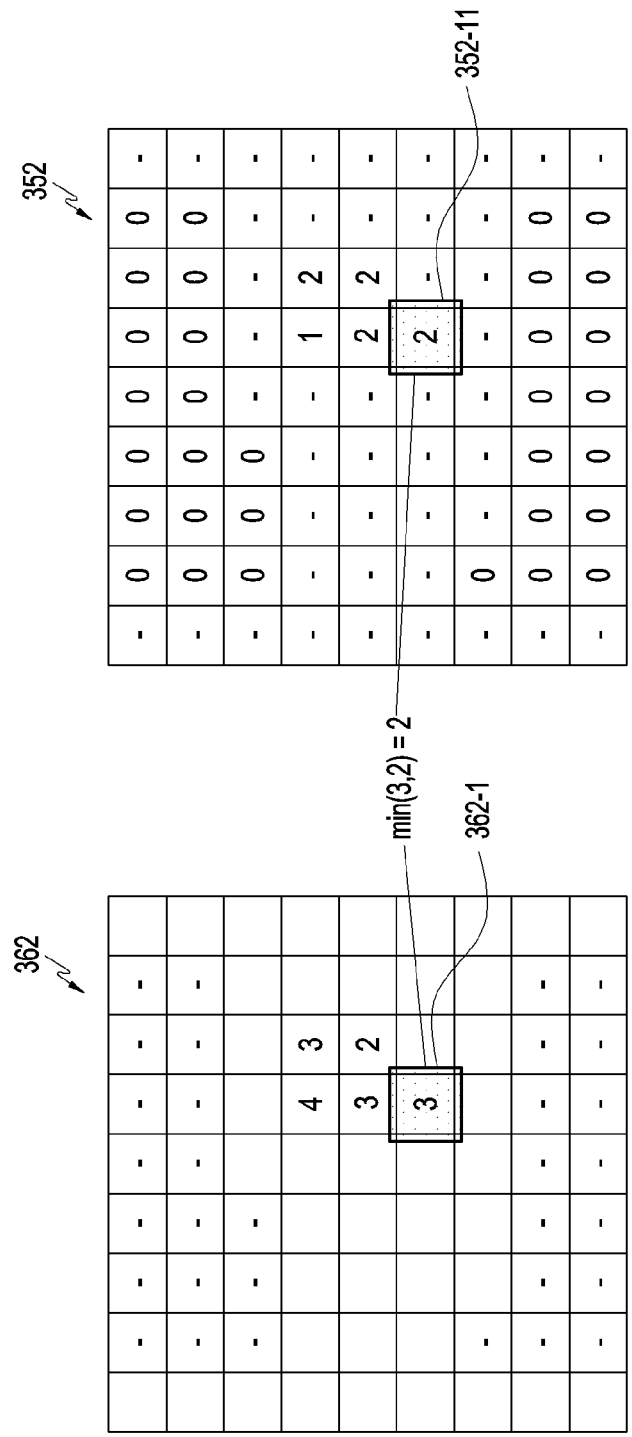
Figure 36C:
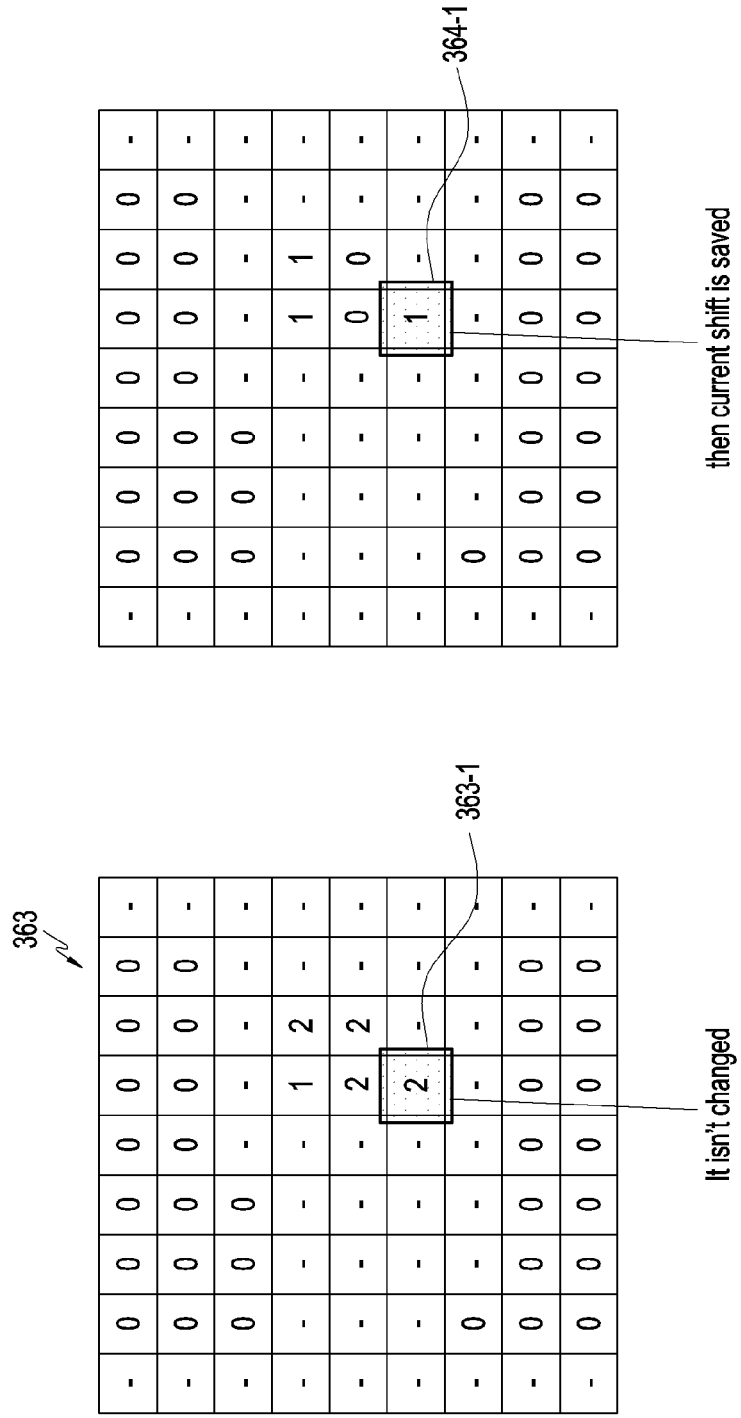

FIGS. 36A, 36B and 36C illustrate a method of determining a shift table according to another embodiment of the disclosure.

FIG. 36A illustrates a table 361 including the result values of the summation of difference values calculated on the basis of vertical cluster difference results and horizontal cluster difference results when a captured pattern is shifted by two cells.

Referring to FIG. 36B, the processor 430 may determine the minimum difference values by comparing the values of all of the cells in the table 361 with the values of all of the cells in the minimum cell difference table 352 illustrated in FIG. 35B. In this case, [Equation 14] may be used. Cells that are compared with each other may be at the same position in the respective tables. Further, if the value of a specific cell is not set, the processor 430 may determine a comparison result for the specific cell to be 0.

For example, the processor 430 may determine min(3, 2) for the value 3 of a cell 362-1 in the table 362 and the value 2 of a cell 352-11 in the minimum cell difference table 352 to be 2.

Further, the processor 430 may not perform the cell value comparison operation, for example, for the bordering cells illustrated in FIG. 29H.

A minimum cell difference table 363 in FIG. 36C is the result of comparing the values of the cells in the table 362 with the values of the cells in the minimum cell difference table 352, on the basis of the cell value comparison method described with reference to FIG. 36B.

If the minimum difference of a cell is changed in the minimum cell difference table 363, the processor 430 may update the shift amount. For example, if the processor 430 determines that the value 2 of a cell 363-1 of the minimum cell difference table 363 has not been changed, the processor 430 may not additionally update the current shift amount for the cell 364-1.

A result table 363 in FIG. 36C may be the result of comparing the values of the cells in the result table 361 with the values of the cells in the minimum cell difference table 310 of FIG. 35A on the basis of the cell value comparison method described with reference to FIG. 35A.

If the minimum difference of a cell is changed in the minimum cell difference table 363, the processor 430 may update the shift amount. For example, if the processor 430 determines that the value 2 of the cell 363-1 of the minimum cell difference table 363 has been changed, the processor 430 may update the current shift amount 364-1, which is 2.

Figure 37A:
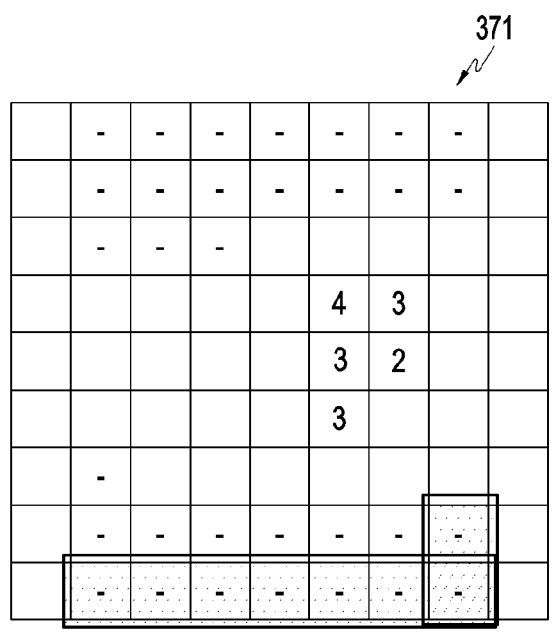
FIGS. 37A-37C illustrate a method of determining a shift table according to another embodiment of the disclosure.
Figure 37B:
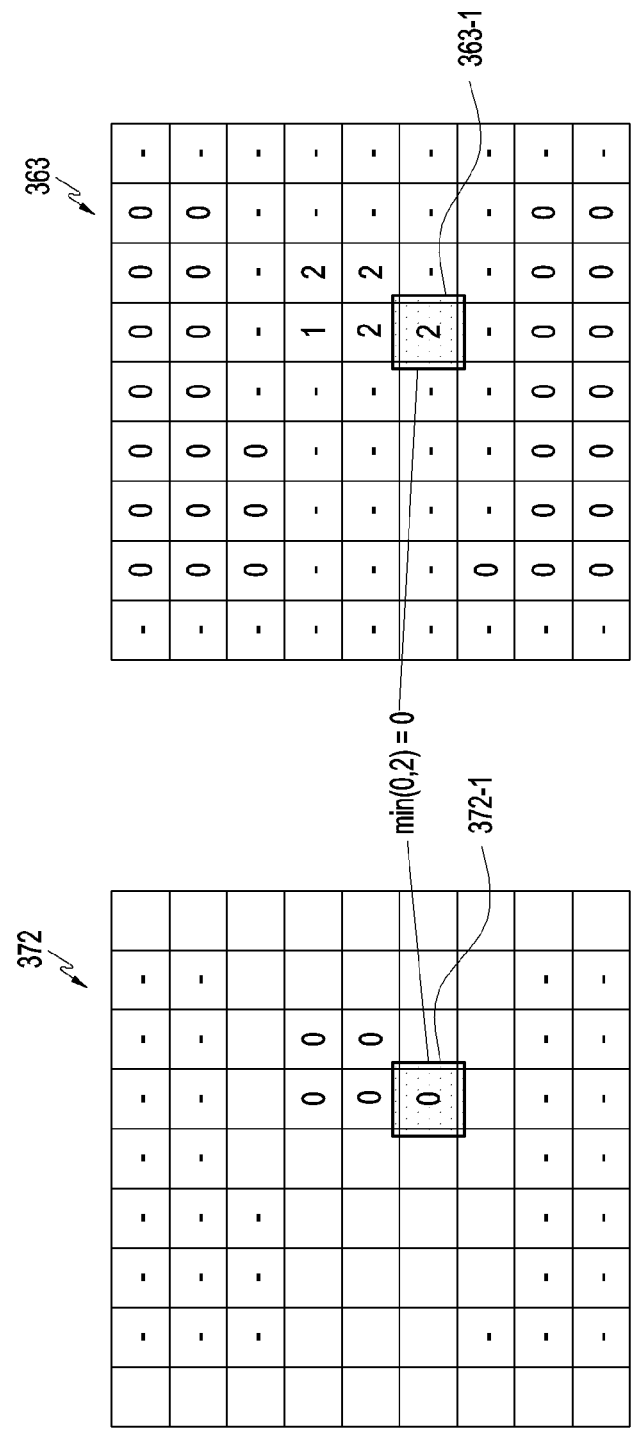
Figure 37C:
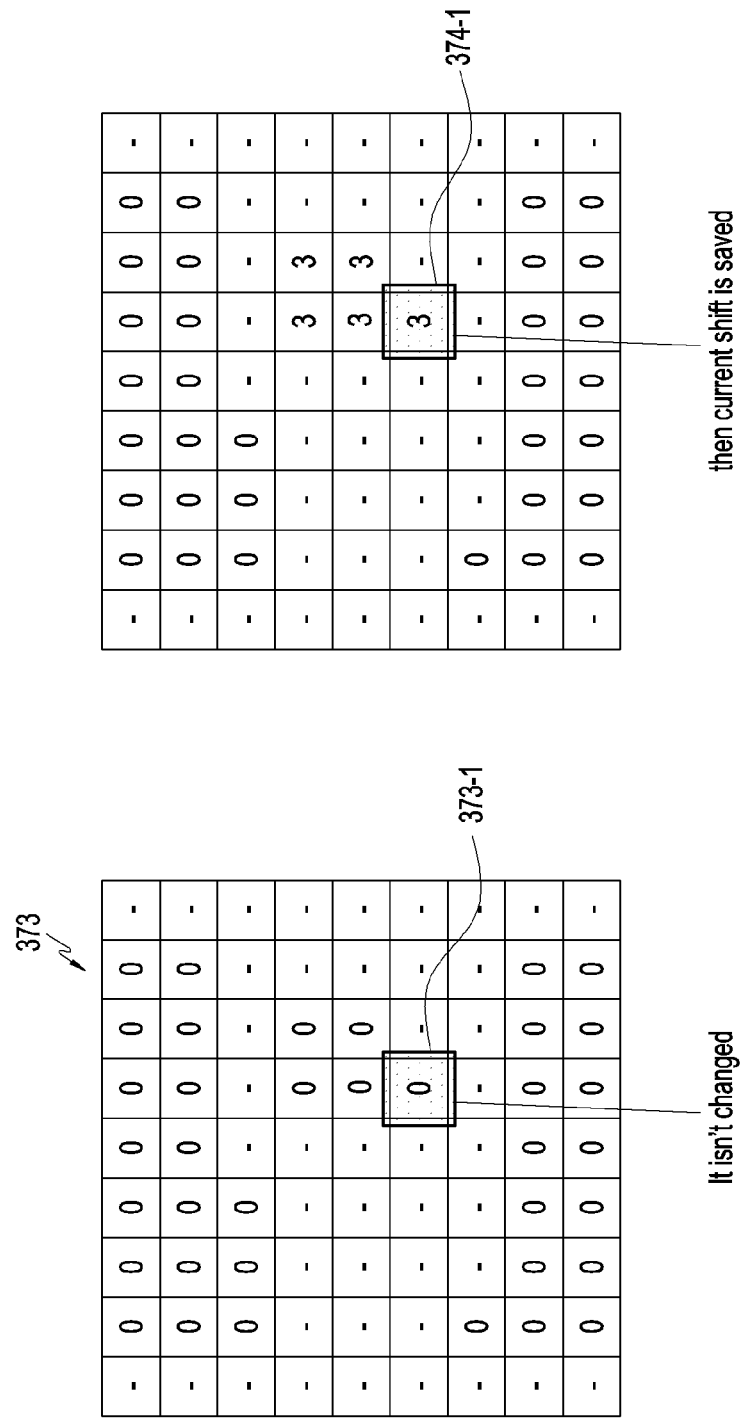

FIGS. 37A, 37B and 37C illustrate a method of determining a shift table according to another embodiment of the disclosure.

FIG. 37A illustrates a table 371 including the result values of summation of difference values calculated on the basis of vertical cluster difference results and horizontal cluster difference result when a captured pattern is shifted by three cells.

Referring to FIG. 37B, the processor 430 may determine minimum difference values by comparing the values of all of the cells in the table 361 with the values of all of the cells in the minimum cell difference table 363 illustrated in FIG. 36C. In this case, [Equation 14] may be used. Cells which are compared with each other may be at the same position in the respective tables. Further, if the value of a specific cell is not set, the processor 430 may determine a comparison result for the specific cell to be 0.

For example, the processor 430 may determine min(0, 2) for the value 0 of a cell 372-1 in the table 372 and the value 2 of a cell 363-1 in the minimum cell difference table 363 to be 0.

Further, the processor 430 may not perform the cell value comparison operation, for example, for the bordering cells illustrated in FIG. 29H.

A minimum cell difference table 373 in FIG. 37C is the result of comparing the values of the cells in the table 372 with the values of the cells in the minimum cell difference table 363, on the basis of the cell value comparison method described with reference to FIG. 37B.

If the minimum difference of a cell is changed in the minimum cell difference table 373, the processor 430 may update the shift amount. For example, if the processor 430 determines that the value 0 of a cell 373-1 of the minimum cell difference table 373 has been changed, the processor 430 may update by the current shift amount 3 for the cell 374-1.

Meanwhile, the processor 430 may process bordering cells.

To process a bordering cell, the processor 430 may use a per-component difference between an original pattern and a shifted and clustered pattern. Further, the processor 430 may use an accumulated difference of each cell for every vertical cluster. Further, the processor 430 may use an accumulated difference of each cell for every horizontal cluster. Further, the processor 430 may use an updated shift for all cells except bordering cells. Further, the processor 430 may process type-1 horizontal bordering cells, type-2 horizontal bordering cells, type-1 vertical bordering cells, and type-2 vertical bordering cells, separately or together.

An example of processing a bordering cell will be described below with reference to FIGS. 38A to 41E.

FIGS. 38A to 38E illustrate a method of processing a bordering cell according to an embodiment of the disclosure.

FIGS. 38A to 38E illustrate processing type-1 horizontal bordering cells. Type-1 cells may be defined as cells in a vertical cluster which has horizontal and vertical connections, a cell index identical to the index of a horizontal cluster, and/or at least one cell of type 1.

FIGS. 38A to 38D illustrate type-1 and/or type-2 bordering cells in the cases of 0-cell shift, 1-cell shift, 2-cell shift, and 3-cell shift, respectively.

Figures 38A, 38B:
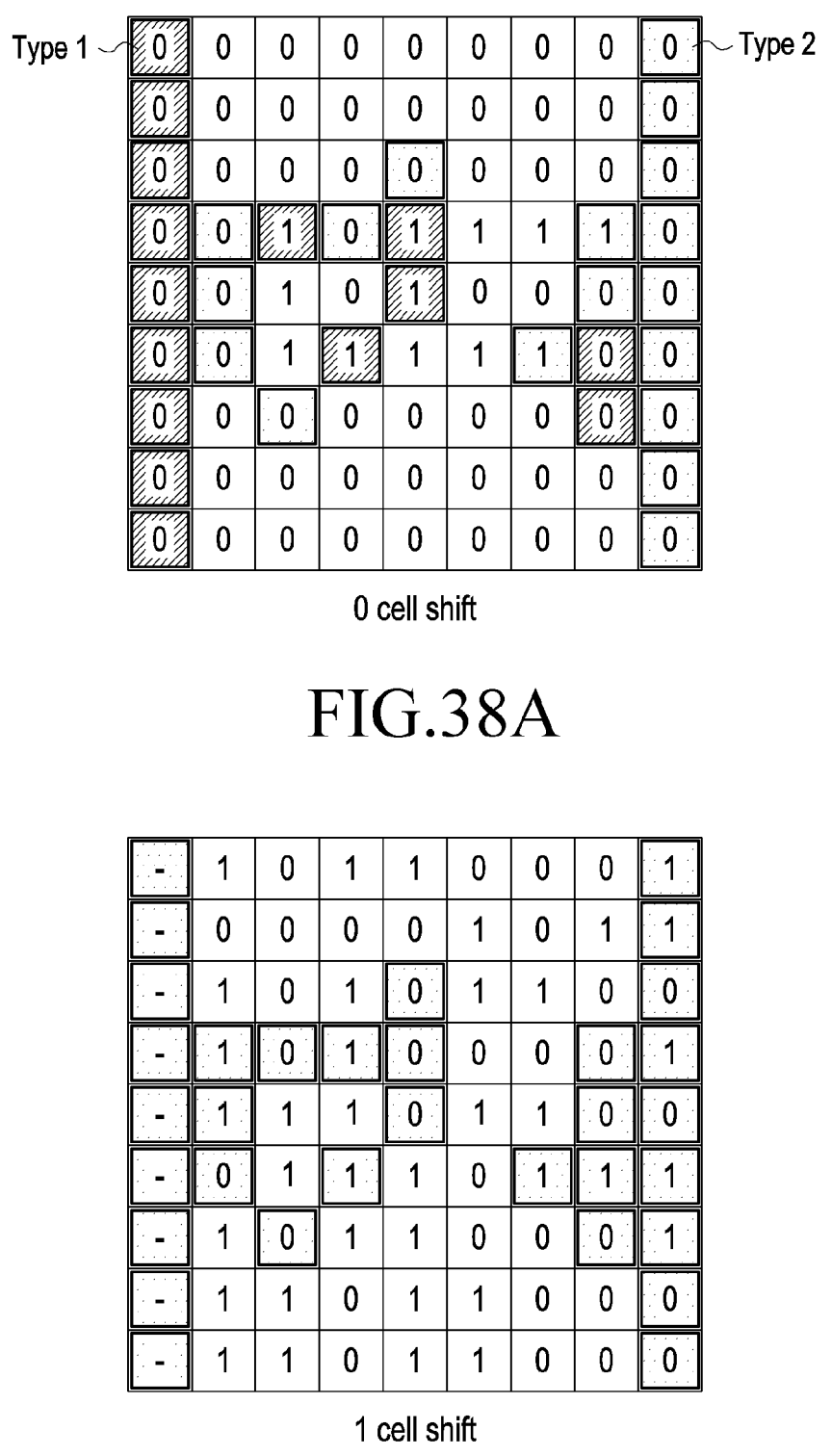
Figure 38E:
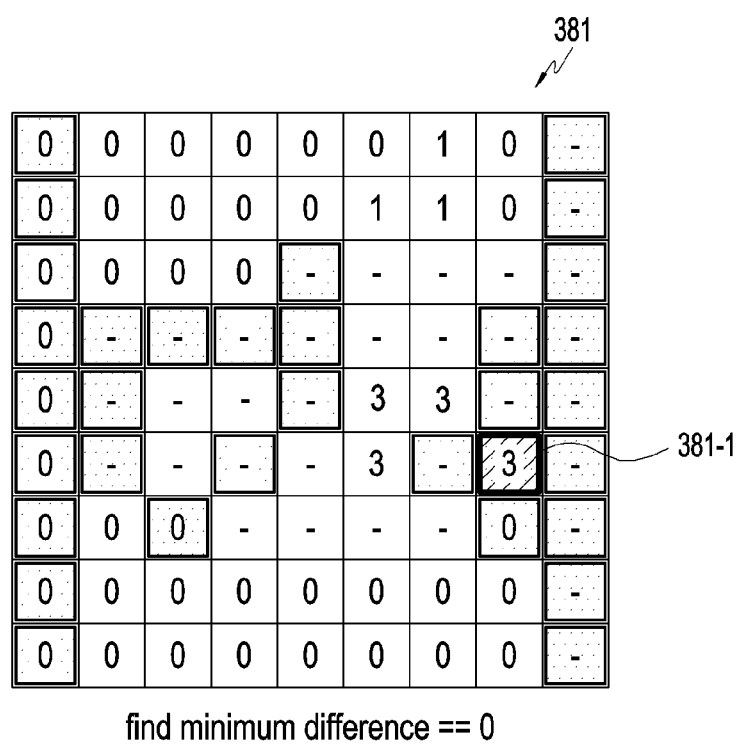

FIG. 38E may have its horizontal and vertical clusters by indexes according to an example. Further, a cell 381-1 of a table 381 is generated when two or more shifts provide a difference of 0. However, the largest shift may be applied.

FIGS. 39A to 39E illustrate a method of processing a bordering cell according to another embodiment of the disclosure.

A description redundant with the description of FIGS. 38A to 38E will not be provided herein.

FIGS. 39A to 39E illustrate processing type-2 horizontal bordering cells.

FIGS. 39A to 39D illustrate type-1 and/or type-2 bordering cells in the case of 0-cell shift, 1-cell shift, 2-cell shift, and 3-cell shift, respectively.

In FIG. 39E, for example, if a cell is connected to its horizontal cluster and a left neighbor cell by indexes, the cell has a vertical cluster by the index of the left neighbor cell.

FIGS. 40A to 40E illustrate a method of processing a bordering cell according to another embodiment of the disclosure.

A description redundant with the description of FIGS. 38A to 39E will not be provided herein.

FIGS. 40A to 40E illustrate processing type-1 vertical bordering cells.

FIGS. 40A to 40D illustrate type-1 and/or type-2 bordering cells in the case of 0-cell shift, 1-cell shift, 2-cell shift, and 3-cell shift, respectively. Herein, a type-1 cell may be defined as a cell having a horizontal connection.

In FIG. 40E, for example, once horizontal bordering cells are processed, the processed cells may be included.

If a cell is connected to its horizontal cluster and a left neighbor cell by indexes, the cell has a vertical cluster by the index of the left neighbor cell.

FIGS. 41A to 41E illustrate a method of processing a bordering cell according to another embodiment of the disclosure.

A description redundant with the description of FIGS. 38A to 40E will not be provided herein.

FIGS. 41A to 41E illustrate processing type-2 vertical bordering cells.

FIGS. 41A to 41D illustrate type-1 and/or type-2 bordering cells in the case of 0-cell shift, 1-cell shift, 2-cell shift, and 3-cell shift, respectively. Herein, a type-2 cell may be defined as a cell that does not have a horizontal connection but that has one or more neighbor vertical clusters.

Referring to FIG. 40E, the processor 430 may detect an optimum shift that minimizes the differences among an original pattern, a clustered pattern, and a neighbor cluster.

Referring to FIG. 41E, if two clusters provide an equivalent difference of 0, a cell may be set as a bordering cell.

Figure 42:
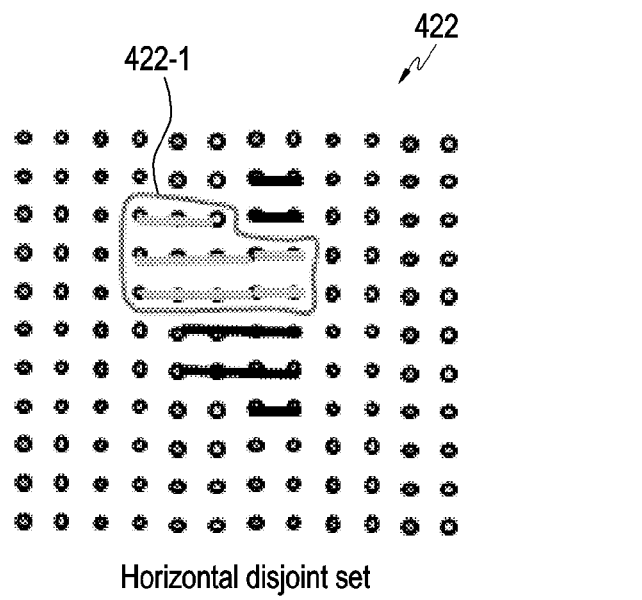
FIG. 42 illustrates object segmentation according to an embodiment of the disclosure.
Figure 42:
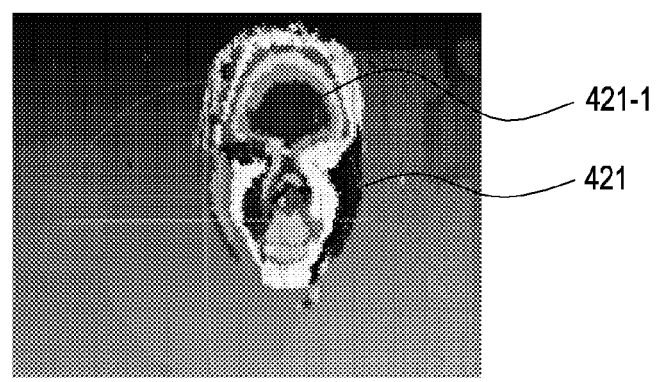

FIG. 42 illustrates object segmentation according to an embodiment of the disclosure.

Object segmentation is used to represent connected parts of the same depth in an object. Disjoint sets and an estimated disparity map are used to detect object segmentation. Object segmentation may be performed when cellular automaton pattern recognition and a connected component procedure are performed immediately.

Referring to FIG. 42, the forehead part 421-1 of a human head-shaped object 421 may correspond to the part 422-1 of a horizontal disjoint set 422.

Figure 43:
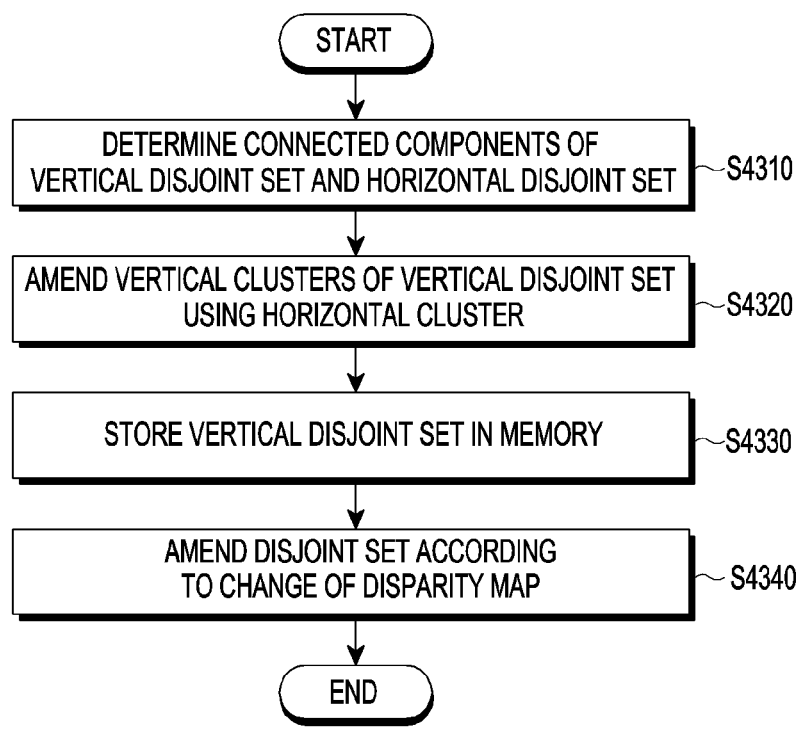
FIG. 43 is a flowchart illustrating an object segmentation method according to an embodiment of the disclosure.

FIG. 43 is a flowchart illustrating an object segmentation method according to an embodiment of the disclosure.

The processor 430 determines connected components of a vertical disjoint set and a horizontal disjoint. Further, the processor 430 determines a disparity map in operation S4310.

The processor 430 may amend vertical clusters of the vertical disjoint set using horizontal clusters from the horizontal disjoint set and the estimated disparity map in operation S4320.

The amendment is performed starting from a first cell algorithm and then moving from the left to right and up to down. In addition, if current cells and/or cells have an equal shift, the current cell of the vertical disjoint set is amended to have the index of its left neighbor cell.

The processor 430 stores the vertical disjoint set in the memory in operation S4330.

The processor 430 amends the disjoint set according to a change in the disparity map in operation S4340.

FIGS. 44A to 44H are views depicting an object segmentation method according to an embodiment of the disclosure.

Figure 44B:
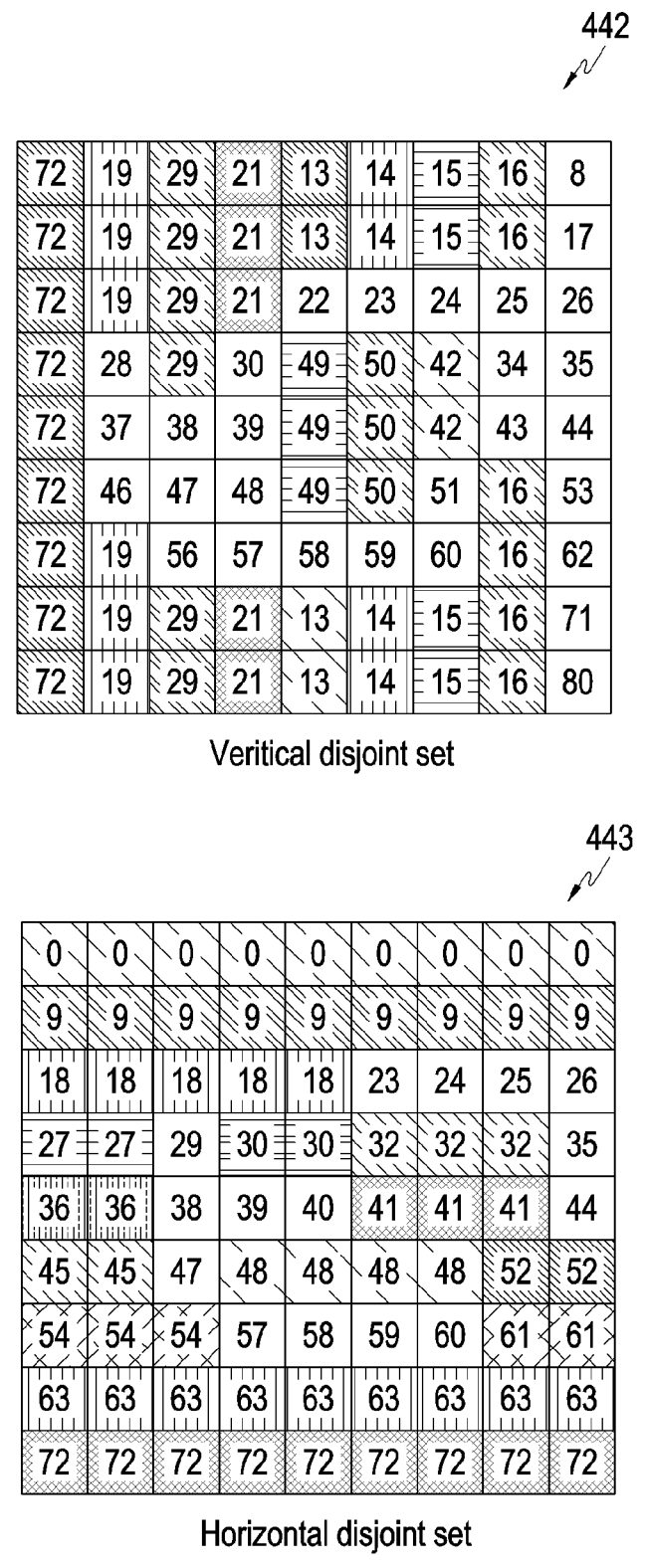

FIG. 44A illustrates a disparity map 441 according to an embodiment of the disclosure. FIG. 44B illustrates a vertical disjoint set 442 and a horizontal disjoint set 443 according to an embodiment of the disclosure.

The processor 430 determines (or reads) information about the disparity map 441, the vertical disjoint set 442, and the horizontal disjoint set 443.

Figure 44D:
Figure 44D:

For example, referring to FIGS. 44C and 44D, the processor 430 may amend index information of at least the second column of the vertical disjoint set 442 on the basis of disparity information in at least the second column of the disparity map 441.

Figure 44F:
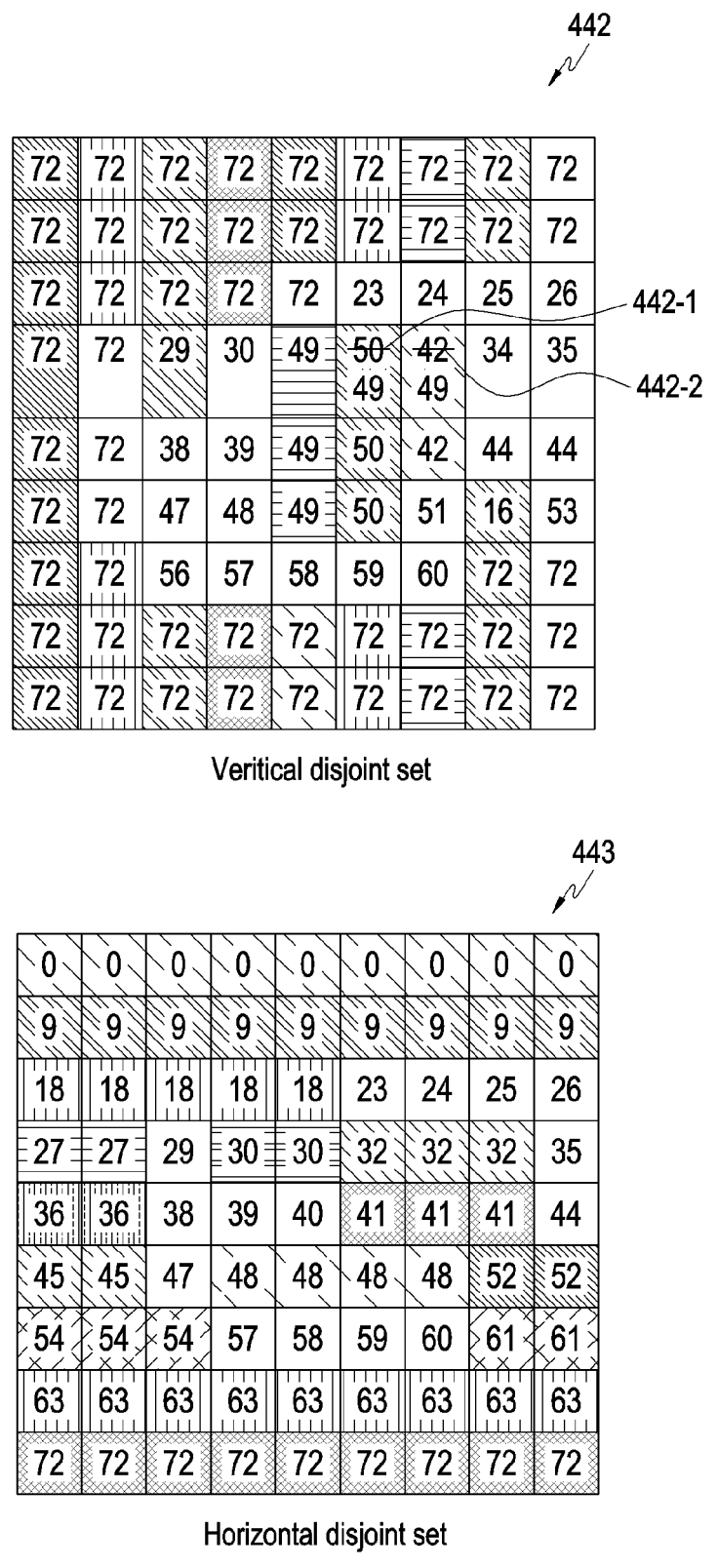

For example, referring to FIGS. 44E and 44F, the processor 430 may amend information of at least one cell (e.g., 442-1) in the sixth column of the vertical disjoint set 442 on the basis of disparity information in the sixth column of the disparity map 441. Further, the processor 430 may amend information of at least one cell (e.g., 442-1) in the seventh column of the vertical disjoint set 442 on the basis of disparity information in the seventh column of the disparity map 441.

FIGS. 44G and 44H illustrate an initial disjoint set 444, and a final disjoint set 445 generated from the initial disjoint set 444. The final disjoint set 445 may include segmented areas 445-1 and 445-2 of an object, and a bordering cell or non-pattern area 445-2.

Obviously, the object segmentation method described above with reference to FIGS. 44A to 44H is also applicable to a case where a cell is configured in units of 2×2 pixels.

FIGS. 45A to 45F are views depicting an object segmentation method according to another embodiment of the disclosure.

FIGS. 45A to 45D illustrate disjoint sets 451, 452, 453, and 454 according to an embodiment of the disclosure.

According to an embodiment of the disclosure, assuming that the size of one cell is set to 2×2 pixels, the disjoint set 451 includes index information for the top left pixels of the cells, the disjoint set 452 includes index information for the top right pixels of the cells, the disjoint set 453 includes index information for the bottom left pixels of the cells, and the disjoint set 454 includes index information for the bottom right pixels of the cells.

Figure 45E:
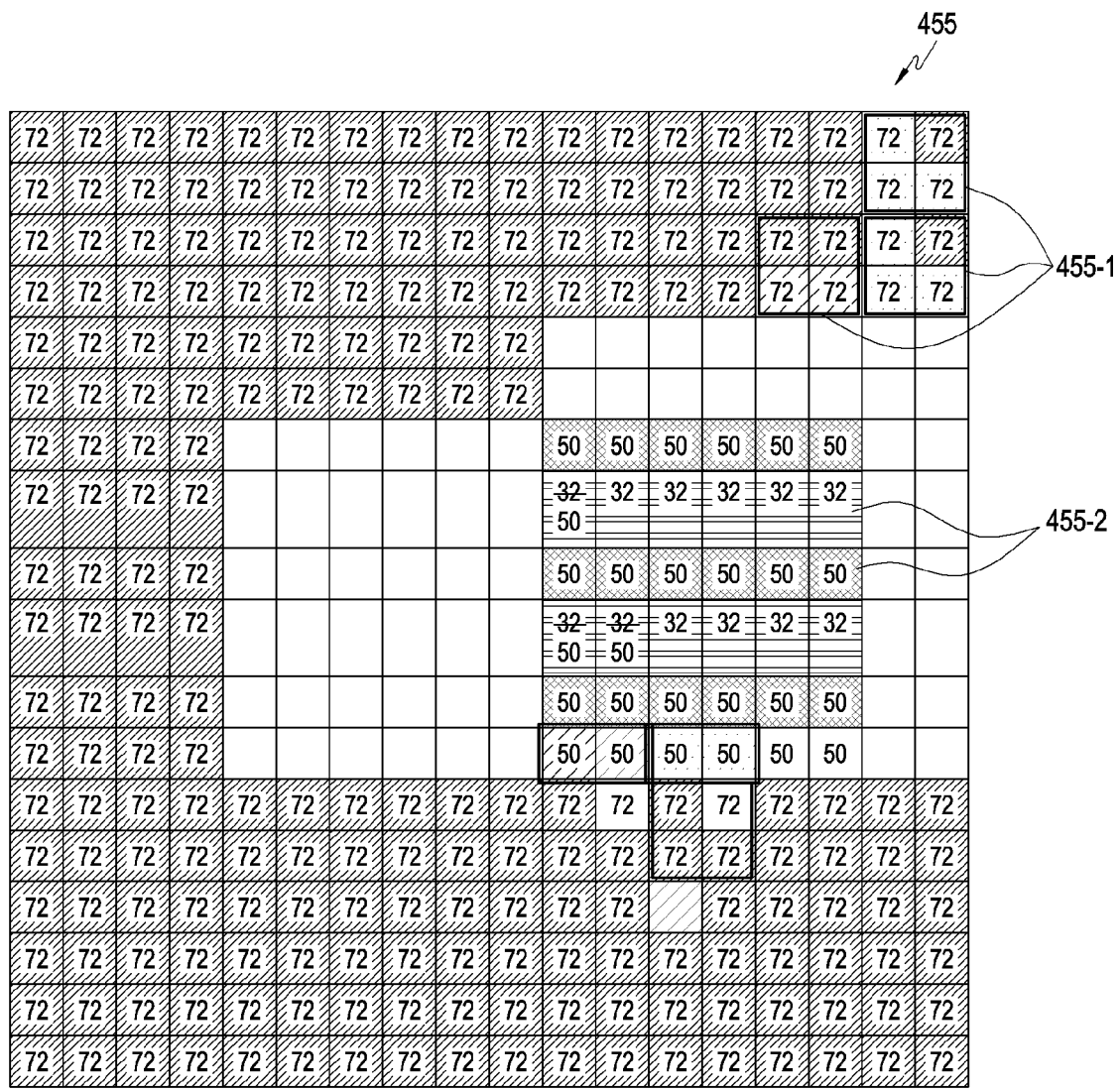
Figure 45F:
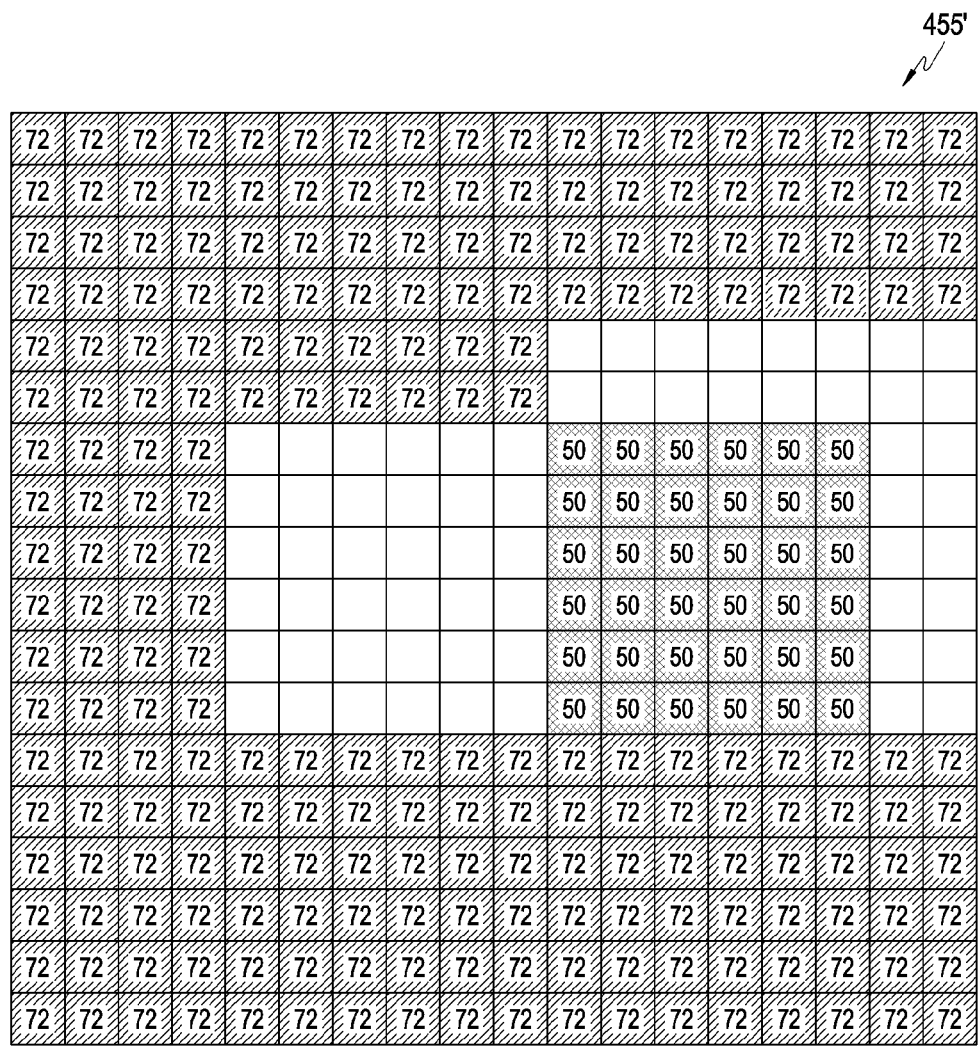

FIGS. 45E and 45F illustrate disjoint sets 455 and 455' according to an embodiment of the disclosure.

According to an embodiment of the disclosure, the disjoint set 455 may be formed on the basis of the index information of the disjoint sets 451, 452, 453, and 454. The disjoint set 455 may include self-repair cells 455-1, and cells 455-2 that are merged in the same area. The disjoint set 455' may be the result of completing object segmentation.

Figures 46A, 46B:
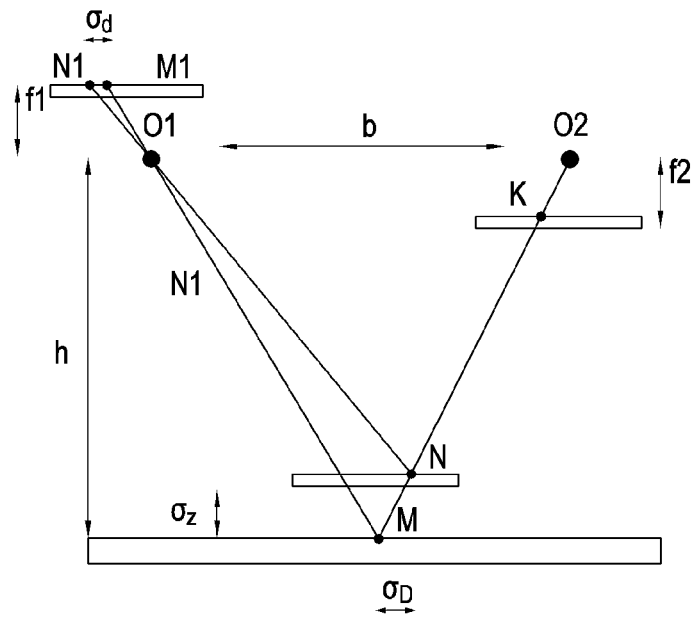
Figure 46C:
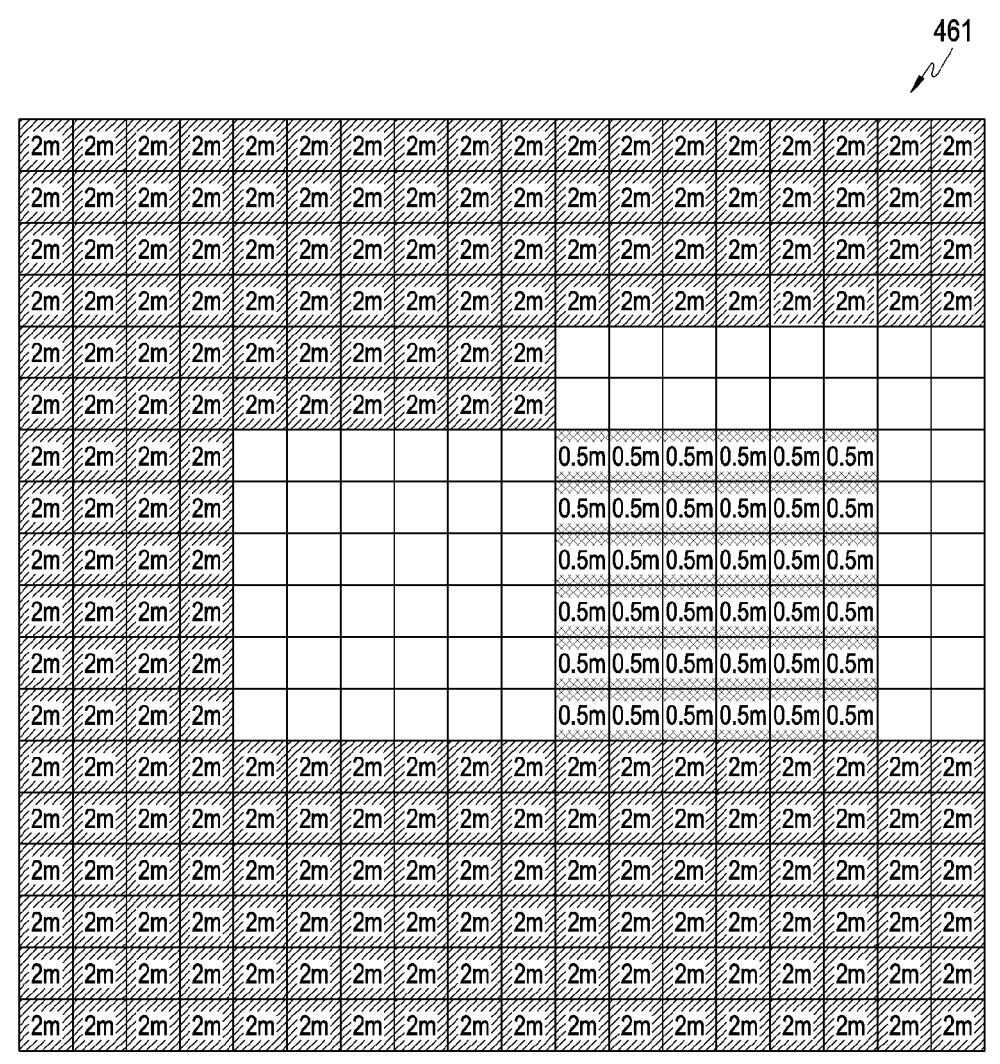

FIGS. 46A, 46B and 46C illustrate a triangulation method according to an embodiment of the disclosure.

Referring to FIG. 46A, the processor 430 may reconstruct 3D map points. For this purpose, the processor 430 may use an estimated shift amount, parameters of a lens system in the detector (or the camera and the light receiving unit), and calibration parameters.

The 3D map point reconstruction may be a process of calculating the X, Y, and Z values of each pixel in a captured cellular automaton pattern by triangulation equations. The X, Y, and Z values may be calculated by [Equation 15].

$$Z = b * \text{DETECTOR\_WIDTH}/2/\sigma_d/\tan(FOVch);$$ [Equation 15]
$$X = Z * \left(1 - 2 * \frac{X_p}{\text{DETECTOR\_WIDTH}}\right) * \tan(FOVch) + b;$$
$$Y = Z * \left(1 - 2 * \frac{Y_p}{\text{DETECTOR\_WIDTH}}\right) * \tan(FOVcv);$$

where b represents a baseline between the light projector and the detector, $\sigma_d$ represents the shift amount between an original pattern and a captured cellular automaton pattern, and FOVch and FOVcv represent field or view values corresponding to angles of the detector, and Xp and Yp represent cell coordinates in the captured cellular automaton pattern, related to a significant point of the projector.

FIG. 46B illustrates $\sigma_d$ set for Xp and Yp.

FIG. 46C illustrates a table 461 including depth information according to a Z value calculated by [Equation 15].

The process of projecting a cellular automaton pattern to a 3D space, and reconstructing 3D map points by using a captured cellular automaton pattern reflected from the 3D space has been described above in detail with reference to various drawings.

Now, a description will be given of various embodiments of a process of reconstructing 3D map points. The following embodiments and the foregoing embodiments for 3D map points may be implemented independently, in combination, or supplementally.

Figures 47, 48:
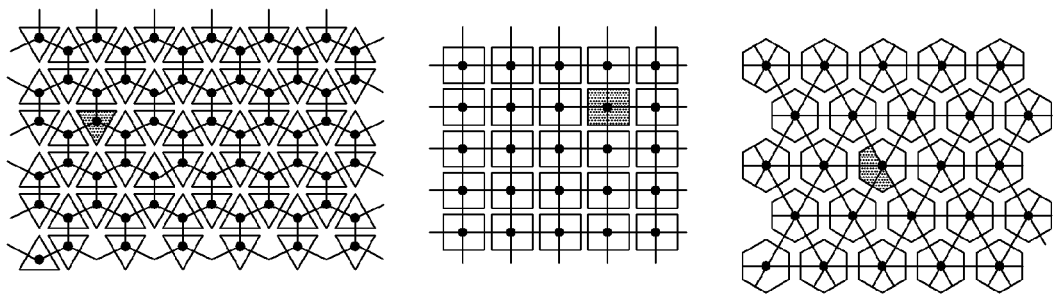
FIG. 47 illustrates the types of cellular automaton grids according to various embodiments of the disclosure.
FIG. 48 illustrates an example of cellular automata rules for a rectangular grid according to various embodiments of the disclosure.

FIG. 47 illustrates the types of cellular automaton lattices according to various embodiments of the disclosure.

FIG. 48 illustrates an example of cellular automaton rules for a rectangular lattice.

Cellular automaton evolution will be described below in detail. Cellular automata are implemented from disorderly initial states which are randomly selected in such a manner that each site has a value of 0 or 1 (generally, a probability of ½). The disorderly initial states may be general members of a set of all possible configurations. Patterns generated by cellular automata are acquired with some initial state. The structure of these patterns may be a representation of the self-organization of a cellular automaton.

A cellular automaton may begin with general initial configurations. Further, cellular automata include four types of automata evolution aspects.

For example, cellular automata type 1 may evolve to synchronous final states. Cellular automata type 2 may produce disjoint periodic structures. Cellular automata type 3 may exhibit a chaotic aspect, and produce aperiodic patterns. A small change in initial states may generally lead to a changing area which linearly increases. Cellular automata type 4 may exhibit complex local propagation structures.

Since the disclosure aims to generate a 2D pattern by coded spatial localization, 1D and 2D automata type 2 is of interest in the disclosure. Further, automata of the type (2D cellular automata) take a quiescent state a few hours later.

Figure 49:
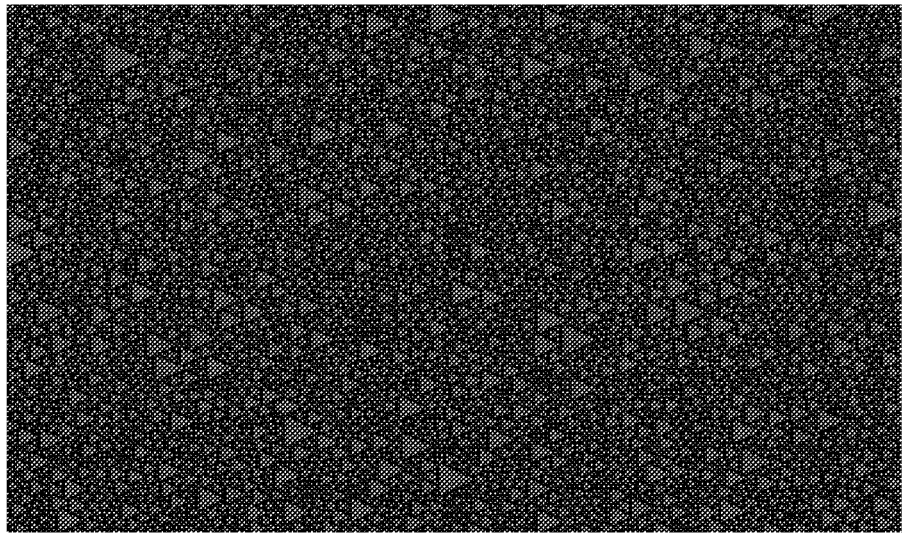
FIG. 49 illustrates a 2D pattern according to an embodiment of the disclosure.
Figure 50:
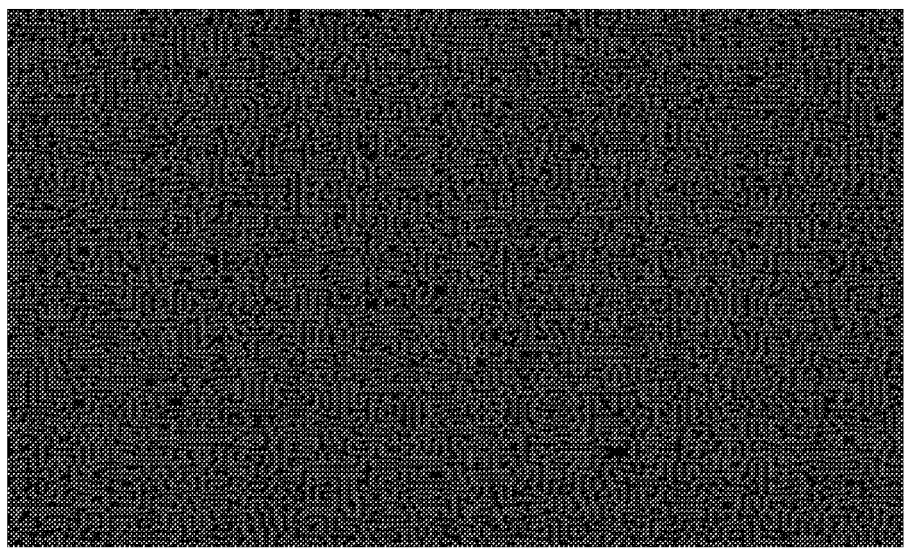
FIG. 50 illustrates a 2D pattern according to another embodiment of the disclosure.

Therefore, a predetermined 2D pattern may be generated by using [Equation 1] for 1D cellular automaton evolution and [Equation 2] for 2D cellular automaton evolution (see FIGS. 49 and 50). In the case of 2D cellular automata, [Equation 2] may be applied to a pattern generated by [Equation 1].

Cellular automaton evolution may be performed on the basis of a rule number. According to an embodiment of the disclosure, base 2 digits of a rule number may determine cellular automaton evolution. The last bit of the rule number may specify the state of a cell when all neighbors are off and the corresponding cell is also off. The bit next to the last bit may specify the state of the cell when all of the neighbors of the cell are off and the corresponding cell is on.

Further, each pair of previous bits may specify what may occur when more and more neighbors progressively (totalistic) become black. For example, bits $2^0$ and $2^1$ may apply when none of four neighbor cells are on, $2^2$ and $2^3$ may apply when one neighbor cell is on, $2^4$ and $2^5$ may apply when two neighbor cells are on, $2^6$ and $2^7$ may apply when three neighbor cells are on, and $2^8$ and $2^9$ may apply when four neighbor cells are on. For example, rule 614 may correspond to bits {1,0,0,1,1,0,0,1,1,0}.

If an outer totalistic cellular automaton with 5 neighbors is considered, a subsequent state of a cell may be determined by the 4 closest neighbors N, E, S and W, as well as the cell itself. In step 0 to step 1, new states of 9 cells should be determined. Since a first cell (at the top left corner) has an initial state of off, and all neighbors are off, bit $2^0$ is applied, thus indicating that a new state is off. A second cell (in the middle of the uppermost row) has an initial state of off, and one (a cell which is on from step 0) of its neighbors is on. Since one neighbor is on, bits $2^2$ and $2^3$ are applied. Since the initial state is off, bit $2^2$ is applied, thus indicating that the new state is on. If the procedure jumps to a cell at the origin, then none of the neighbors are on, and the initial state is on. Thus, bit $2^1$ is applied, thus indicating that the new state is on. More details of rule 614 may be described. When an odd number of cells among 5 cells are on, the state of a cell is switched to or maintained in an on state.

FIG. 51 illustrates cellular automaton evolution according to an embodiment of the disclosure. FIG. 51 illustrates the initial five steps among evolution 0 to evolution 4 generated by rule 614.

FIG. 52 illustrates a 2D cellular automaton rule according to an embodiment of the disclosure. Cellular automata are related to rule set #736 according to Wolfram terms in a book entitled "New Kind of Science".

Cellular automata were introduced by J. von Neumann to model physical and biological phenomena, in particular, for von Neumann's pioneering studies of self-reproduction. A cellular automaton is a special kind of automaton that includes a large number of mutually connected simple identical components, determined on an n-order lattice of cells within a drawing, which has a finite set of possible values. A cellular automaton evolves in discrete time steps, and a value (local state) taken by a specific cell is affected by the cell values of its neighbors in a previous time step according to a function δ known as a cellular automaton in the drawing.

A global state is defined as a vector of local states for all cellular automata during cellular automation.

A cellular automaton A will be introduced by a graph G which is a set of nodes and a set of edges E. An edge e∈E is an unordered pair of nodes, {v, v'}∈V. The neighborhood of a node is the set of nodes directly connected to it in the graph by an edge. Further, v'=nbhd(v), and if {v, v'} are included in V, this means that v' is a neighbor of v.

Herein, a deterministic finite cellular automaton A is a finite set of states Q, a finite set of inputs, X, and a transition function δ: Q×X→Q. Cellular automata are a finite or infinite network of identical deterministic finite state automata and a graph structure such that:

1. each node has the same number (finite number) of neighbors;
2. at each node, we have a fixed order of the neighbor nodes; and
3. the next state of the automaton at node v is always the same function δ of its current state and the current states of its neighbors. Thus, the ordered list of states at neighbor nodes is the input to the automaton at node v.

The ordered list of the states of the neighbors of node v is denoted by $q_{w \in Enbhd}(v)$. It is assumed that a cellular automaton of the disclosure is implemented as a set of pixels with integer coordinates in a 2D IR image including neighbors in relation to, for example, the von Neumann or Moor neighborhood in some N-dimensional Euclidean space. Further, if the automaton at node v is in state $q_0$ and all of its neighbors are in state $q_0$, the automaton is in the quiescent state $q_0 \in Q$ so that the automaton at node v will still be in state $q_0$ in the next time step of a synchronous mode. An automaton configuration is any assignment of local state values to the set of automata at nodes in a finite subgraph of G.

Usually, a cellular automaton is used to update the state of the finite automata at all of its nodes simultaneously (synchronous mode) and in discrete steps (evolution epochs). Therefore, for all epochs t>0, if at epoch t, each node v is in some state $q_v(t)$, node v is in its next state $q_v(t+1)$ in the next epoch t+1. The next state is given by $$q_v(t+1) = \delta(q_v(t), q_{w \in nbhd(v)})$$

$$q_v(t+1) = \delta(q_v(t), qw_{\in nbhd(v)}) \qquad \text{[Equation 16]}$$

Therefore, the new state of the automaton at node v is given by the local update rule as a function of $q_v(t)$, the current state of node v, and the finite list of all current states of all nodes in the neighborhood of node v. The global state of the cellular automaton A in each epoch includes the states $q_v(t)$ of its all nodes in each epoch. That is, an update in the global state is performed in the synchronous mode. Herein, the updates of the local component automata are not required to take place synchronously. Further, if each one of the updates of the local component automata is updated to its next state an unlimited number of times as (locally discrete) time goes on, an asynchronous automata network may be spoken of.

Following the general method and theorem of Nehaniv for each synchronous cellular automaton A on the graph G, another cellular automaton A' is constructed on the same graph. If each node v has $3n^2$ states and the asynchronous update method is applied to each node, that would be asynchronous. Therefore, according to the theorem, the global state of A is completely determined by a spatial-temporal section of the behavior of A'. This mathematical theorem implies that all computations that can be carried out on any synchronous automata network can be recovered from the computation of an asynchronous automata network with no constraints on how the updates actually occur later.

The local automata of the asynchronous cellular automaton A' may be constructed from local automata of the synchronous cellular automaton. It is assumed that a local automaton of A has states $Q=\{q_0, \ldots, q_{n-1}\}$ with $q_0$ quiescent and an update function δ: Q×X→Q. The states of a local automaton of A' are $3n^2$ states, Q×Q×r where r={0, 1, 2}. All neighbors are ready when none of the neighbors are in a third state (0). It is assumed that node v is in a state (q, q', r) and has a neighborhood in a state $(q_w, q'_w, r_w)$.

Then, if r=0, the next state of the node is $$\delta'((q, q', r), (q_w, q'_w, r_w)) = \qquad \text{[Equation 17]}$$
$$\begin{cases} (\delta(q, q''_w), q, 1) & \text{if neighbors are ready (0)} \\ (q, q', 0) & \text{otherwise} \end{cases}$$

$$q''_w = \begin{cases} q_w, & \text{if neighbor node } w \text{ is in state of } (q_w, q'_w, 0) \\ q'_w, & \text{if neighbor node } w \text{ is in state of } (q_w, q'_w, 1) \end{cases} \qquad \text{[Equation 18]}$$

If r is {1, 2}, the next state of the node is $$\delta'((q, q', r), (q_w, q'_w, r_w)) = \qquad \text{[Equation 19]}$$
$$\begin{cases} (q, q', r+1 \bmod 3) & \text{if neighbors are ready } (r) \\ (q, q', r) & \text{otherwise} \end{cases}$$

In general, the self-reproduction property of a cellular automaton is the possibility of generating a copy of the same pattern for a predetermined configuration. This cellular automata property enables construction of scheduled algorithms in a recognition operation. In the case of a synchronous update of a cellular automaton and image size, M×N pixels, the same number of cellular automata may be implemented in order to recognize a part (or a current posture) of a whole pattern. In the case of an asynchronous update of a cellular automaton, recognition is performed once per current position.

Figure 53:
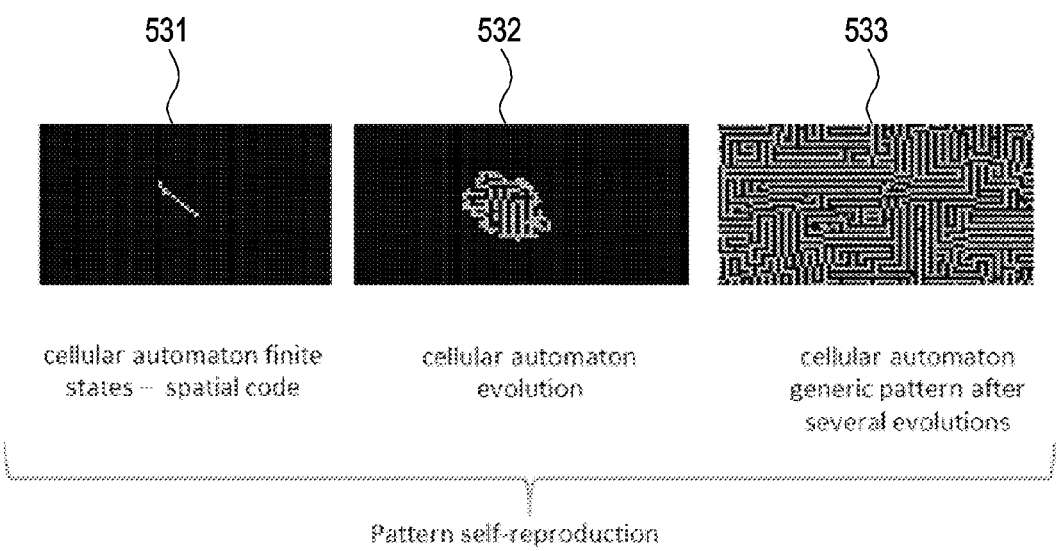
FIG. 53 illustrates cellular automata according to an embodiment of the disclosure.

FIG. 53 illustrates cellular automata according to an embodiment of the disclosure.

In FIG. 53, cellular self-reproduction may proceed in the order of cellular automaton finite states (spatial code) 531, cellular automaton evolution 532, and cellular automaton generic pattern 533 after a few evolutions.

According to the forgoing asynchronous mode, self-reproduction is the evolution of a few copies of a given automaton. Such evolution processes take place simultaneously, instead of in the synchronous mode. Accordingly, in each pixel of a captured image with a reflected pattern, cellular automaton evolution begins with an initial spatial code which continuously changes until the number of image changes becomes minimal. The captured reflected pattern is an image, and a change of the image takes place along with local automaton evolution, if a pixel value does not correspond to a pixel of the pattern.

FIGS. 54A to 54D illustrate cellular automata according to another embodiment of the disclosure.

FIGS. 54A to 54D illustrate asynchronous self-reproduction for a few copies of a cellular automaton in different positions of a lattice.

Figure 54A:
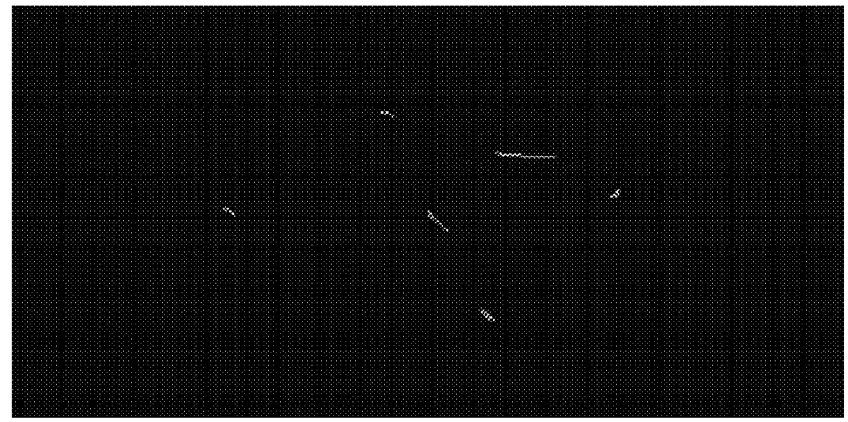
FIGS. 54A-54D illustrate cellular automata according to another embodiment of the disclosure.
Figure 54B:
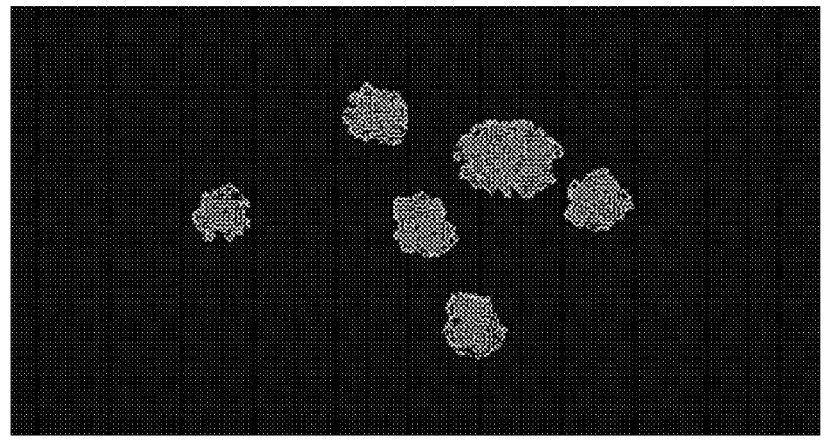
Figure 54C:
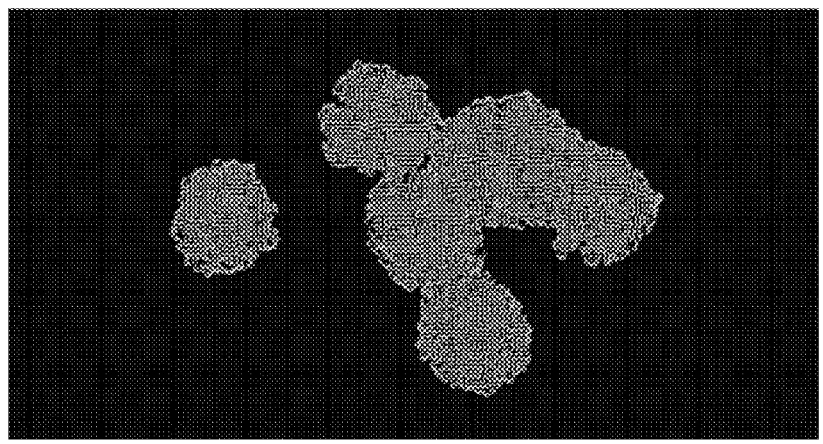
Figure 54D:
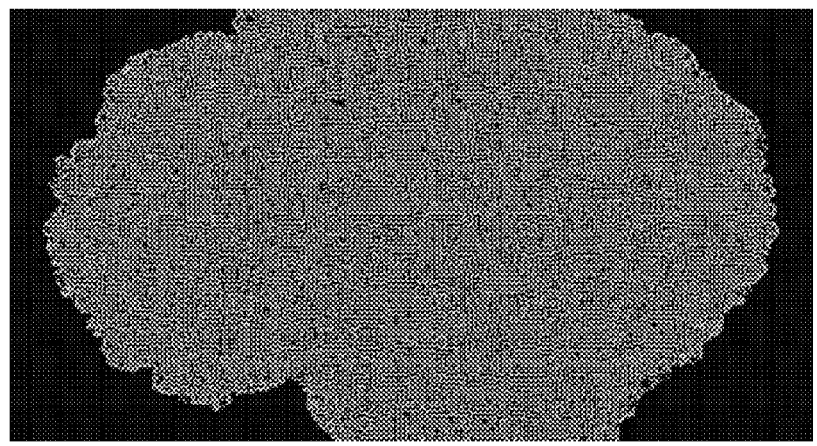

Specifically, FIG. 54A illustrates initial states of a cellular automaton. Different initial states may be coded spatial information on the cellular automaton lattice. FIG. 54B illustrates a cellular automaton after N-step cellular automaton evolution. FIG. 54C illustrates a cellular automaton after cellular automaton evolution in n steps (n>N). FIG. 54D illustrates a cellular automaton after cellular automaton evolution in n steps (n>>N).

A reflected image of a projected pattern (a reflected pattern) may be captured with partial loss. Thus, cellular automaton self-recovery is recovering an image (strips, spots, or dots) of a lost pattern from a low-reflective (black and transparent) surface. An input to a recovery algorithm is a reflected pattern with a lost part or a part with noise. Herein, an initialized cellular automaton is changed until the whole pattern is recovered. Self-recovery steps are applied to the result of self-reproduction for disparity map enhancement.

FIGS. 55A to 55D illustrate self-recovery of a cellular automaton according to various embodiments of the disclosure.

Figure 55A:
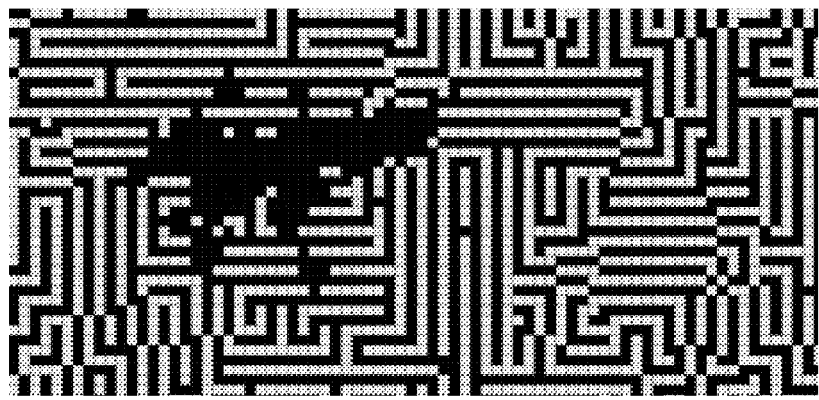
FIGS. 55A-55D illustrate self-recovery of a cellular automaton according to various embodiments of the disclosure.
Figure 55B:
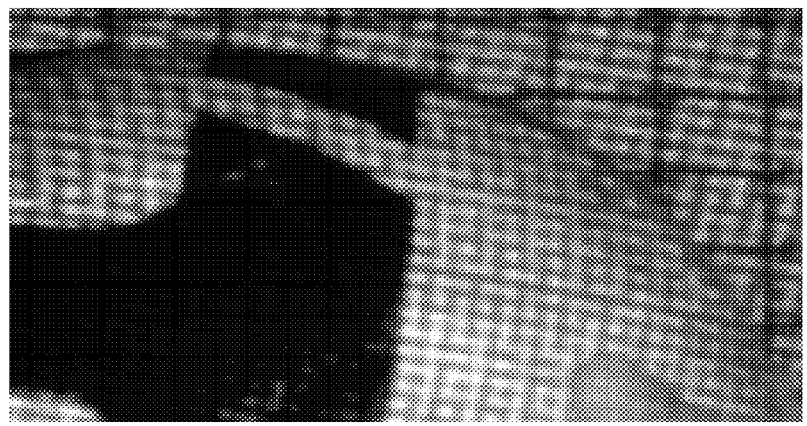
Figure 55C:
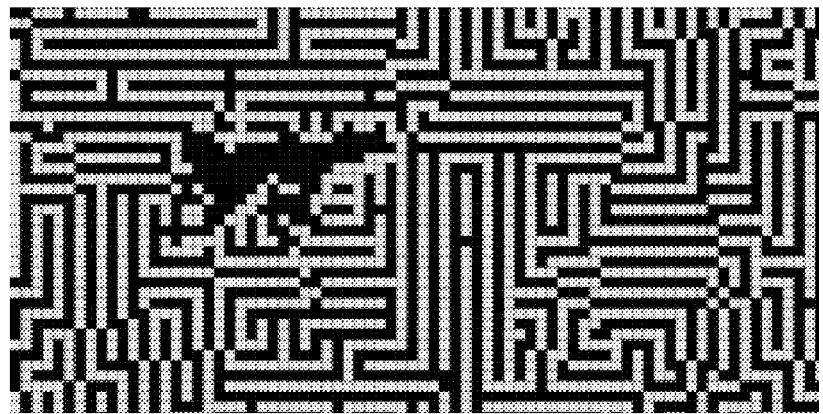
Figure 55D:
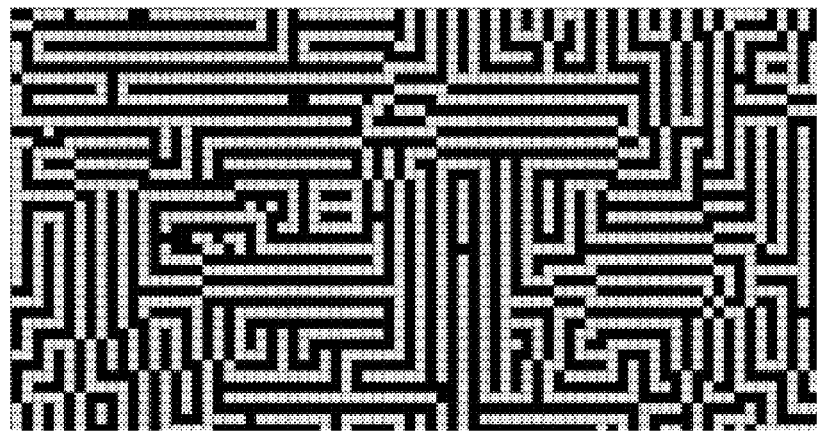

In FIG. 55A, a dark part represents the lost part of a pattern. In FIG. 55B, the pattern is lost in a dark area of a ball. FIG. 55C illustrates recovery after N evolutions of a cell automaton. FIG. 55D illustrates a wholly recovered pattern.

Generation of a genetic pattern by 1D cellular automata includes loading initial states and rules from a memory of a mobile device. In relation to 1D cellular automata, initial states may be represented as rows or columns of an image (or a lattice of the same size) including a sequence of values randomly generated for all species of cellular automata.

The disclosure proposes generation of a genetic pattern from one point on a 2D lattice of the automaton through 1D automaton evolution as illustrated in FIGS. 55A to 55D. A basic cell of a lattice may be selected to have one pixel or a larger width according to the optical limitations of a projection and capturing assembly, including a power consumption limitation. An evolution process for growth of a genetic pattern continues until epoch $t^0$ by [Equation 1], which describes the automaton rule. Although epoch $t^0$ may be selected independently, it is the states of cellular automata when the states of each species in every state have slowly distributed values along a full lattice size in a direction perpendicular to an epipolar line. The epoch $t^0$ depends on the orientation of a baseline between an IR camera and an IR projector.

Figure 56:
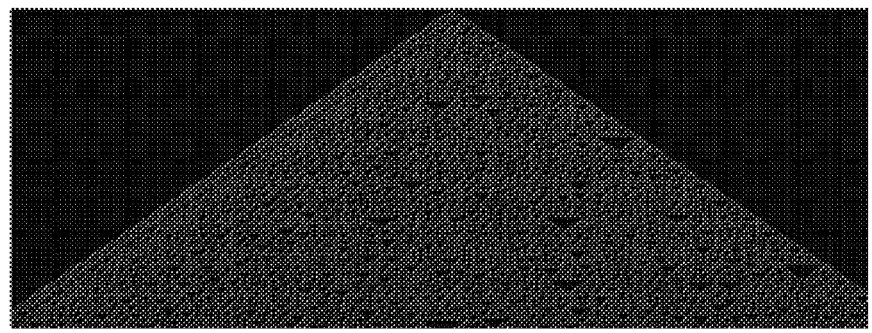
FIG. 56 illustrates generation of initial states for a cellular automaton according to an embodiment of the disclosure.

FIG. 56 illustrates generation of initial states for a cellular automaton according to an embodiment of the disclosure.

In FIG. 56, as the lattice of a pattern rotates, a baseline is directed vertically. The size of the lattice is 640×480. The epipolar line is directed along the width of the pattern, that is, the rows of an IR image.

All epochs that evolved from epoch $t^0$–$t^{width}$ are related to a zero disparity $Z_M$ from [Equation 7].

$$\sigma_Z \sim \frac{\sigma_d}{b/h} \qquad \text{[Equation 20]}$$

where $\sigma_z$ is a measurement accuracy, b/h is a proportional coefficient, and $\sigma_d$ is the accuracy of disparity measurement. An epoch may be performed within a 3D correction pair of an IR camera and an IR projector. Further, an epoch may be adjusted by using the origin of the IR camera, $Z_M$=0. It should be noted that each epoch is represented as a column or $S^f$ (see the drawing) columns in an IR image with respect to the orientation of the baseline.

Figure 57A:
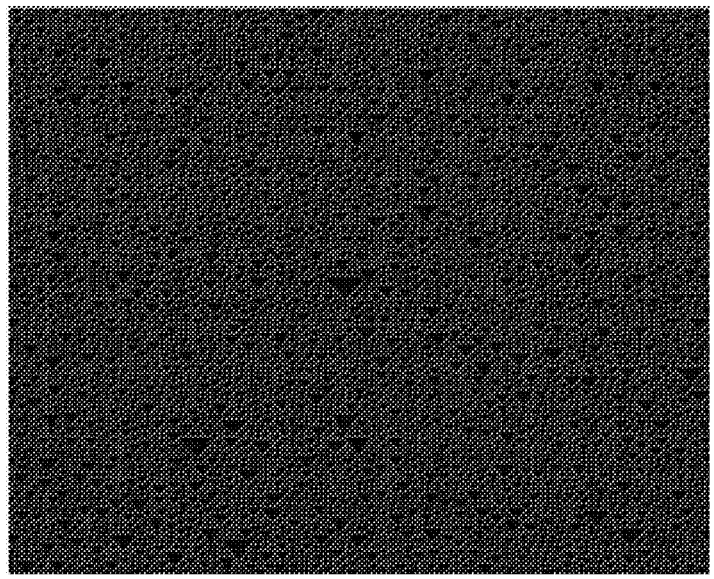
FIGS. 57A and 57B illustrate patterns generated in an initial stage according to an embodiment of the disclosure.
Figure 57B:
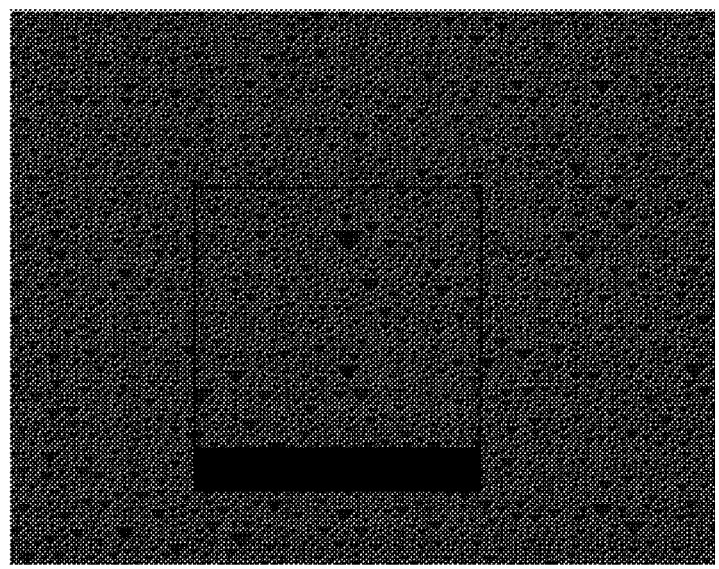

FIGS. 57A and 57B illustrate patterns generated in an initial stage according to an embodiment of the disclosure.

Specifically, FIG. 57A illustrates a pattern generated until an initial epoch by a 1D cellular automaton. FIG. 57B illustrates rough shifting of a rectangular area in an IR image when an object is positioned within a scene. In FIG. 57B, a cellular automaton lattice includes cells of 640×480 image pixels. A baseline is directed vertically.

Generation of a genetic pattern by 2D cellular automata is similar to the case of applying 1D automata. The difference lies in the number of dimensions and the initial state generation method. Generation of initial states includes generation of a 2D pattern based on 1D cellular automata from one point, as described with reference to FIG. 56. This method evolves a 2D cellular automaton by using 2D (5 or 9) neighbors on a 2D lattice with $S^f \times S^f$ rectangular cells by [Equation 2]. As described above, the evolution proceeds until the quiescent state of a 2D cellular automaton of cellular automata type 2 is detected.

Figure 58:
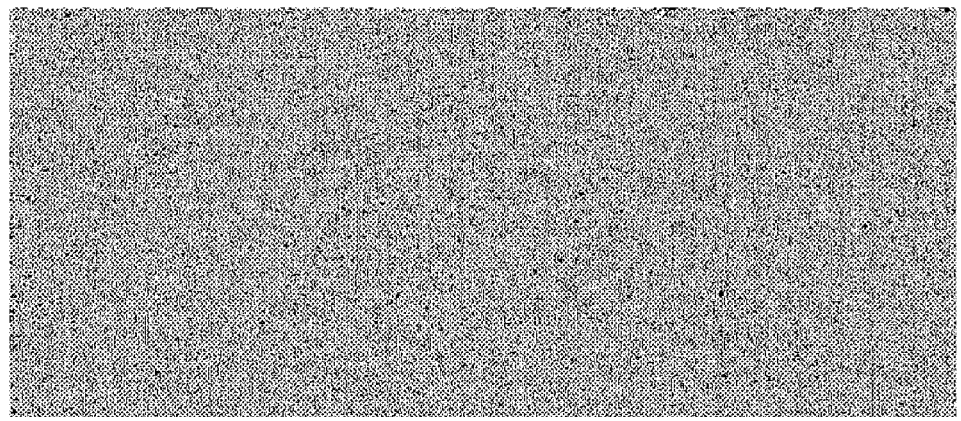
FIG. 58 illustrates a genetic pattern according to various embodiments of the disclosure.

FIG. 58 illustrates a genetic pattern according to various embodiments of the disclosure.

In FIG. 58, a genetic pattern generated from a genetic pattern generated by 1D cellular automata by applying 2D cellular automata on a 2D 640×480 lattice is shown.

A pattern generated by [Equation 1] or [Equation 2] is a reference pattern, which is used to construct a transparent binary mask for an IR projector, including an improvement means such as amplitude correction. In embodiments of 2D cellular automata, an initial state pattern is generated by 1D automata, and is a support pattern for a zero disparity.

A genetic pattern described in the disclosure is different from conventional patterns based on a pseudo-random non-correlation semi-period and properties based on the above description. When a genetic pattern generated by 2D cellular automata satisfies the periodic grid condition of mini-patterns due to the use of self-organization of cellular automata (U.S. Pat. No. 8,090,194 B2, "3D Geometric Modeling and Motion Capture Using Both Single and Dual Imaging" E. Golrdon, Mantis Vision Ltd (13 Aug. 2007)), a genetic pattern generated by 1D cellular automata satisfies the mandatory conditions of a non-correlated pattern, and may be used by the methods disclosed in U.S. Pat. No. 8,090,194 B2.

Figure 59A:
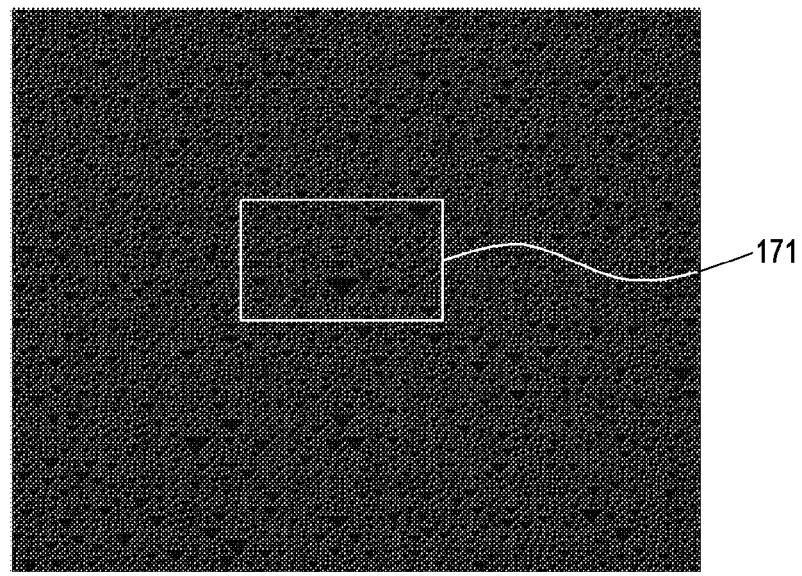
FIGS. 59A and 59B illustrate matched areas according to various embodiments of the disclosure.
Figure 59B:
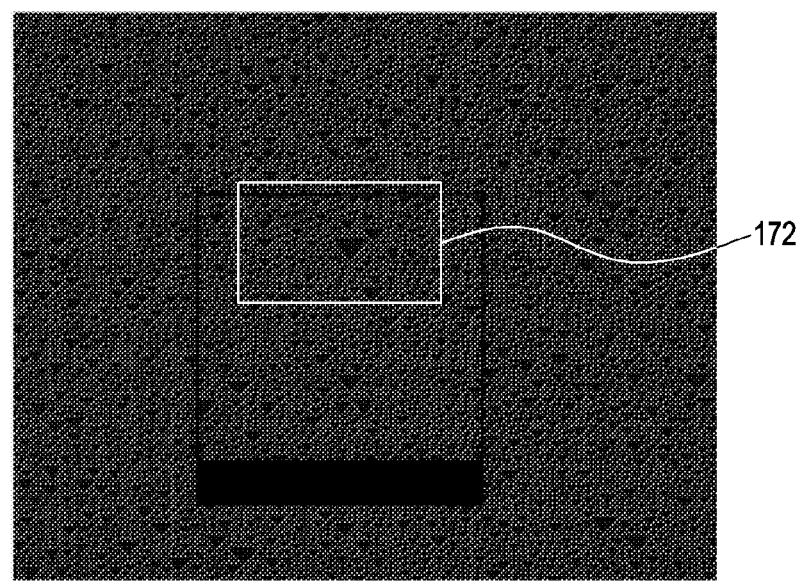

FIGS. 59A and 59B illustrate matched areas according to various embodiments of the disclosure.

FIGS. 59A and 59B illustrate matched areas 171 and 172 used to detect an offset between a reference pattern and a reflected pattern.

In the method according to the claims of U.S. Pat. No. 8,090,194 B2, a captured image is processed, an offset between a projected pattern captured once during correction and each of the patterns in a plurality of areas (a sliding window scheme, or the like) captured from an image having a reference pattern is detected, and the distance to each of the areas is determined according to each offset. In this case, generated disparity maps may be similar to initially disclosed ones except for a used improvement such as a duty cycle gray code and N-ary modulation. Herein, a matching process may be performed by convolution of the areas from a reflected reference pattern. In contrast to the fact that a genetic pattern is generated without n-ary modulation, a spatial code may be decoded by a Fourier transform interpretation in the frequency domain. Therefore, geometrical primitives self-organized in the genetic pattern have distinguishable frequency peaks.

In another aspect, a 2D cellular automaton of cellular automata type 2 has continuous mini-patterns distinguishable on a periodic grid. Therefore, the method according to the claims of U.S. Pat. No. 8,150,142 B2 ("Depth Mapping Using Projected Patterns", B. Freedman, Prime Sense Ltd. (Mar. 4, 2012)) applies demodulation to points in an image grid using correlations with a reference pattern, as follows.

$$\begin{matrix} -1 & -1 & -1 & 0 & 1 & 1 & 1 \\ -1 & -1 & -1 & 0 & 1 & 1 & 1 \\ -1 & -1 & -1 & 0 & 1 & 1 & 1 \\ \frac{1}{9} & 0 & 0 & 0 & 0 & 0 & 0 \\ 1 & 1 & 1 & 0 & -1 & -1 & -1 \\ 1 & 1 & 1 & 0 & -1 & -1 & -1 \\ 1 & 1 & 1 & 0 & -1 & -1 & -1 \end{matrix}$$ [Equation 21]

[Equation 21] may be a combination for a correlation operation and local area averaging for a reflected pattern. Correlation described in U.S. Pat. No. 8,150,142 B2 is selected due to features of the result of modulating a binary background and may be calculated by [Equation 22], instead of the convolution of each pixel in an IR image.

$$\text{correlation of point}_{i,j} = a_{-2,2} + a_{2,-2} - a_{2,2} - a_{-2,-2}$$ [Equation 22]

where $a_{-2,2}$ $a\_(-2,2)$ is a local average around a pixel (i-2, j+2). Thus, the convolution between this matrix and the pattern will provide limit values at points of the grid. With the use of a genetic pattern based on a rule, for example, "rules #736", and correlation ([Equation 21])-based derivation, sub-pixel grid points may be detected by a similar correlation function along with modulation based on a pattern structure.

Figure 60:
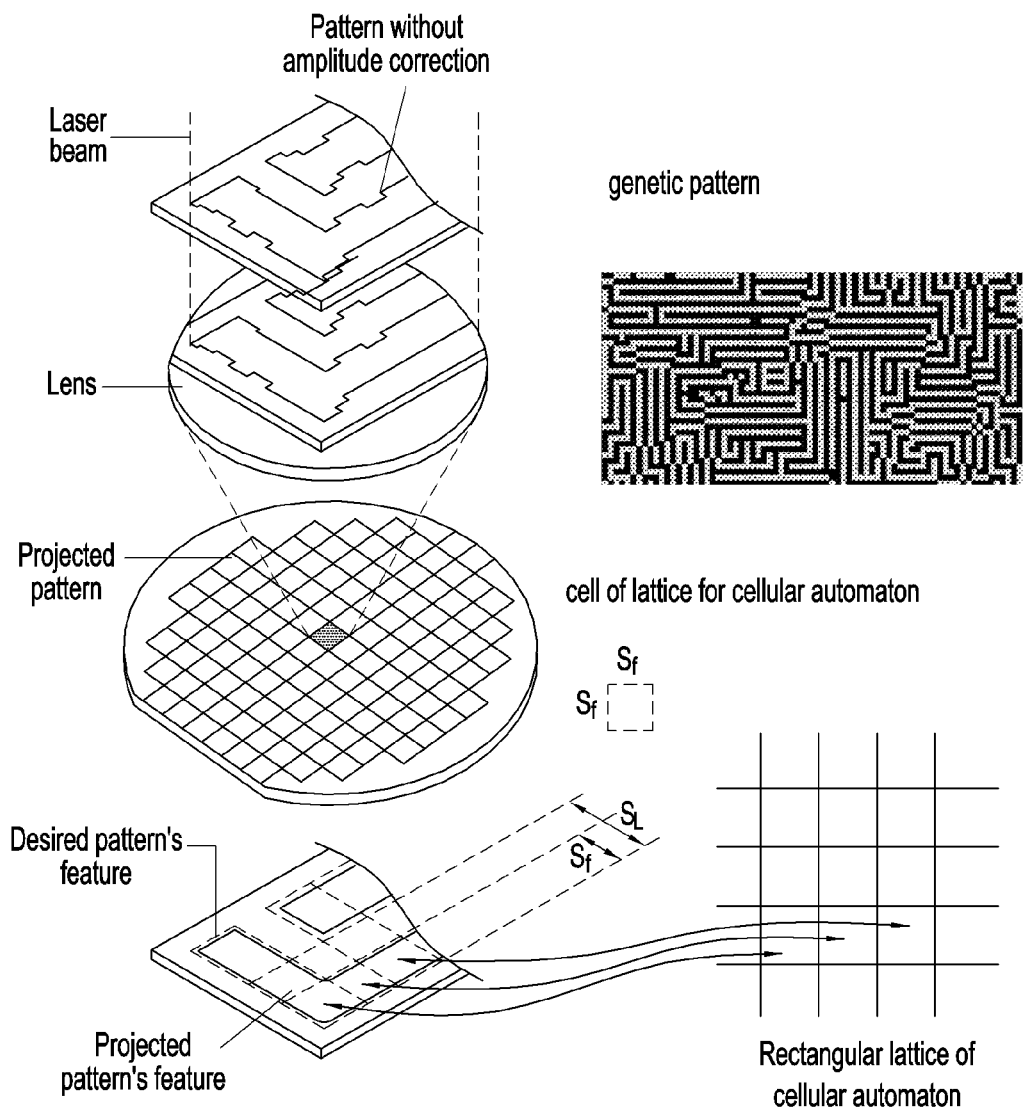
FIG. 60 illustrates a mapping relationship between a pattern image and a cellular automaton grid according to an embodiment of the disclosure.

FIG. 60 illustrates a mapping relationship between a pattern image and a cellular automaton lattice according to an embodiment of the disclosure.

It is assumed that a 2D cellular automaton is defined on a rectangular lattice, basic cells of the cellular automaton are an area of size $S_f \times S_f$, and a pair of two neighbor cells is of size $S_f \times S_L$ satisfying the following.

$$2S_f \geq S_L$$ [Equation 23]

Thus, if $c = \frac{1}{4}(S_f + S_L)$, then for each cell of the automaton on the lattice the following is given.

$$\text{cell}_{i,j} = a_{0,0} + a_{c,0} + a_{-c,0} + a_{0,c} + a_{0,-c} - a_{-c,c} - a_{c,-c} - a_{c,c} - a_{-c,-c}$$ [Equation 24]

Herein, limit points of this function across an IR image are the positions of sub-pixels of points on the illustrated grid.

Figure 61A:
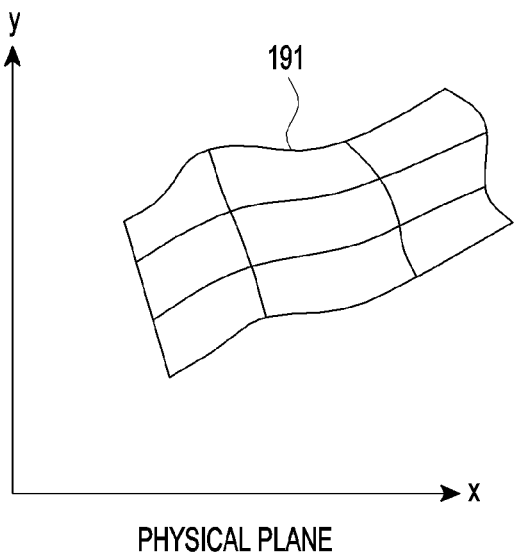
FIGS. 61A and 61B illustrate mapping between a physical grid and a computed grid for a cellular automaton grid according to an embodiment of the disclosure.
Figure 61B:
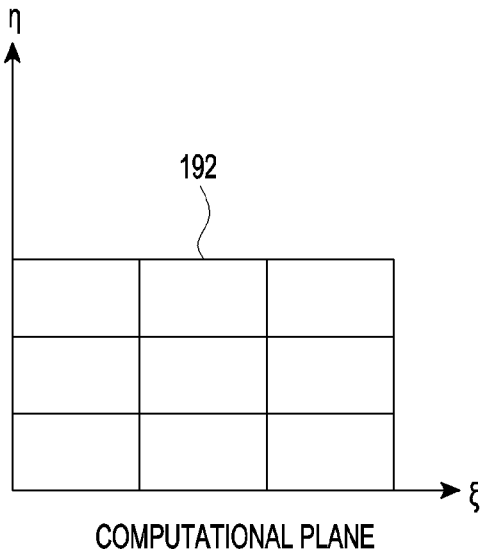

FIGS. 61A and 61B illustrate mapping between a computed grid and a physical grid in a cellular automaton lattice according to an embodiment of the disclosure.

Referring to FIGS. 61A and 61B, after sub-pixels on a physical grid 191 in an IR image are localized, a reflected pattern is mapped to a general lattice 192 of a computed plane. Additional mapping of correlations between a reference pattern and a mapped and reflected pattern are performed by convolution in a sliding window scheme.

In the disclosure, the mapping is performed by cellular automaton evolution, and rules are detected by [Equation 24]. It is assumed that local average components are replaced with non-weighted sums used to build a rule as follows.

$$\begin{matrix} a_{-c,-c} & a_{0,-c} & a_{c,-c} \\ a_{-c,0} & a_{0,0} & a_{c,0} \\ a_{-c,c} & a_{0,c} & a_{c,c} \end{matrix}$$ [Equation 25]

The structure of the rules from [Equation 25] depends on the global aspect of the genetic pattern. For this reason, the designs of the rules are individually made in each quiescent state of a 2D automaton used in generating a genetic pattern.

According to an embodiment of the disclosure, multiple sums of pixel values in the respective cells of a captured IR image may be used in order to map a reflected pattern onto a sub-pixel calculation plane. Further, cellular automata rules may be used for an evolution process. Further, convolution may be performed to improve matching relations. Accordingly, transposed sum tables and approximated algorithms reduce power consumption. The intensities of an IR image may be pre-calculated effectively for sub-pixel disparity matching in cellular automata by the following 'method of approximating a multimedia signal filtering algorithm'.

Meanwhile, a multimedia signal is a 1D or higher-dimensional array of values preserved in information within a digital representation, and the position of a value corresponds to one piece of unique information. For example, an image is a 2D array of pixels where a pixel corresponds to a $j^{th}$ row and an $i^{th}$ column. Sound is a 1D array of phonemes where a phoneme corresponds to an $i^{th}$ time point. In addition, each part of a multimedia signal has spatial relationships with its neighboring parts. The relationships depend on a grid of the multimedia signal as the neighborhood of the part. For example, an image is defined on a 2D rectangular grid. Since nodes are positioned at pixels, each pixel has 8 neighboring pixels. A phoneme has 2 neighboring values and itself. In a wide domain of a computer vision, many multimedia signal processing algorithms convert an original signal according to the values of neighbors and the value of a current part. For example, the multimedia signal processing algorithms include image or sound filtering algorithms (gradient, image blurring, sound modulation, noise cancellation, and bilateral filtering). The enumerated basic processing algorithms are a part of more complex algorithms such as AR/VR content generation, object recognition, classification, and localization, which may be accompanied by executions of basic algorithms repeated a few billion times. Further, the performance of the basic algorithms involves the read/write of the values of a large number of neighbors (memory access) and their manipulations (accumulations and multiplications). Convolution is the mathematical operator used most for the foregoing computations for neighbors. In general, neighbor relations are represented as an array of values indicating measurements (estimates or coefficients) of the influence of signals on a current part. In general, each measurement in an array is referred to as a weight, and an array of weights is referred to as a kernel (see FIG. 62). That is, the mathematical concept of convolution is referred to as the weighted sum of neighbors.

$$\text{outputting signal}_{i,j} = \Sigma^{K=0}_{MN \alpha_k \text{signal}_k^{\text{neighborhood of piece in 9i,j pose}}=} \quad \text{[Equation 26]}$$

where M and N are the width and height of a 2D kernel. For example, M×1 is the length of a 1D kernel.

Figure 62:
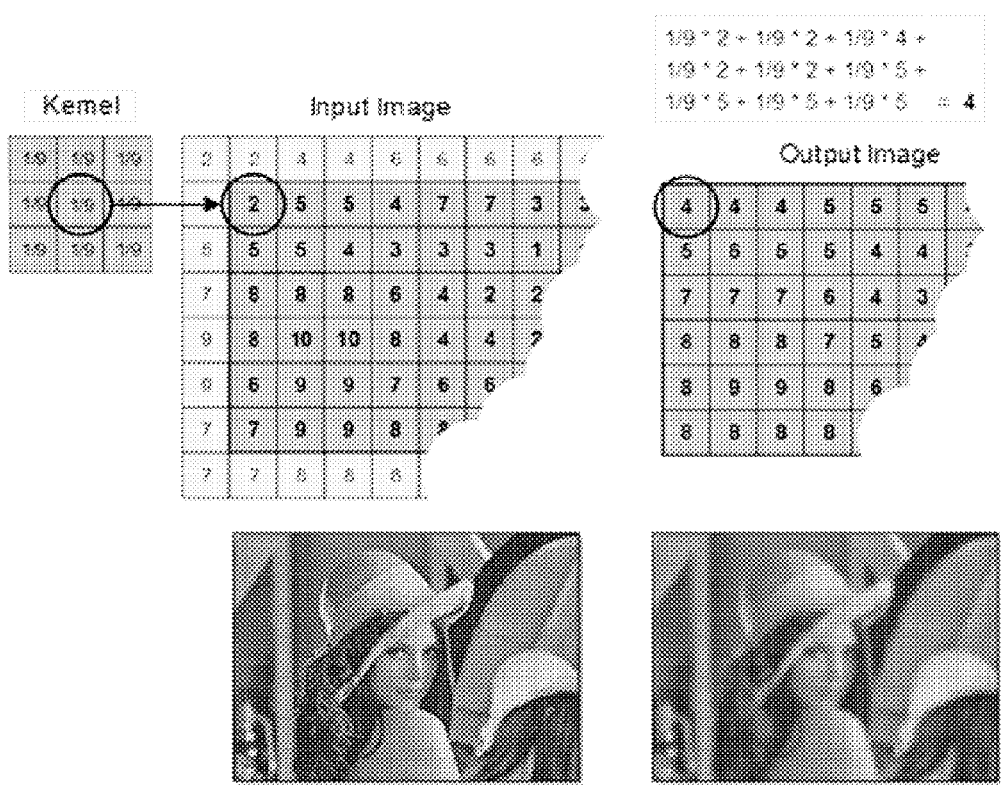
FIG. 62 illustrates convolution according to an embodiment of the disclosure.

FIG. 62 illustrates convolution according to an embodiment of the disclosure.

FIG. 62 illustrates weights ⅑ of a 3×3 array (2D kernel) and convolution of a 2D multimedia signal (image). The result of convolution is a new output image in which each pixel value is the weighted sum of neighbors of the pixel in an original image, which provides digital connection pictures or photos called mini-patterns, which are formed with weights through the connectivity, density, or concentration of the same values.

The weights of a kernel are variables which are dependent on effects expected from a resulting signal and job. However, if an accurate kernel for a specific job is considered, it is constant during program execution. For example, the kernel illustrated in FIG. 40 is dedicated to blurring an image. Some kernels are constructed from the prior knowledge of a user, and other kernels are iterative or detected by neural networks of convolution and machine learning schemes such as Ada-boost and SVM. All weights within a kernel may construct some spatial connection pictures or photos called mini-patterns.

The 'method of approximating a multimedia signal filtering algorithm' discloses the approximated performance of convolution. The essential idea of the method is that multiplication is split into summations by using the spatial structure of kernels as a set of mini-patterns within the kernel. Such splitting is available by the spatial connection configurations such as the mini-patterns. Further, the number of mini-patterns in a kernel matches K approximated elements, and the sum is a linear combination of the following form approximate to [Equation 13].

$$\text{outputting signal}_{i,j} = \Sigma_{k=0}^{K} \alpha_k \text{ mini\_pattern}_k^{approx} \quad \text{[Equation 27]}$$

Since mini-patterns are comprised of kernel M×N parts (weights), K≤M×N for one kernel. If a large number of kernels are applied to the same multimedia signal, such approximation based on grouping of weights into mini-patterns may be useful. Herein, since an algorithm includes k kernels, it is assumed that k linear combinations may be acquired for every kernel.

$$\text{outputting signal}_{i,j} = \Sigma_{l=0}^{k} \Sigma_{m=0}^{K} \alpha_{m,l} \text{ mini\_pattern}_m^{approx} \quad \text{[Equation 28]}$$

Herein, a mini-pattern is merely the sum of parts of a multimedia signal, and the form of mini-patterns may depend on a kernel. This means that multipliers in all K×K forms, mini_pattern$_m^{approx}$ are combinations of all possible forms for given kernels k×M×N. Herein, if all weights of the mini-patterns are equal, multipliers $\alpha_{m,1} = \alpha_1$ may be introduced to a squared sum ([Equation 29]) which is the sum of all parts of a mini-pattern in an original signal. The sum is a part of the whole kernel ([Equation 30]), and a partial sum.

$$\text{outputting signal}_{i,j} = \Sigma_{l=0}^{k} \alpha_1 \Sigma_{m=0}^{K} \text{mini\_pattern}_m^{approx} \quad \text{[Equation 29]}$$

$$\text{outputting signal}_{i,j} = \Sigma_{m=0}^{K} \text{mini\_pattern}_m^{approx} \quad \text{[Equation 30]}$$

Assuming that a table of mini-kernels in all possible M forms is constructed, the table will have M memos. A new image constructed with partial sums ([Equation 30]) of a specific mini-pattern for each of the position of parts of a multimedia signal Row×Col is placed in each memo of the table.

Partial sum
$$\text{image} = \Sigma_{j=0}^{Row} \Sigma_{i=0}^{Col} \Sigma_{m=0}^{K} \text{mini\_pattern}_m^{approx} \quad \text{[Equation 31]}$$

An image related to the above description is referred to as a partial sum image, and a table related to the above description is referred to as a partial sum table. Additionally, the form of a mini-pattern sum of the partial sum image may include an in-kernel offset. Therefore, mini-patterns, for example, 2×1 positioned in two different kernels with different offsets, may use the same partial sum image in the table. Then, a different w may be multiplied once every $1^{th}$ kernel, instead of m multiplications of $\alpha_{m,1}$.

When more and more kernels are used, and thus K<<k× M×N, the mini-patterns are repeated in a few kernels, which brings about additional advantages. More ones have 40% zeros or more across most kernels. For example, if a convolution neural network for classification brings an 80% reduction of power consumption for rectangular 2D patterns, the network may have 100 billion kernels, and a tenfold acceleration rate. When possible mini-pattern forms are known and the number of the mini-pattern forms is finite and small, a unique advantage is achieved. This case takes place when a multimedia signal has binary values 0/1, −1/1, or 1, 2, 4 . . . 9. An example of such an embodiment is a genetic pattern after binarization. Herein, mini-patterns are known, self-organized genetic primitives are finite, and their forms are less variable.

Further, if a plurality of kernels is ideally convolved with the same multimedia signal (for example, one image) as described before, the results are accumulated into a new single image. A set of the kernels is referred to as a layer. The convolution takes place in machine learning-based algorithms for object recognition, speech recognition, handwriting recognition, classification, or localization. The convolution is often used in pyramid matching algorithms for interpolation and location tracking. The creativity of such a case has nothing to do with the convolving order of kernels. The kernels may be selected randomly. For this purpose, the 'method of approximating a multimedia signal filtering algorithm' is disclosed for combining all kernels to another with dimension D+1 where D is the dimension of kernels. For example, 2D kernels are combined into one 3D kernel, and optimum mini-patterns are also 3D, not 2D as illustrated in FIG. 21. Therefore, the mini-patterns are formed with the volumes of parts of an input multimedia signal. Since mini-patterns fewer than K may be obtained in this manner, the mini-patterns may have significant advantages in terms of power and the number of computations, as illustrated in FIG. 22. In the case of a genetic panel of a structured light camera, a binary representation is used, and thus the 3D array will be very scarce.

The essential idea of a convolution-based approach is that each part of a genetic pattern is represented as a plurality of 2D binary kernels. Thus, a disclosed algorithm splits the product-sum operations of convolution in order to separate a sum and a product from each other in a standard case. Further, if the binary representation of a pattern is used, multiplication is emphasized in embodiments with a genetic pattern. The splitting reduces power consumption and computation complexity in a matching process for 3D environment reconstruction. In order to solve the matching, the method performs approximation, calculation of a table of partial sums, and weighting.

Kernel approximation of a genetic pattern handles each window of a defined kernel size by using the spatial structure of a kernel $G^2(x, y)$ of each actual value within a window, so as to reconfigure it by using the same linear combination of partial sums ([Equation 27]) within a 2D area having approximately the same values within a kernel ($R^{approx}=\text{mini\_pattern}_m^{approx}$) If intensities of an IR image are used, a normalization item should be introduced. Therefore, the partial sums of mini-patterns have semi-equal values inside them due to an image of actual values (noise, pattern modulation, and the dependency of intensity on depth). If O is the accuracy of kernel approximation, an output signal is given by $$\text{outputting signal}_{i,j} \cong \Sigma_{l=0}^k \Sigma_{m=0}^K \alpha_{m,l} \text{ mini\_pattern}_m^{approx} + 0(\theta) \quad \text{[Equation 32]}$$

Figure 63A:
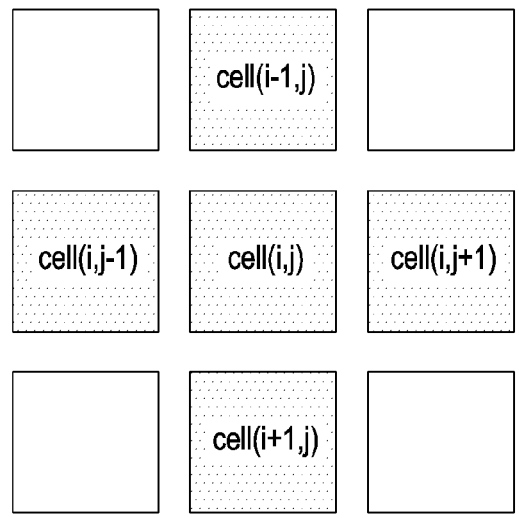
FIGS. 63A and 63B illustrate the concept of kernel approximation according to an embodiment of the disclosure.
Figure 63B:
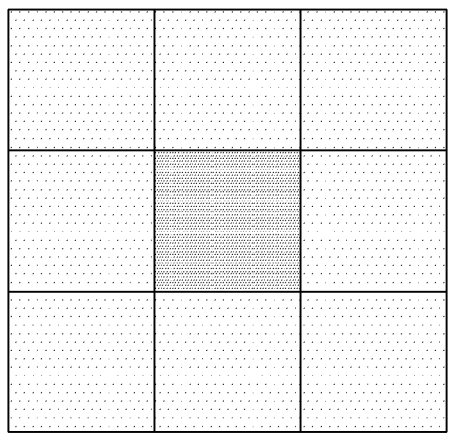

For example, FIG. 63A provides a brief description of approximation in the case of actual values, and FIG. 63B provides a brief description of approximation in a binary case. FIGS. 63A and 63B will be described below.

FIGS. 63A and 63B illustrate the concept of kernel approximation according to an embodiment of the disclosure.

FIG. 63A illustrates a 3×3 kernel of actual values which are approximated with three approximation areas and three weights according to a spatial density map of connected components, and FIG. 63B illustrates a case in which a binary representation of a reference genetic pattern is given, where each approximation kernel within a window shifting all cells by 1 cell is approximated with k connected components (k=2 (left), and k=3 (right)).

If a set of optimum areas (k<<M×N) and intensity values are used, reconstruction of the same linear combination of the respective kernels of a genetic pattern amounts to determining their weights. Further, if binary values are used, all k components connected within a window approximate k areas $R^{approx}$.

In embodiments using a genetic pattern of kernels having M and N, each ranging from 2 to 13, an exhaustive search or a BFS algorithm, which minimizes the average squared error of both sides in [Equation 20], is used. Therefore, an approximation algorithm covers all combinations available for a kernel size. The search is discontinued when there is no area $R^{approx}$ which minimizes the difference from an original kernel or from which an approximation accuracy is achieved. A set detected for linear combinations of partial sums for all windows is used for the approximated performance of matching algorithms. The original performance of matching convolution A is comprised of a large number of exhaustive convolution computations as illustrated, and approximated performance A' performs light accumulation computations with two offsets of important values for each area $R^{approx}$ equal to an actual value α and a table ♀ of partial sums. A known image size is used to pre-calculate offsets for sets of partial sum images for all k areas. These images are accumulated in one partial sum table denoted by ♀.

After the transpose calculation, convolution calculates a weighted linear combination in the following steps.
1. Partial sum calculation (accumulation computations).
2. Weighting (multiplications).
3. Accumulation of weighted sums FIG. 64 illustrates convolution according to an embodiment of the disclosure.

Herein, for convolution, multiplication-accumulation steps (top) and separate multiplication and accumulation (bottom) are used.

In general, a partial sum table ♀ includes a set of 2D arrays corresponding to approximated mini-patterns in a window within a genetic pattern. These arrays are images of sums for configuring each area such as 1×1, 1×2, . . . M×M or more complex ones according to the connected components. The sum of an input image at each position of such an image corresponds to a mini-pattern, as illustrated in FIG. 26.

Weighting may be the simple multiplication of one of the images from the table by a constant α according to pre-calculated offsets for images within the table ♀. Weighted partial sums corresponding to outputs may be accumulated. In a binary genetic pattern, all weight coefficients are 1. Therefore, the result is one-time accumulation.

According to the asynchronous mode introduced by [Equation 15] to [Equation 17], self-reproduction is simultaneously evolving a plurality of copies of a given automaton from a support pattern in an initial state according to a given rule.

Multi-dimensional cellular automata for which each rule of a set is representable as a kernel having the size of a captured image of 3×3 cells or $3S_f \times 2S_f$ pixels, as well as 2D cellular automata, are considered. Herein, a cell value is calculated by using accumulated intensities of all pixels in $S_f \times 2S_f$. Therefore, the update state function of an external totalistic cellular automaton ([Equation 13]) may be approximated through a linear combination of connected components for the following representation of actual values of a pattern ([Equation 27]).

$$a_{ij}^{t+1} = (a_{i-1,j}^t + a_{i,j}^t + a_{i+1,j}^t + a_{i,j-1}^t + a_{i,j+1}^t) \cong \Sigma_{k+0}^K \alpha_k R_k^{approx} + 0(\theta) \quad \text{[Equation 33]}$$

Further, the approximation error is 0 (θ=0) in a binary representation given as the following equation.

$$a_{ij}^{t+1} = (a_{i-1,j}^t + a_{i,j}^t + a_{i+1,j}^t + a_{i,j-1}^t + a_{i,j+1}^t) = \Sigma_{k+0}^K R_k^{approx} \quad \text{[Equation 34]}$$

Each approximation area is a connected component in the neighborhood of a cell $C_{i,j}$ in a position (i, j) on a cellular automaton lattice.

$$R_k^{approx} = \begin{cases} 1, & \text{if } x \subset [i-1, i+1], y \subset [j-1, j+1] \text{ and } C_{i,j} \subset R_k^{approx} \\ 0, & \text{otherwise} \end{cases} \quad \text{[Equation 35]}$$

According to an embodiment of the disclosure, a captured IR image is first converted to a partial sum table, and then a cellular automaton is evolved by using the approximation rules described in [Equation 34] and [Equation 35] on a partial sum image corresponding to connected components of an automaton rule.

Based on the rules ([Equation 26]), an introduced 2D cellular automaton may be approximated in order to efficiently map a physical sub-pixel grid in the captured image to a grid calculated as follows.

$$a_{ij}^{t+1} = (a_{i-1,j}^t + a_{i,j}^t + a_{i+1,j}^t + a_{i,j-1}^t + a_{i,j+1}^t +$$
$$a_{i+1,j+1}^t + a_{i-1,j+1}^t + a_{i+1,j-1}^t + a_{i-1,j-1}^t)$$
$$= \sum_{k=0}^{K} R_k^{approx}$$
[Equation 36]

Therefore, in an embodiment of the disclosure, a partial sum table 4 is calculated and then grid mapping is approximated, thereby supporting sub-pixel localization prior to self-reproduction for correspondence matching or pixel-wise convolution.

An IR camera captures a reflected genetic pattern, a 2D image obtained from the captured genetic pattern is interpreted, and then the interpreted image is processed by a program in the processor of a mobile device. The program may use a triangulation scheme of reconstructing depth information from a disparity map of the correspondence relationship between matched areas of the captured reflected pattern and a generated reference pattern. Disparity (mismatch) occurs due to a disparity effect in which the same object regarded as positioned in different depths and having different views is shifted along an epipolar direction. The shift does not exist along a perpendicular direction after calibration of a 3D camera by a depth measurement. For example, the shift is performed in a row-wise direction, and does not exist along a column-wise direction.

Therefore, the same parts of patterns need to be matched along the row direction. The matched areas are determined by deciphering a spatial code. The deciphering process includes a step of taking a part of a captured pattern and performing cellular automaton evolution from the part until each new evolution epoch brings proper matching between reflected and evolved ones. Along the epipolar direction, the part may be an area in a $j^{th}$ row and an $i^{th}$ column or a subpart of the area taken in a perpendicular direction in a 1D case, and an area of any form in a 2D or higher-dimensional case. The measurement of proper matching is the Hamming distance between two binary codes that have spatial lengths. The Hamming distance may be generated by using cellular automaton evolution of the binary codes and is calculated from the reflected pattern of a captured image.

According to an embodiment of the disclosure, the multi-dimensional cellular automaton self-reproduction property may be used in a more general context, instead of an irreversibility restriction. A scene of an environment having only one rectangular object positioned on a flat table illustrated in FIG. 58 may be captured. Then, the rectangular area of the object in an IR image is shifted along an epipolar line. A spatial code in the position of each cell is deciphered in a 2D pattern. Cellular automaton evolution is performed on all columns of the reflected pattern in a direction perpendicular to the epipolar direction. For every row in epoch $t^0$ to $t^{max}$, minimum shift discovery is performed. Therefore, the disparity is given by shift=d−i where $t^d$ is an epoch and i represents a current column, when the Hamming difference between a reference pattern and a reflected pattern in a $j^{th}$ row is minimal for an $i^{th}$ column. Herein, the uniqueness of each epoch is used. In this example, every row related to the surface of the table has the same shift (disparity) $t^{table} + \sigma^{noise}$ along the epipolar line, where $\sigma^{noise}$ is 2D noise in a table depth. Additionally, the algorithm removes obscurity in the next steps by displaying edge and shadow cells. Such a disparity map may include areas with non-uniform depths and mismatched areas, such as holes and artifacts. Areas having depths may be used in reconstructing or segmenting (splitting) a scene that has pixel-level accuracy.

To detect a more accurate disparity estimate, the program forms an initially estimated new pattern form in columns and rows in each area. This construction process includes an operation of shifting back each matched area to a zero disparity position according to disparity estimates, and thus may be related to a reference genetic pattern. The detected new pattern may include holes in non-matched or obscure cells. After the program takes the constructed pattern, the program applies the self-recovery process from it. Self-recovery involves global cellular automaton evolution which means evolution from the constructed pattern. An enhancement and recovery process may be performed in the asynchronous updating mode according to [Equation 15] to [Equation 17]. Herein, pattern generation and initial estimation are applied in the asynchronous mode by [Equation 3]. The global evolution is intended to minimize the difference between the reference pattern and the constructed pattern. Accordingly, evolution in each cell asynchronously recovers insufficient or lost information such as holes or artifacts. This enhancement is made possible by global limitations provided by a complete reference genetic pattern.

After the constructed pattern is recovered, the disparity value of a matched area is allocated to the recovered cells of the pattern. Then, all disparities are incorporated into one disparity map having the resolution of a cellular automaton lattice, that is, the resolution of a cell of $S_f \times S_f$ pixels or the resolution of a pixel. Sub-pixel values are obtained by the backward mapping of grids to the physical plane of the IR image. Therefore, a sub-pixel disparity map including forward mapping errors or other distortions described above is acquired. To emphasize the errors, the error optimization problem may be solved by Levenberg-Marquardt non-linear optimization for static correction as already used in the disclosure in order to adjust all sub-pixel values (texture or color when an IrW or IrW-RGB matrix of an IR camera is used in the embodiments) according to the constraint of non-continuity.

A genetic pattern generated by means of a 2D cellular automaton is deciphered in a very similar manner to the 1D cellular automaton case. The difference lies in that the afore-described reference pattern generation and self-reproduction are performed in an area, instead of in rows (columns). Therefore, the program generates a supporting 2D pattern by the evolution of a 1D cellular automaton (for example, the same 1D cellular automaton as described with reference to the drawings) in the initial steps. This pattern is used as a support for a zero disparity. In this manner, the program uses various shifts of the support in order to initialize the self-reproduction of the 2D cellular automaton for each cell and its neighborhood. Therefore, the program detects an initial disparity estimate. Then, the program generates a new one in relation to the 1D cellular automaton case for each area, and performs self-recovery. After the initial estimation of a pixel-wise disparity map is enhanced, the program removes holes and artifacts by globally applying the self-reproduction of the 2D automaton. Subsequently, backward mapping and non-linear optimization are applied to obtain a dense sub-pixel disparity map, in a similar manner to the 1D cellular automaton case.

Figure 65:
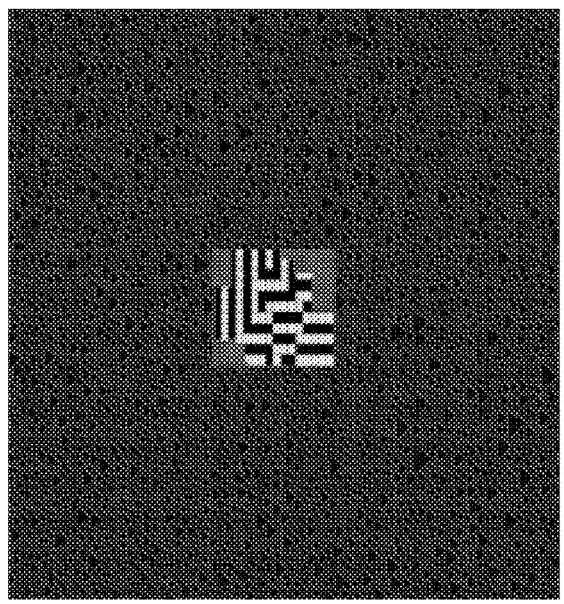
FIG. 65 illustrates generation of a genetic pattern according to an embodiment of the disclosure.
Figure 65:
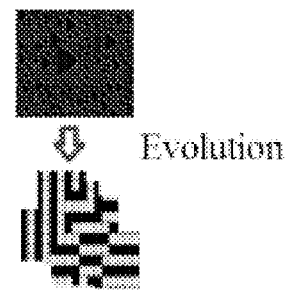

FIG. 65 illustrates generation of a genetic pattern according to an embodiment of the disclosure Specifically, FIG. 65 illustrates an example of generating a genetic pattern through 2D cellular automaton evolution from a genetic support pattern generated by a 1D cellular automaton.

According to an embodiment of the disclosure, [Equation 33] to [Equation 35] for a quantity type-state update function may be applied to a partial sum table having approximated the performance of evolution for a 1D or higher-dimensional cellular automaton. An embodiment of the approximated performance provides dense depth reconstruction by use of a genetic pattern having a line size exceeding one pixel. In fact, for a cell size of $S_f \times S_f$ pixels, a sub-pixel disparity map may have a lower resolution than an original IR camera image based on a factor $S_f$. Further, convolution approximation may be performed to recover intermediate values between cells. In this case, since the number of convolution computations is smaller than in the foregoing case, an initial estimate may be used to thereby select a set of kernels for each position.

Evolutionary algorithms are the names of algorithms for an evolutionary calculation field that is a lower field of natural computing. The evolutionary algorithms are a paradigm for solving search and optimization problems in high-order combinations or continuous search spaces, inspired by the idea of using the principle of natural evolution. The most widely known examples are genetic algorithms, genetic programming, evolutionary strategies, and evolutionary programming.

A general operating principle for all cases of evolutionary algorithms is based on a program loop involving optimization evolution of simplified implementation for operator modification, recombination, selection, and a set of candidate solutions (often, called the population of individuals) to given problems. In this general configuration, a modification corresponds to a modification to one candidate solution which typically prefers fewer modifications to more modifications. Recombination corresponds to the exchange of components between two or more candidate solutions. An evolutionary process toward populations increasing average suitability is driven by preferring better candidate solutions, which will be grown with a higher probability until the next generation, to poorer candidate solutions. Suitability evaluation is intended to calculate the measurement of excellence related to a candidate solution. That is, a suitability function corresponds to an available object function of an optimization problem.

Evolution of parameters of complex algorithms may seem to be a design problem that, although a reverse design problem, that is, a target design (the behavior of an algorithm to be parameterized) is known, the method of implementing the target design is not known. A reverse design of a cellular automaton corresponds to the problem. A cellular automaton is used to generate a global state by using local rules in many fields. Finding rules that display an intended aspect may be a difficult work in relation to the problems of an actual world.

Hereinbelow, evolution of a cellular automaton at epoch $t^i$ to epoch $t^{i+x}$ according to synchronous update ([Equation 1] and [Equation 2]), asynchronous update ([Equation 15] to [Equation 17]), or approximated performance ([Equation 33] and [Equation 35]) is considered.

In a 2D lattice, the cellular automaton has states $C_t^i$ in epoch $t^i$, and states $C_t^{i+x}$ in epoch $t^{i+x}$ a. The size of a transition rule will become larger when possible, according to the limit of power consumption. Therefore, the suitability function of a genetic algorithm, according to the disclosure, may be introduced as the difference between $C_t^{i+x}$ and an estimate based on the transition rule $\delta^T$. Since the approximation of performance for cellular automaton evolution is applied, the concept of prediction is used in the context of probability. Therefore, the genetic algorithm (GA) requires an optimum solution or transition rule that provides an accurate approximation of cellular automaton forward evolution $\delta_x^T$: $t^i \to t^{i+x}$ or backward (reverse) evolution $\delta_x^T$: $t^{i+x} \to t^i$ with probability $\mu$.

The GA evolves a population of L transition rules (individuals each having a size of size 9×9 bits (=81 bits)) for detecting what satisfies the probability $\mu$ or the best performance. It is assumed that the GA uses tournament selection to determine whether to maintain any individual alive or not. This involves execution of 'tournaments' for the population to determine the next generation. In each tournament, q individuals are selected randomly from generation t, and an individual with the highest suitability is copied for generation t+1. This is repeated until generation t+1 has the same number of individuals as generation t.

After the selection, a recombination is applied to generation t+1. The recombination is performed by modifying the resulting individuals by means of single point crossover for a subset of the population and a probabilistic bit flip. The relative number of individuals used in the crossover is denoted by a crossover rate c. The modification is performed by inverting all bits of individuals with probability m. For example, a small crossover rate may be selected for the purpose of detecting minimum mini-patterns for additional performance approximation. All individuals within the population are initialized randomly by normalized distribution of the number of 1s of bit codes of the individuals. This implies that the number of individuals having a specific number of 1s is roughly equal to the number of individuals having a different number of 1s. This prevents an algorithm from specializing a specific area of a search space at the beginning of the algorithm. After the best individuals of D generations and the last generation are best solutions to specific positions of cells (i, j) in the cellular automaton lattice, the procedure ends. This means that the suitability function used in the algorithm does not need to be probabilistic, and all such problems may be combined into one problem. Accordingly, the number L of individuals is selected according to the number of cells in a 9×9-cell lattice, and herein, a cell is of size $S_f \times S_f$.

The suitability function is evaluated by an average squared error between evolutions based on a transition rule and a cellular automaton rule applied to each cell. Herein, the best solution may be determined by a softmax function for all optimal solutions of cells.

Figure 66:
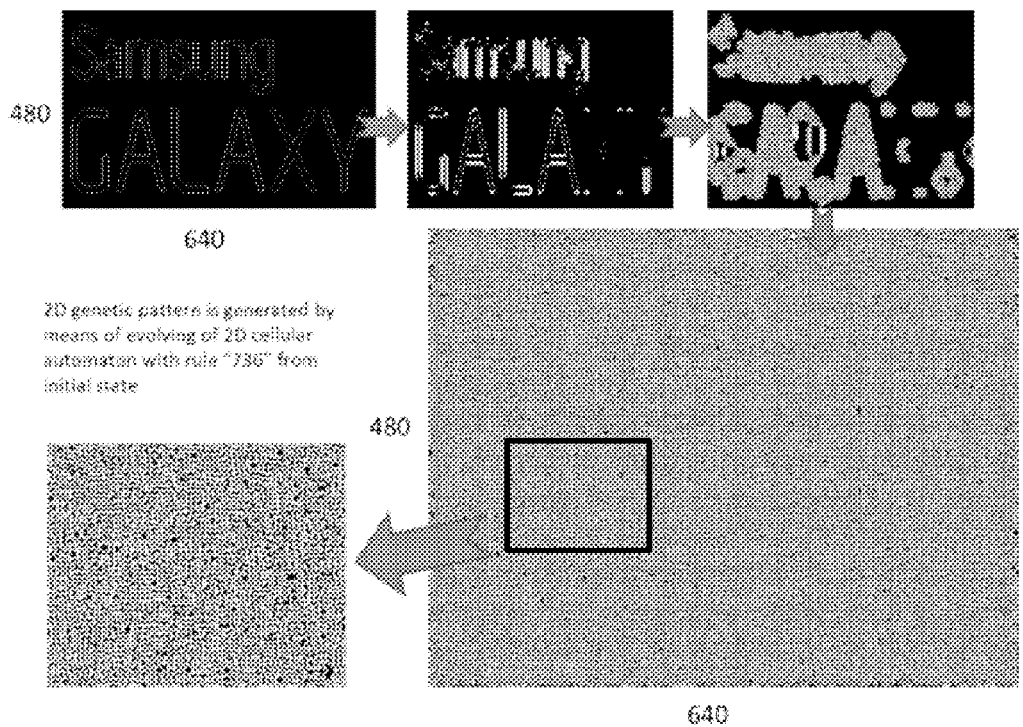
FIG. 66 illustrates epoch-wise evolution of a 2D cellular automaton, to achieve a quiescent self-organized state according to an embodiment of the disclosure.

FIG. 66 illustrates a per-epoch 2D cellular automaton evolution in order to achieve a quiescent self-organized state according to an embodiment of the disclosure.

Figure 67:
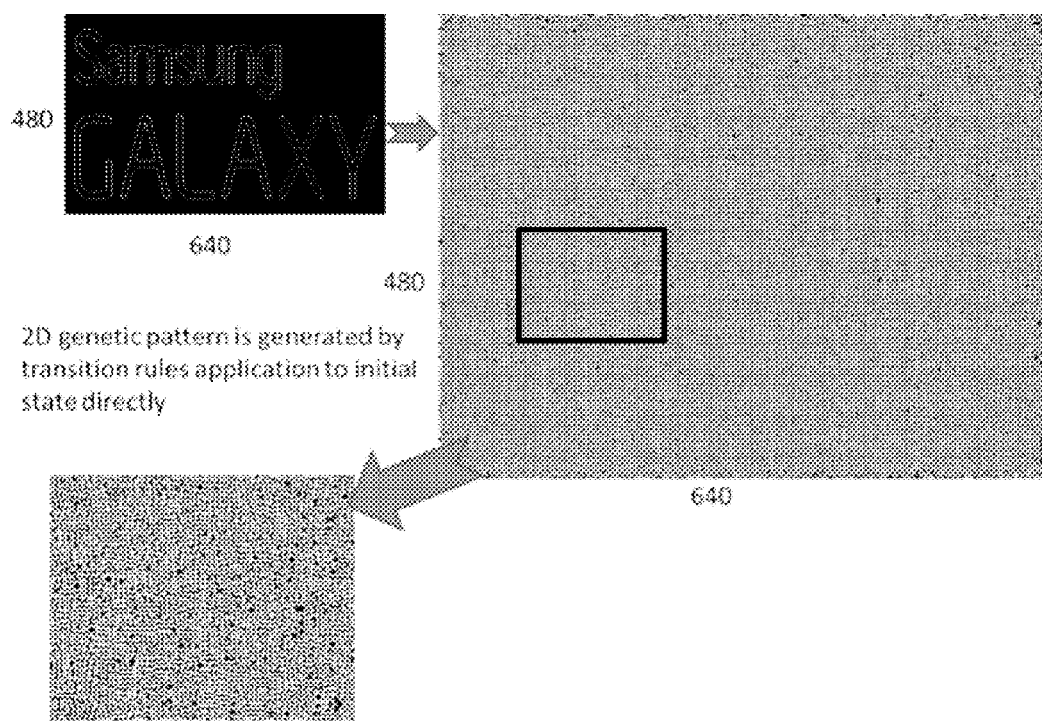
FIG. 67 illustrates the simplified or approximated performance of a 2D cellular automaton by evolving the global aspect thereof by means of a genetic algorithm (GA) according to an embodiment of the disclosure.

FIG. 67 illustrates simplified or approximated performance of a 2D cellular automaton along with evolution of a global aspect through a GA according to an embodiment of the disclosure.

The GA brings a set of optimum transition rules for all cells in a 2D lattice, and a final quiescent-state genetic pattern is generated by directly applying the set of optimum transition rules to an initial state. That is, the cellular automata rules of [Equation 12] may be replaced with transition rules in the following form.

$$\begin{array}{cccccccccc}
 & & & \alpha_{-3c,-3c} & \alpha_{-2c,-3c} & \alpha_{-c,-3c} & \alpha_{0,-3c} & \alpha_{c,-3c} & \alpha_{2c,-3c} & \alpha_{3c,-3c} \\
 & & & \alpha_{-3c,-2c} & \alpha_{-2c,-2c} & \alpha_{-c,-2c} & \alpha_{0,-2c} & \alpha_{c,-2c} & \alpha_{2c,-2c} & \alpha_{3c,-2c} \\
\alpha_{-c,-c} & \alpha_{0,-c} & \alpha_{c,-c} & \alpha_{-c,-c} & \alpha_{-c,-c} & \alpha_{-c,-c} & \alpha_{0,-c} & \alpha_{c,-c} & \alpha_{2c,-c} & \alpha_{3c,-c} \\
\alpha_{-c,0} & \alpha_{0,0} & \alpha_{c,0} \Rightarrow & \alpha_{-3c,0} & \alpha_{-2c,0} & \alpha_{-c,0} & \alpha_{0,0} & \alpha_{c,0} & \alpha_{2c,0} & \alpha_{3c,0} = \delta_{x_{i,j}}^T \\
\alpha_{-c,c} & \alpha_{0,c} & \alpha_{c,c} & \alpha_{-3c,c} & \alpha_{-2c,c} & \alpha_{-c,c} & \alpha_{0,c} & \alpha_{c,c} & \alpha_{2c,c} & \alpha_{3c,c} \\
 & & & \alpha_{-3c,2c} & \alpha_{-2c,2c} & \alpha_{-c,2c} & \alpha_{0,2c} & \alpha_{c,2c} & \alpha_{2c,2c} & \alpha_{3c,2c} \\
 & & & \alpha_{-3c,3c} & \alpha_{-2c,3c} & \alpha_{-c,3c} & \alpha_{0,3c} & \alpha_{c,3c} & \alpha_{2c,3c} & \alpha_{3c,3c}
\end{array}$$

[Equation 37]

According to an embodiment of the disclosure, transition rules may be applied, instead of the origin of evolution of a cellular automaton.

Therefore, synchronous update ([Equation 1] and [Equation 2]) and asynchronous update ([Equation 1] to [Equation 3]) for each cell in an automaton are replaced with [Equation 37]. According to the above description, this method convolutes a captured image of a reflected pattern with a transition rule around a cell. That is, a partial sum component $\alpha_{0,0}$ of a transition rule matrix ([Equation 37]) is centered on the position (i, j) of a current cell in the cellular automaton lattice. Along the cells of the lattice, this method applies a transition rule $\delta_{x_{i,j}; t^{i+x} \to t^i}^T$ corresponding to each position and repeats this operation L times. L is introduced as the number of cells and the number of transition rules. To decode a spatial code from a genetic pattern, two methods for using a GA are available. One of the methods is to decode a spatial code by using forward transition rules for self-reproduction of a cellular automaton in the following synchronous and asynchronous modes, $$\alpha_{ij}^{i+x} = \delta_{x_{i,j}}^T * \alpha_{ij}^i \quad \text{[Equation 38]}$$

or if cellular automata rules are reversible, solve the inversion problem.

$$\alpha_{ij}^i = \delta_{x_{i,j}}^T * \alpha_{ij}^{i+x} \quad \text{[Equation 39]}$$

The genetic pattern approximates transition rules as a kernel and performs an approximation function of convolving [Equation 38] or [Equation 39] in the same manner as described in regards to the convolution-based methods and cellular automaton evolution ([Equation 34]). Therefore, the genetic pattern for cellular automaton evolution based on the strengths of actual values is given as follows.

$$\alpha_{ij}^i = \delta_{x_{i,j}}^T * \alpha_{ij}^{i+x} = \Sigma_{k+0}^K R_k^{approx} \quad \text{[Equation 40]}$$

For the binary genetic pattern as illustrated in FIG. 68, $$\alpha_{ij}^i = \delta_{x_{i,j}}^T * \alpha_{ij}^{i+x} = \Sigma_{k+0}^K R_k^{approx} \quad \text{[Equation 41]}$$

FIG. 68 illustrates connected components within a transition rule during approximation as a convolution kernel according to an embodiment of the disclosure.

Therefore, a set of transition rules according to the 'method of approximating a multimedia signal filtering algorithm' may be represented as a set of kernels in one layer. In addition, since transition rules are 2D, they may be combined into one 3D array. The kernels are permuted in the array, thereby enabling detection of the minimum number of mini-patterns or connected components for the strengths of actual values and a binary genetic pattern based on the strengths. In that manner, the method of the disclosure may execute an approximation function for convolving a genetic pattern and transition rules in a captured image.

The afore-described encryption using 1D and 2D cellular automata provides a depth point cloud density corresponding to an IR image resolution having sub-pixel accuracy. A depth resolution is a $2^{nd}$ order function of depth. This means that a disparity in one pixel covers another range of depths, which increases a distance from a camera.

Figure 69:
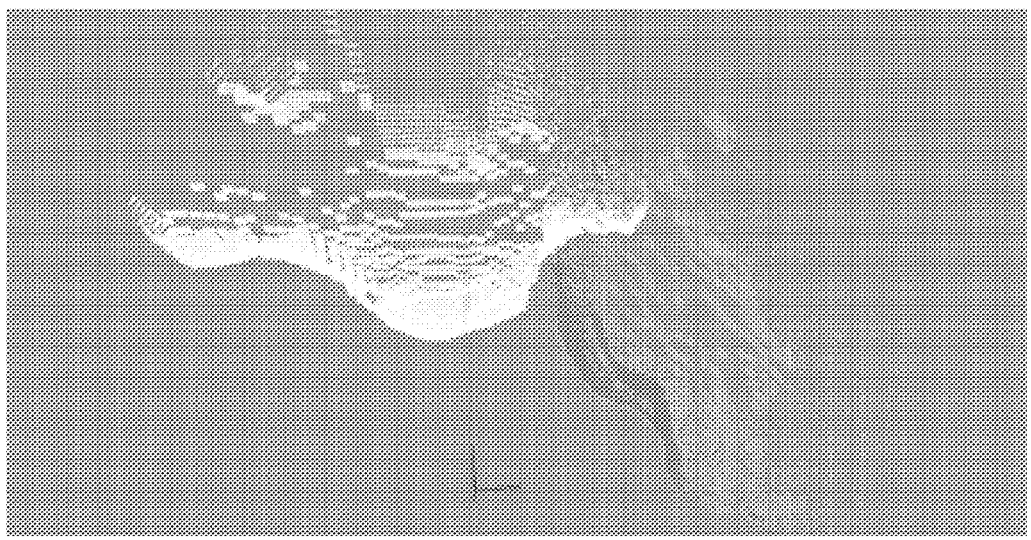
FIG. 69 illustrates reduction of a point cloud density according to an embodiment of the disclosure.

FIG. 69 illustrates the decrease of a point cloud density according to the disclosure.

Specifically, FIG. 69 illustrates that if a density is always 307200 points (=640×480), the point cloud density is decreased according to the increase of a distance to a camera.

To eliminate this dependency, an IR projector or an IR camera lens may vibrate with respect to an optical axis by applying a magnetic field. Therefore, the camera may capture various images with views at various angles. It is important that the angles should be of small and known vibration orders. Therefore, the program (or the processor) may process a few frames to statistically increase depth accuracy and increase the resolution to a maximum distance along a working area. Therefore, the program performs encryption and depth estimation in each frame. Herein, merging of all reconstructed point clouds is applied through rotation conversion corresponding to known lens vibration angles.

The system and method for reconstructing a 3D environment having an approximated performance asserted by the mobile device (the 'method of approximating a multimedia signal filtering algorithm') may perform simultaneous local area mapping for 3D content generation, and 6 degrees of freedom (DoF) location tracking and robust body pose estimation of a camera (hereinafter, referred to as, location tracking) as disclosed in the following 'Generation of 3D Content'. In this relation, embodiments of the disclosure may be used to use an extra image of an environment, including subtraction of a genetic pattern in an IR image, and segmentation of objects along with recognized shadows and a 3D environment map. According to a method of generating a 6DoF user experience (UX) (hereinafter, referred to as '3D content generation'), the last one may be used in area mapping. At this time, key frames may be stored in a memory at vertexes of a virtual polyhedron having edges corresponding to a baseline between the camera and the projector. Further, middle point clouds (map) within the volume of the polyhedron may be reconstructed, and the resolution may be enhanced, through the disclosed complex view synthesis (hereinafter, referred to as 'location tracking'). The 'method of approximating a multimedia signal filtering algorithm' is used for approximation of a convolution neural network from the 'location tracking'. The approximated performance may be used in 3D interpolation for sub-pixel location tracking and robust body pose tracking for a natural user interface in VR/AR.

Figure 70:
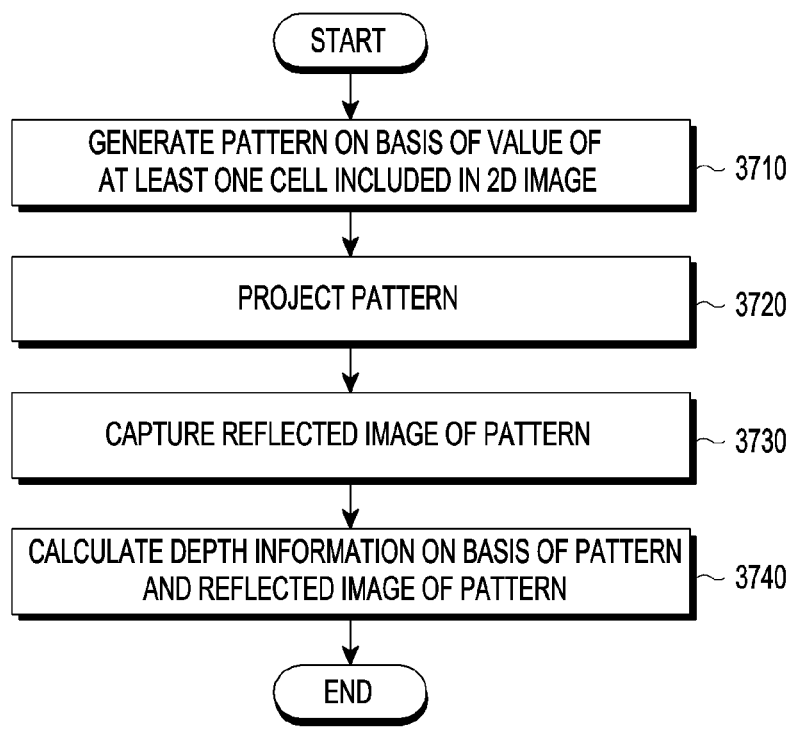
FIG. 70 is a flowchart illustrating a method of calculating depth information for a three-dimensional (3D) image according to an embodiment of the disclosure.

FIG. 70 is a flowchart illustrating a method of calculating depth information for a 3D image according to an embodiment of the disclosure.

The method of calculating depth information according to the embodiment of the disclosure may include generating a pattern on the basis of the value of at least one cell included in a 2D image in operation 3710, projecting the pattern in operation 3720, capturing a reflected image of the pattern in operation 3730, and calculating depth information on the basis of the reflected image of the pattern in operation 3740.

The generation of a pattern may include setting a value for each of a plurality of cells included in the 2D image. For example, the value set for each of the plurality of cells may be 0 or 1.

Further, the value of the at least one cell included in the 2D image may be an initial value set for a row or column of a plurality of cells included in the 2D image.

The generation of a pattern may include determining, on the basis of the value of one cell included in the 2D image and the values of two cells neighboring the one cell, the value of another cell neighboring the one cell.

Specifically, the generation of a pattern may include determining, on the basis of the value of the one cell included in the 2D image and the sum of the values of the two cells neighboring the one cell, the value of another cell neighboring the one cell.

In this case, the calculation of depth information may include generating a pattern on the basis of the values of cells in a row or column of a plurality of cells included in the reflected image of the pattern.

Further, the generation of a pattern on the basis of the values of cells in a row or column may include determining, on the basis of the value of one cell included in the row or column and the values of two cells neighboring the one cell, the value of another cell neighboring the one cell.

Herein, the calculation of depth information may include comparing the values of a plurality of cells included in the reflected image of the pattern with the values of a plurality of cells included in the pattern generated on the basis of the values of the cells in the row or column. For example, the depth information may be determined on the basis of a result of the comparison.

Meanwhile, the method of calculating depth information, according to various embodiments of the disclosure, may be implemented as a program code executable by a computer, and provided to each server or devices so that the program code may be executed by a processor in the state where it is stored in any of various non-transitory computer-readable media.

For example, a non-transitory readable medium storing a program for performing the operations of generating a pattern on the basis of the value of at least one cell included in a 2D image, projecting the pattern, capturing a reflected image of the pattern, and calculating depth information on the basis of the reflected image of the pattern may be provided.

The afore-described various applications or programs may be stored and provided in a non-transitory readable medium such as a compact disk (CD), a digital versatile disk (DVD), a hard disk, a Blue-ray disk, a universal serial bus (USB), a memory card, and a read only memory (ROM).

As is apparent from the foregoing description, according to the disclosure, a 3D environment can be modeled by calculating depth information.

While the disclosure has been shown and described with reference to certain embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of obtaining depth information, the method comprising:
    generating a pattern based on values of a plurality of cells included in a two-dimensional (2D) image, wherein generating the pattern comprises determining, based on a value of a first cell of the plurality of cells included in the 2D image and a sum of values of two cells neighboring to the first cell, a value of another cell neighboring to the first cell;
    projecting the pattern onto an object disposed in three-dimensional (3D) space, wherein the projected pattern is reflected from the object;
    capturing an image of the reflected projected pattern, wherein the captured image includes a plurality of pixels with values corresponding to the reflected projected pattern;
    clustering a pattern from the captured image based on transforming each of values of pixels within a cluster window among the plurality of pixels in the captured image into one of a first value and a second value, using a K-means algorithm, wherein a size of the cluster window is set based on a cell size of the clustered pattern; and
    obtaining depth information of the object disposed in 3D space based on the captured image by estimating a depth disparity of the pixels based on the clustered pattern and the generated pattern.

2. The method of claim 1, wherein generating the pattern comprises setting a value for each of the plurality of cells included in the 2D image.

3. The method of claim 2, wherein the value for each of the plurality of cells is selected from integers equal to or larger than zero.

4. The method of claim 1, wherein the value of the first cell included in the 2D image is an initial value set for a row or column of a plurality of cells included in the 2D image.

5. The method of claim 1, wherein obtaining the depth information comprises generating the clustered pattern based on values of cells, in a row or a column, of a plurality of cells included in the captured image.

6. The method of claim 5, wherein generating the clustered pattern based on the values of cells in the row or the column comprises determining, based on a value of one cell included in the row or the column and values of two cells neighboring to the one cell, a value of another cell neighboring to the one cell.

7. The method of claim 5, wherein obtaining the depth information comprises comparing values of a plurality of cells included in the captured image with the values of a plurality of cells included in the pattern generated based on the values of the cells in the row or the column.

8. The method of claim 7, wherein the depth information is determined based on a result of the comparison.

9. A terminal comprising:
    a projector;
    a capturing unit; and
    at least one processor coupled to the projector and the capturing unit,
    wherein the at least one processor is configured to:
        generate a pattern based on values of a plurality of cells included in a two-dimensional (2D) image by determining, based on a value of a first cell of the plurality of cells included in the 2D image and a sum of values of two cells neighboring to the first cell, a value of another cell neighboring to the first cell, project the pattern onto an object disposed in three-dimensional (3D) space, wherein the projected pattern is reflected from the object, capture an image of the reflected projected pattern, wherein the captured image includes a plurality of pixels with values corresponding to the reflected projected pattern, cluster a pattern from the captured image based on transforming each of values of pixels within a cluster window among the plurality of pixels in the captured image into one of a first value and a second value, using a K-means algorithm, wherein a size of the cluster window is set based on a cell size of the clustered pattern, and obtain depth information of the object disposed in 3D space based on the captured image by estimating a depth disparity of the pixels based on the clustered pattern and the generated pattern.

10. The terminal of claim 9, wherein the at least one processor is configured to generate the pattern by setting a value for each of the plurality of cells included in the 2D image.

11. The terminal of claim 10, wherein the value for each of the plurality of cells is selected from integers equal to or larger than zero.

12. The terminal of claim 9, wherein the value of the first one cell included in the 2D image is an initial value set for a row or column of the plurality of cells included in the 2D image.

13. The terminal of claim 9, wherein the at least one processor is configured to generate the clustered pattern based on values of cells, in a row or a column, of the plurality of cells included in the captured image.

14. The terminal of claim 13, wherein the at least one processor is configured to determine, based on a value of one cell included in the row or the column and values of two cells neighboring to the one cell, a value of another cell neighboring to the one cell.

15. The terminal of claim 13, wherein the at least one processor is configured to compare values of the plurality of cells included in the captured image with the values of a plurality of cells included in the pattern generated based on the values of the cells in the row or the column.

16. The terminal of claim 15, wherein the depth information is determined based on a result of the comparison.

* * * * *